United States Patent
Sumioka

(10) Patent No.: US 12,348,158 B2
(45) Date of Patent: Jul. 1, 2025

(54) CONTROL APPARATUS FOR VIBRATION ACTUATOR, AND VIBRATION DRIVING APPARATUS, INTERCHANGEABLE LENS, IMAGING APPARATUS, AND AUTOMATIC STAGE INCLUDING SAME

(71) Applicant: CANON KABUSHIKI KAISHA, Tokyo (JP)

(72) Inventor: Jun Sumioka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 189 days.

(21) Appl. No.: 18/153,897

(22) Filed: Jan. 12, 2023

(65) Prior Publication Data

US 2023/0147581 A1 May 11, 2023

Related U.S. Application Data

(63) Continuation of application No. PCT/JP2021/027461, filed on Jul. 26, 2021.

(30) Foreign Application Priority Data

Aug. 5, 2020 (JP) .................. 2020-133219
Nov. 30, 2020 (JP) .................. 2020-198282

(51) Int. Cl.
| | | |
|---|---|---|
| H02P 1/00 | (2006.01) | |
| H02N 2/02 | (2006.01) | |
| H02N 2/06 | (2006.01) | |
| G02B 27/64 | (2006.01) | |
| H04N 23/68 | (2023.01) | |

(52) U.S. Cl.
CPC ............. *H02N 2/062* (2013.01); *H02N 2/026* (2013.01); *G02B 27/646* (2013.01); *H04N 23/687* (2023.01)

(58) Field of Classification Search
CPC ...... H02N 2/062; H02N 23/687; H02N 2/026; G05B 11/36; G05B 13/02
See application file for complete search history.

(56) References Cited

U.S. PATENT DOCUMENTS

2017/0194879 A1* 7/2017 Yamanaka .............. H02N 2/008

FOREIGN PATENT DOCUMENTS

| CN | 113195043 A | * | 7/2021 | .......... A61B 5/0205 |
|---|---|---|---|---|
| JP | H05201564 A | | 8/1993 | |
| JP | H0778028 A | | 3/1995 | |
| JP | H07319507 A | | 12/1995 | |
| JP | H08286550 A | | 11/1996 | |
| JP | 2007283474 A | | 11/2007 | |
| JP | 2011234603 A | | 11/2011 | |
| JP | 2016144262 A | | 8/2016 | |
| WO | 2019065454 A1 | | 4/2019 | |

* cited by examiner

*Primary Examiner* — Karen Masih
(74) *Attorney, Agent, or Firm* — Canon U.S.A., Inc. I.P. Division

(57) ABSTRACT

A control apparatus for a vibration actuator configured to relatively move a contact body in contact with a vibrator with respect to the vibrator using vibration occurring on the vibrator includes a control amount output unit including a trained model trained to, if an instruction about a first speed to relatively move the contact body with respect to the vibrator at is issued, output a first control amount to relatively move the contact body with respect to the vibrator.

34 Claims, 46 Drawing Sheets

FIRST VIBRATION MODE

SECOND VIBRATION MODE

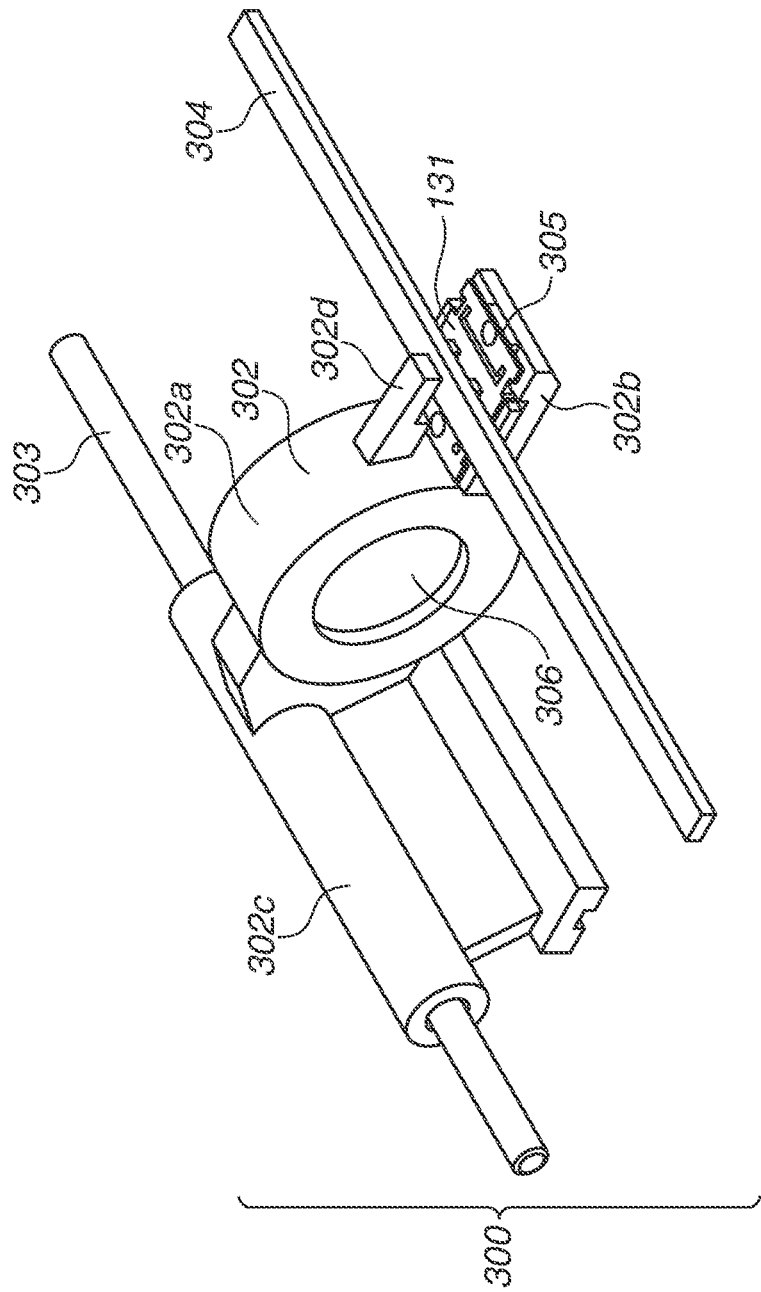

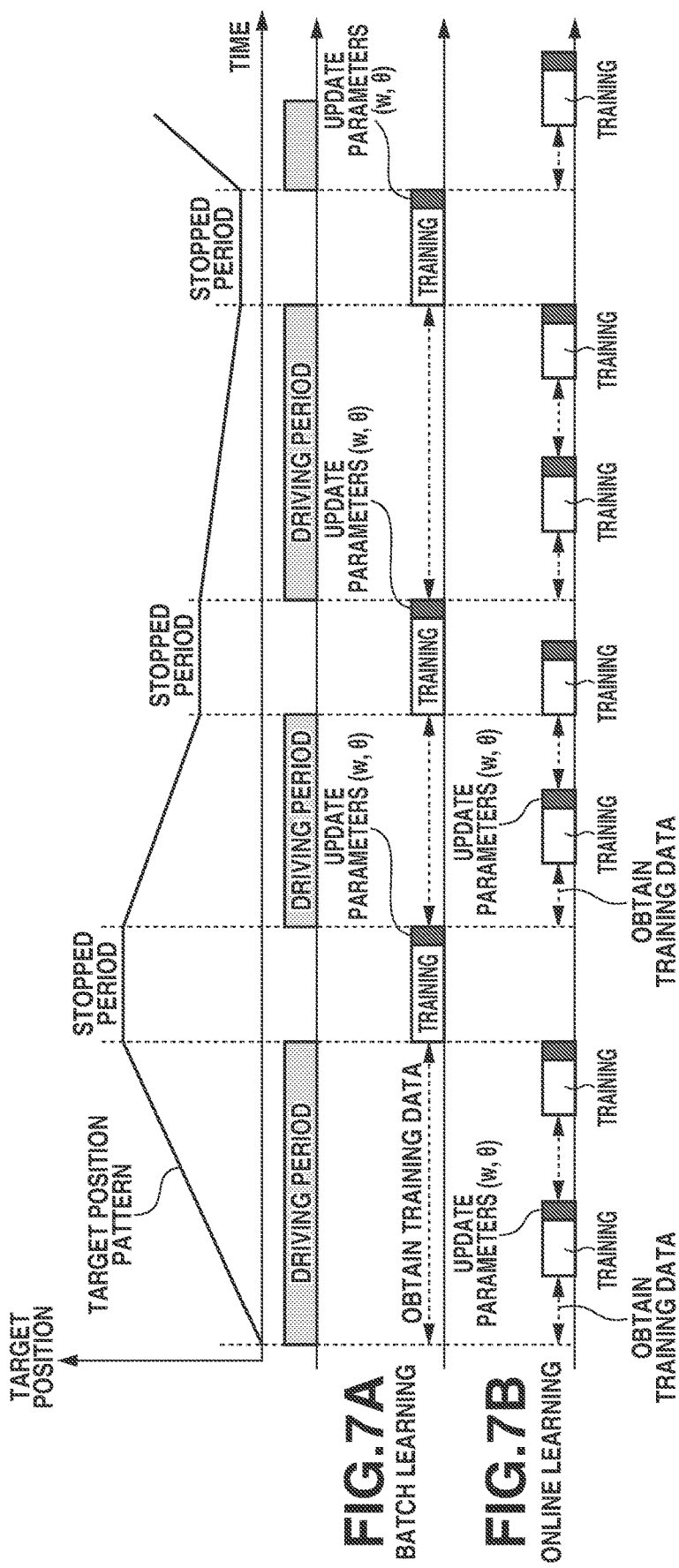

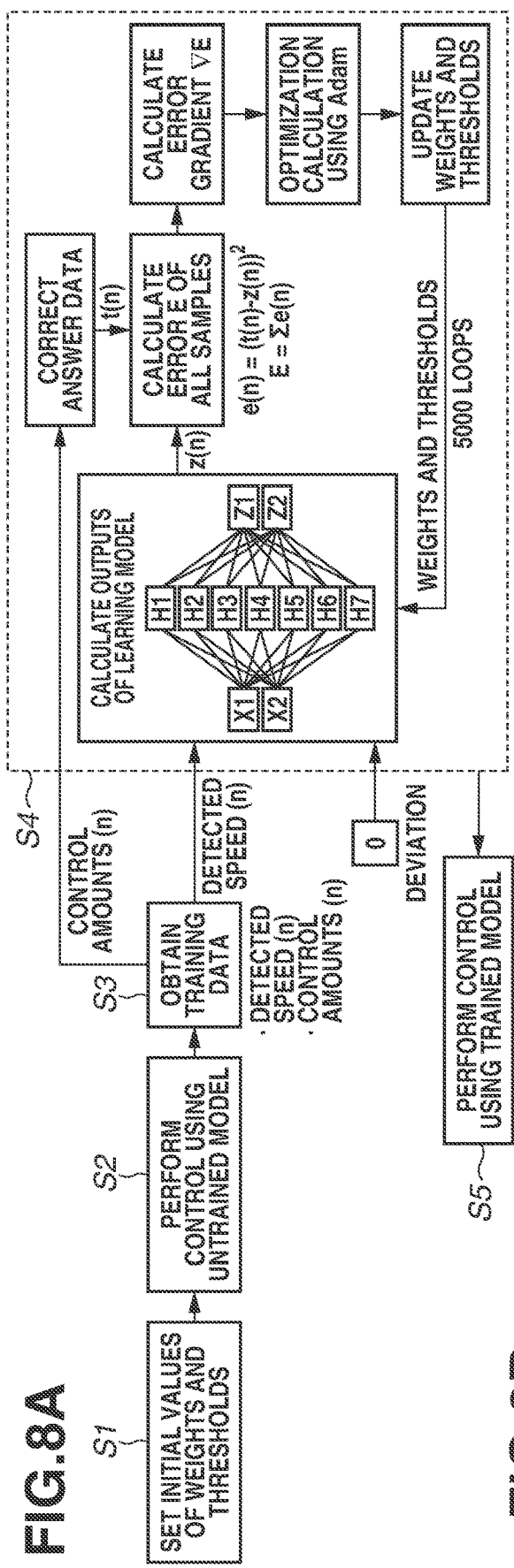
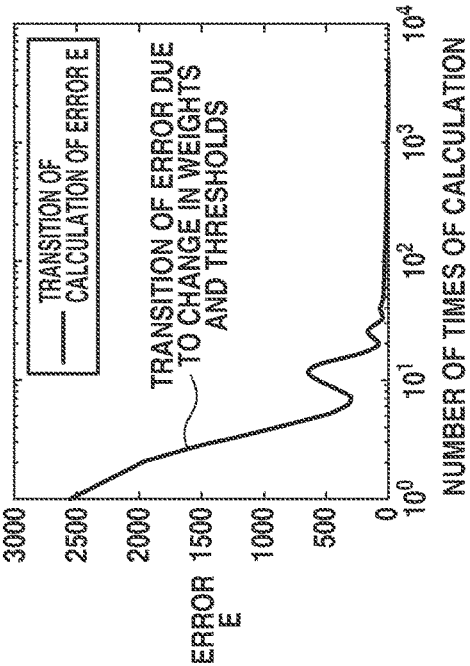
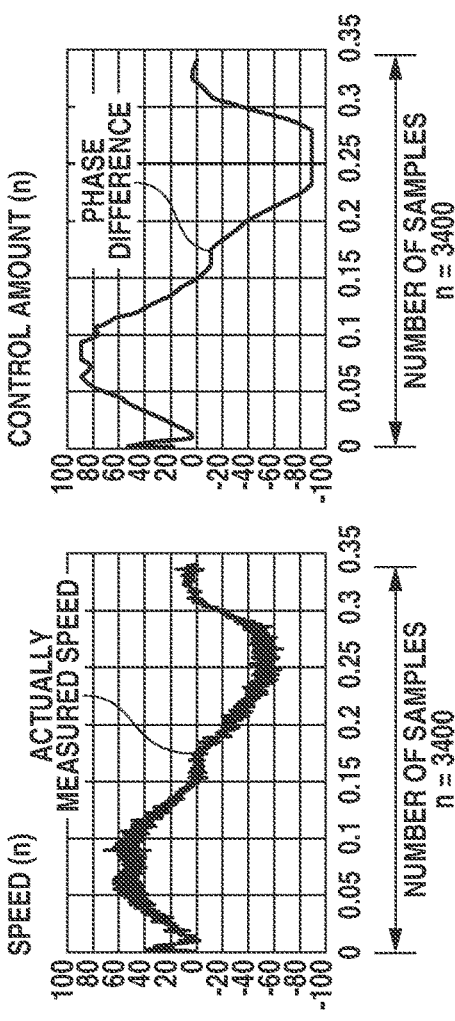

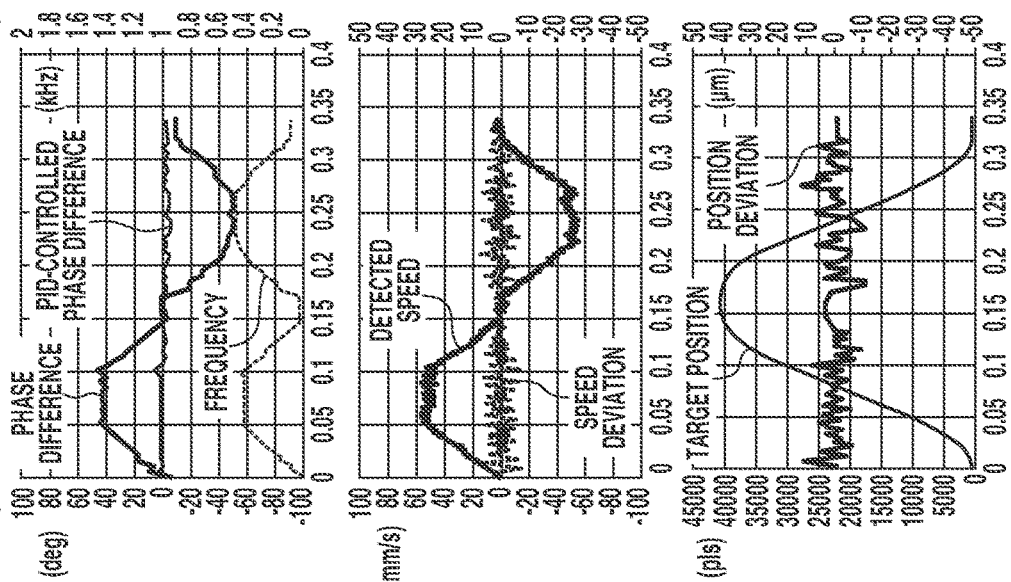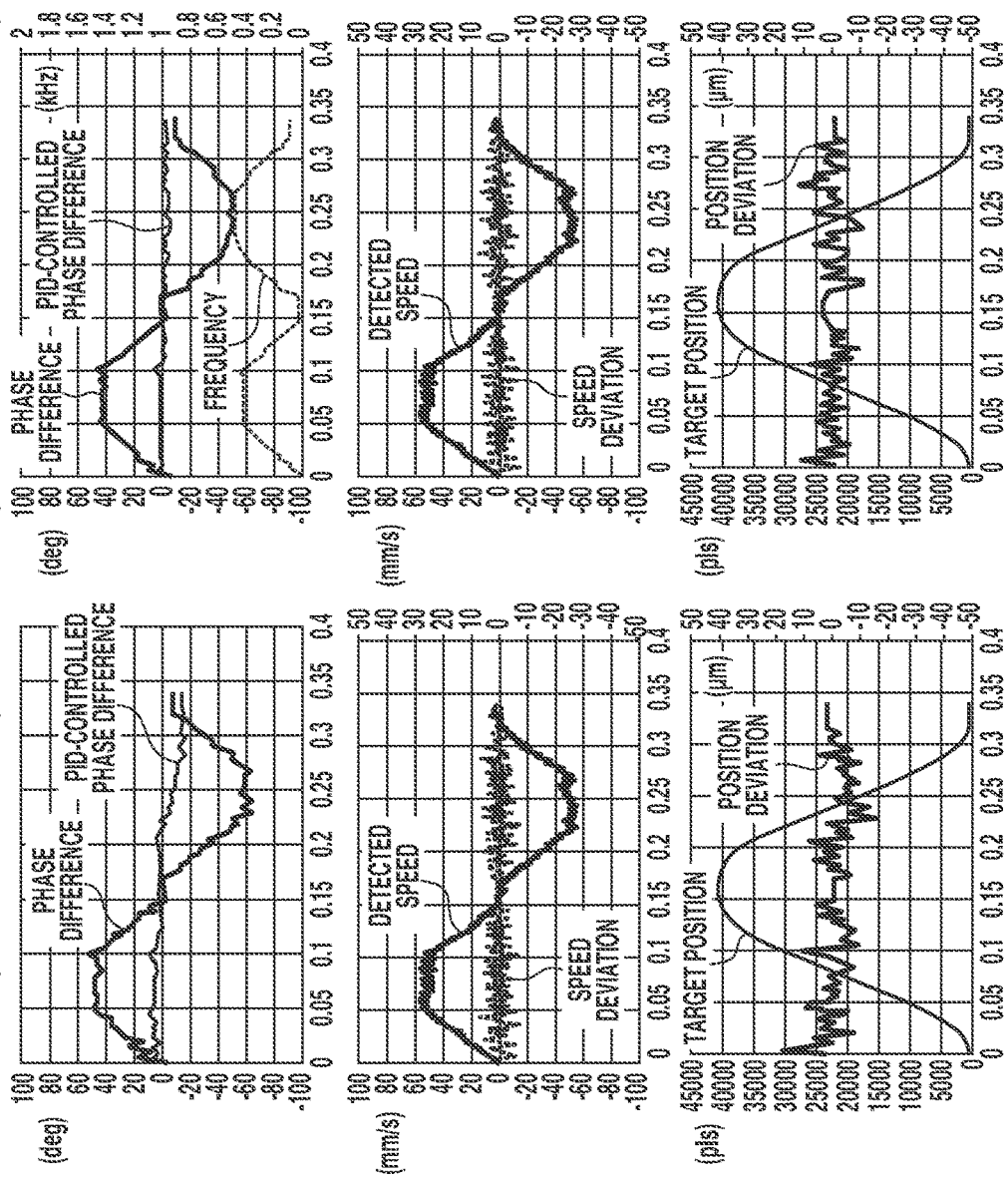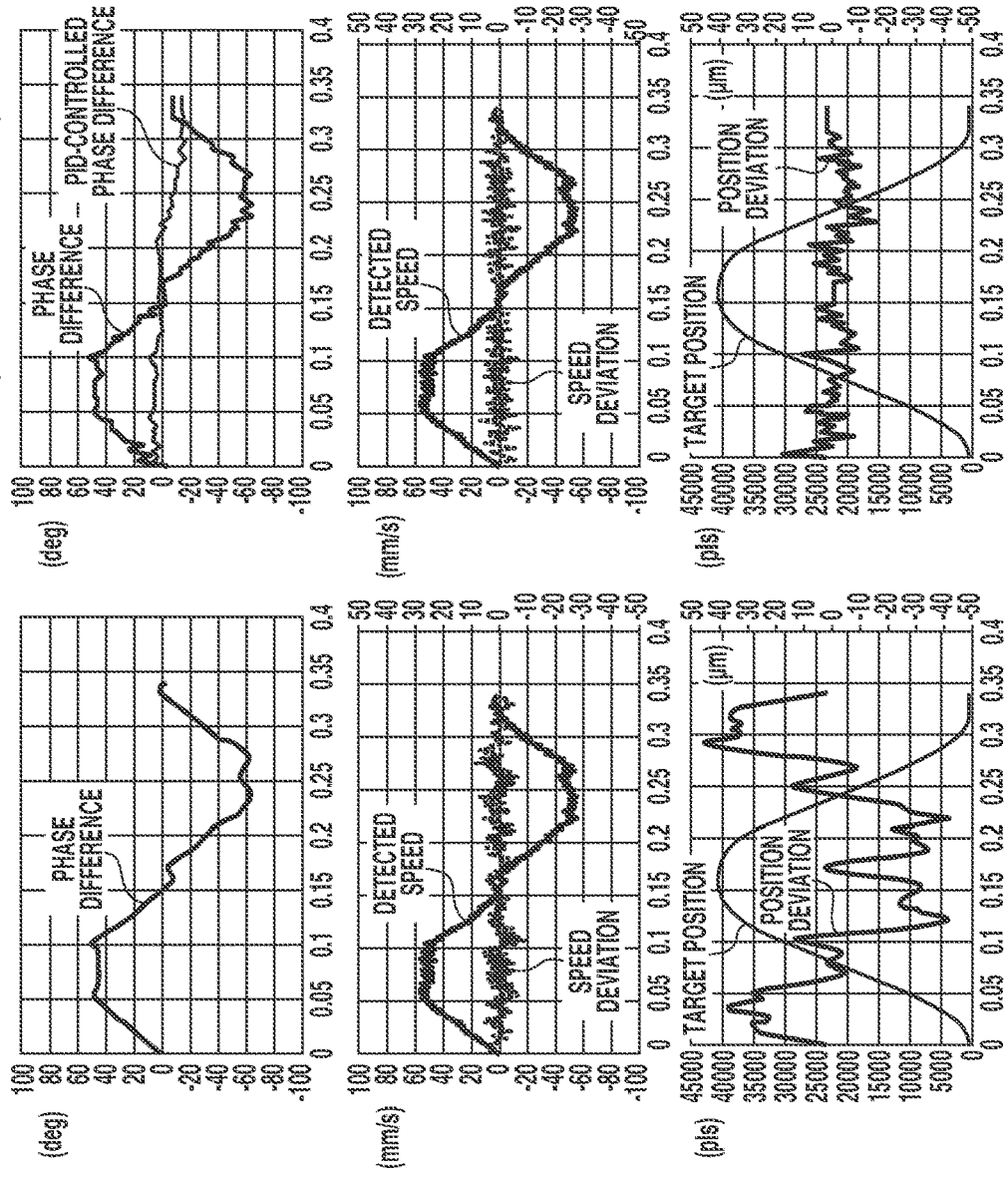

WITH STARTING FREQUENCY OF 95 kHz

WITH STARTING FREQUENCY OF 91 kHz

INPUT LAYER H: SIGMOID FUNCTION

OUTPUT LAYER Z: LINEAR FUNCTION

INPUT LAYER H: SIGMOID FUNCTION

OUTPUT LAYER Z: LINEAR FUNCTION

INPUT LAYER H: SIGMOID FUNCTION

OUTPUT LAYER Z: LINEAR FUNCTION

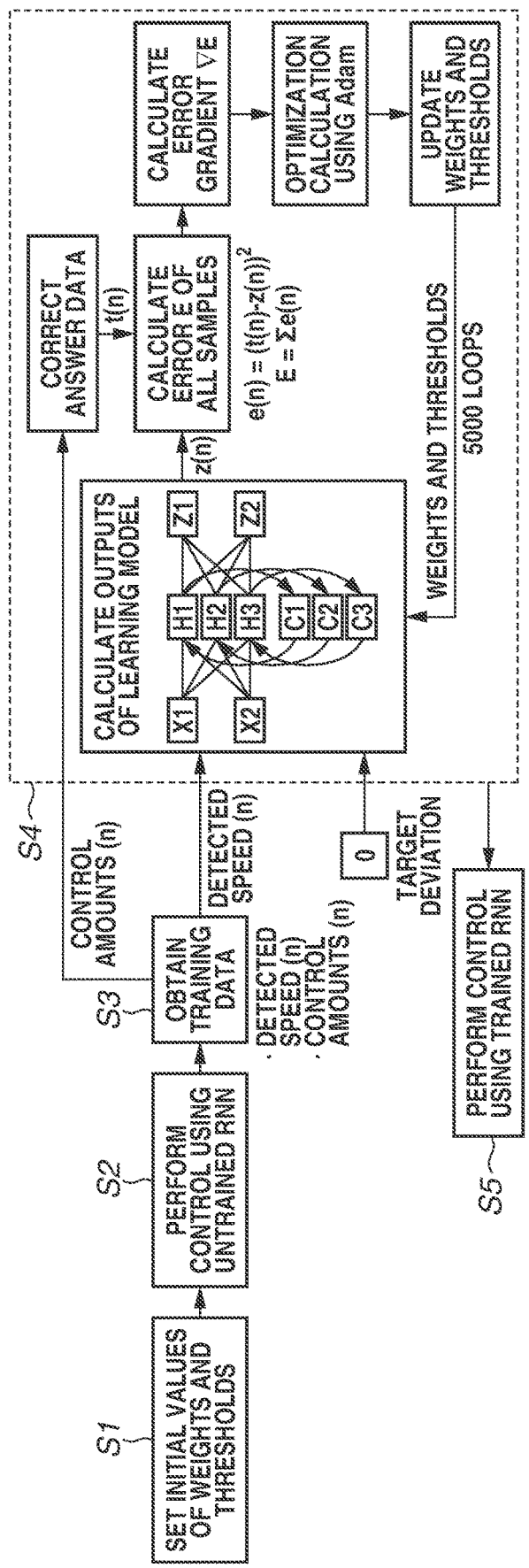

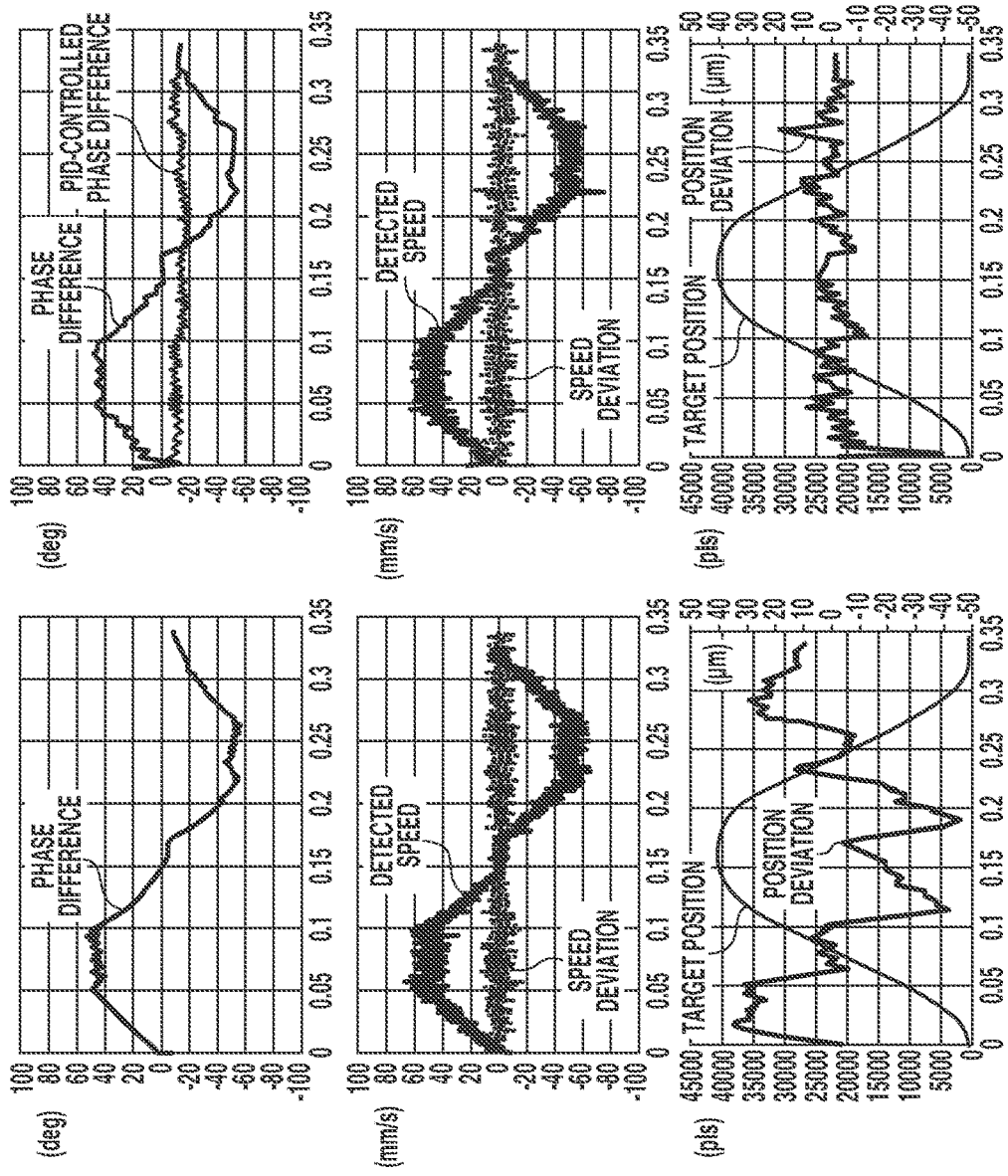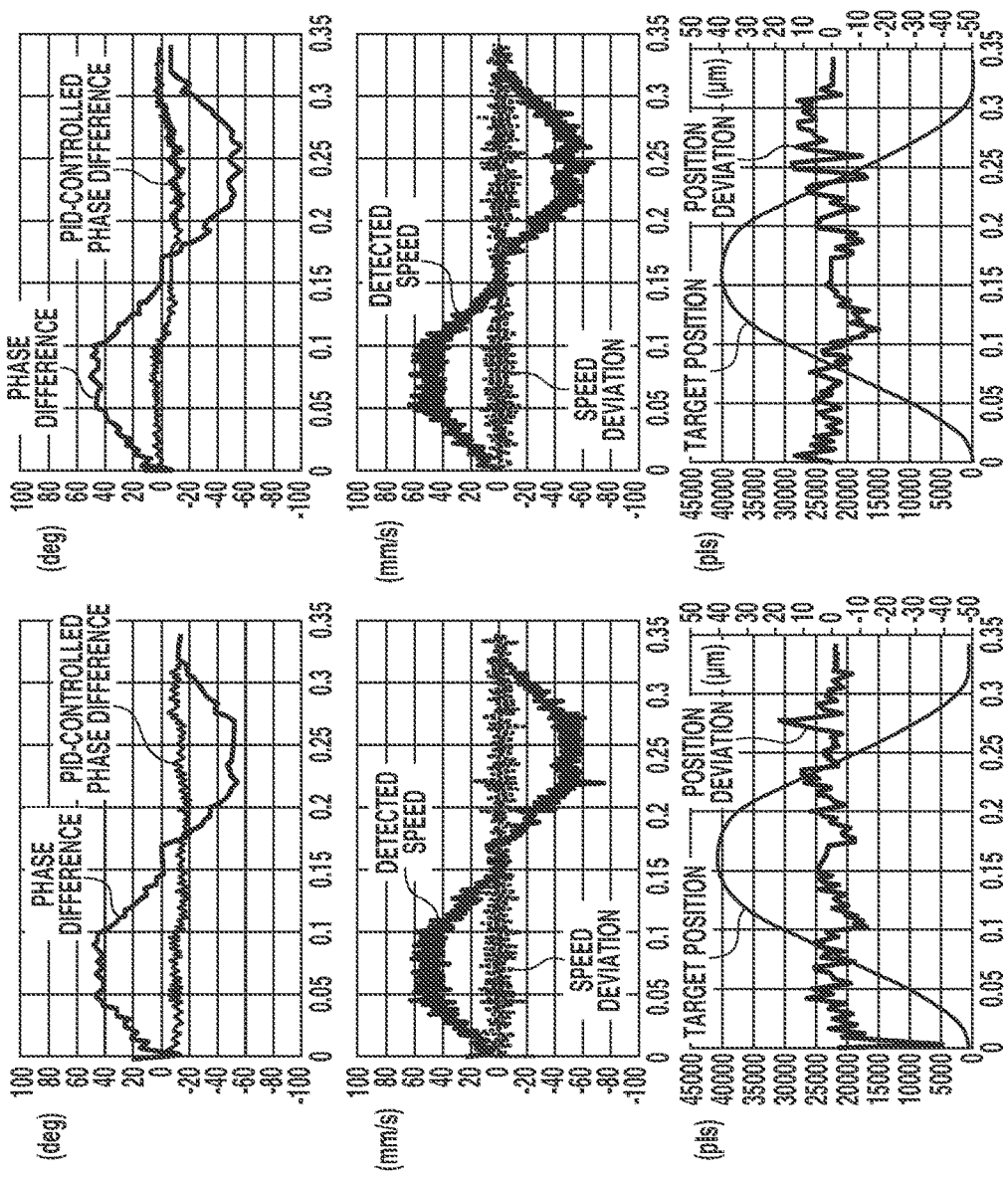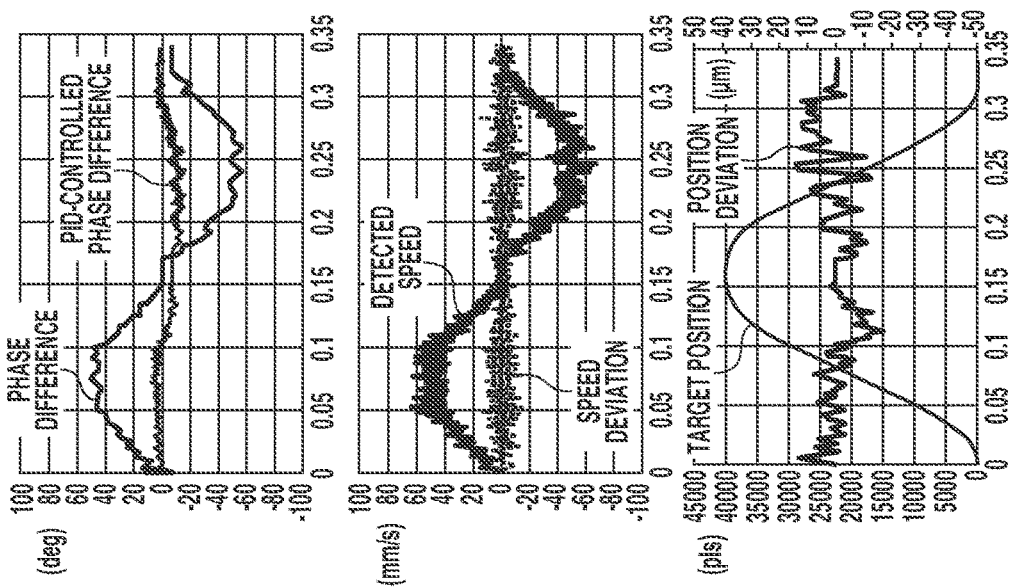

RESULT OF POSITION CONTROL WITH POSITION INSTRUCTION VALUES GIVEN AT 100 Hz

RESULT OF POSITION CONTROL WITH POSITION INSTRUCTION VALUES GIVEN AT 200 Hz

NN DEVELOPMENT DIAGRAM

RNN DEVELOPMENT DIAGRAM

RNN DEVELOPMENT DIAGRAM

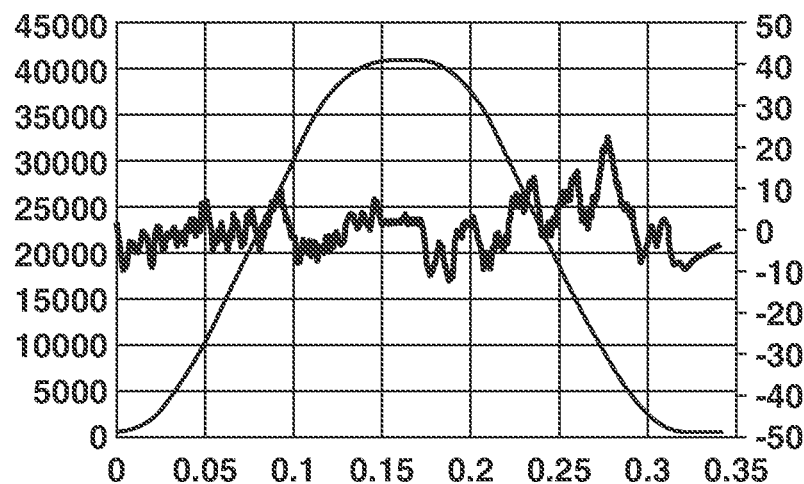
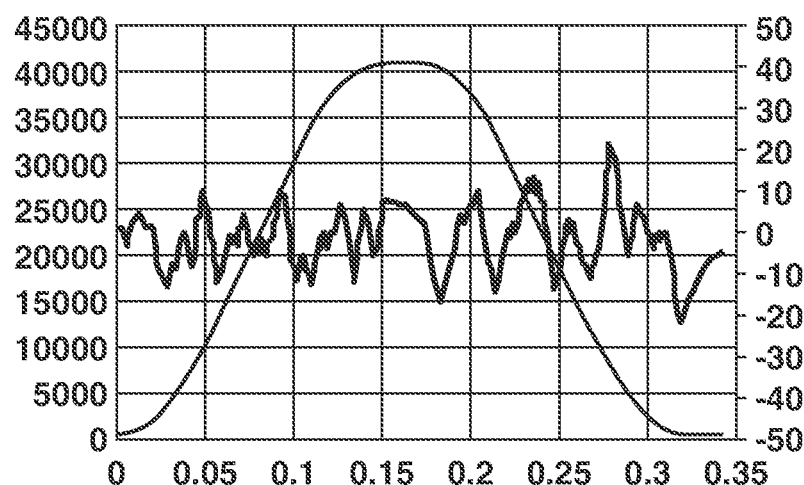

INPUT LAYER H: SIGMOID FUNCTION

OUTPUT LAYER Z: LINEAR FUNCTION

PHASE DIFFERENCE-SPEED CHARACTERISTIC
Prior Art

FREQUENCY-SPEED CHARACTERISTIC
Prior Art

CONTROL APPARATUS FOR VIBRATION ACTUATOR, AND VIBRATION DRIVING APPARATUS, INTERCHANGEABLE LENS, IMAGING APPARATUS, AND AUTOMATIC STAGE INCLUDING SAME

CROSS-REFERENCE TO RELATED APPLICATIONS

This application is a Continuation of International Patent Application No. PCT/JP2021/027461, filed Jul. 26, 2021, which claims the benefit of Japanese Patent Applications No. 2020-133219, filed Aug. 5, 2020, and Japanese Patent Applications No. 2020-198282, filed Nov. 30, 2020, all of which are hereby incorporated by reference herein in their entirety.

BACKGROUND OF THE INVENTION

Field of the Invention

The present invention relates to a control apparatus for a vibration actuator, and a vibration driving apparatus, an interchangeable lens, an imaging apparatus, and an automatic stage including the same.

Background Art

A vibration actuator (ultrasonic motor) is a non-electromagnetically driven actuator configured to generate high-frequency vibration on an electromechanical energy transducer, such as a piezoelectric element, coupled to an elastic body by applying an alternating-current voltage to the electromechanical energy transducer. The vibration energy is taken out as continuous mechanical motion.

Vibration actuators are small, lightweight, and high in precision, and have excellent actuator performance (motor performance), such as high torque during low-speed driving, compared to electromagnetically driven actuators. However, their nonlinear actuator characteristics (motor characteristics) are difficult to model, and a control system of elaborate design is desirable since the controllability changes depending on the driving condition and the temperature environment. Moreover, there are a lot of control parameters, such as a frequency, a phase difference, and a voltage amplitude, and adjustments are complicated.

FIG. 45A is a control block diagram of a conventional typical proportional-integral-derivative (PID)-controlled vibration driving apparatus (see PTL 1).

A driving circuit to which control amounts to be described below are input outputs two-phase (phase-A and -B) alternating-current voltages (alternating-current signals). A relative speed (hereinafter, also referred to simply as a "speed") of the vibration actuator can be controlled by controlling the frequency (1/period), phase difference, and voltage amplitude (see FIG. 45B) of the two-phase alternating-current voltages output from the driving circuit. The voltage amplitude can be changed by adjusting a pulse width to be described below input from a PID controller to the driving circuit. In FIG. 45B, the numerals (1), (2), and (3) represent the frequency, phase difference, and voltage amplitude of the two-phase alternating-current voltages output from the driving circuit, respectively.

A position deviation that is a difference between a target position generated by a position instruction unit and a relative position of the vibration actuator detected by a position detection unit (target position−relative position) is input to the PID controller (control amount output unit). The PID controller then successively outputs control amounts (frequency, phase difference, and pulse width) PID-calculated based on the position deviation input to the PID controller at each control sampling period. The control amounts output from the PID controller are input to the driving circuit. The driving circuit to which the control amounts are input outputs the two-phase alternating-current voltages, and the speed of the vibration actuator is controlled by the two-phase alternating-current voltages output from the driving circuit. Position feedback control is thereby performed.

FIG. 45C is a diagram schematically illustrating a frequency-speed characteristic of the vibration actuator. Specifically, FIG. 45C illustrates that the gradient of the frequency-speed characteristic is large at a frequency (f1) in a high-speed range (low-frequency range), and small at a frequency (f2) in a low-speed range (high-frequency range).

FIG. 45D is a diagram schematically illustrating a phase difference-speed characteristic of the vibration actuator. This diagram compares the phase difference-speed characteristics at the frequency (f2) in the low-speed range and at the frequency (f1) in the high-speed range.

As illustrated in FIGS. 45C and 45D, the vibration actuator varies in the gradient of the frequency-speed characteristic and in the phase difference-speed characteristic depending on the use speed range, and the control performance thus changes depending on the phase difference.

If the ambient temperature changes, for example, from room temperatures to low temperatures, the resonance frequency of the vibration actuator shifts to higher frequencies based on the temperature characteristic of the piezoelectric element. In such a case, the control performance also changes with the ambient temperature since the speed and the gradient of the frequency-speed characteristic of the vibration actuator driven at the same frequency vary.

The speed and the gradient also depend on individual differences of vibration actuators, and the control performance also varies from one vibration actuator to another. The control performance changes over time as well.

PID control gains (proportional, integral, and derivative gains in the PID control) are desirably designed to secure a sufficient gain margin and phase margin with all the changing factors taken into consideration.

CITATION LIST

Patent Literature

PTL 1: Japanese Patent Application Laid-Open No. 2016-144262

SUMMARY OF THE INVENTION

A vibration actuator control apparatus including a control amount output unit different from a conventional PID controller as its main control amount output unit has thus been desired. The present invention is directed to providing a vibration actuator control apparatus including a control amount output unit different from a conventional PID controller as its main control amount output unit.

According to an aspect of the present invention, a control apparatus for a vibration actuator that relatively moves a contact body in contact with a vibrator with respect to the vibrator using vibration occurring on the vibrator includes a control amount output unit including a trained model trained to, if a target speed to relatively move the contact body with respect to the vibrator at is input, output a control amount to relatively move the contact body with respect to the vibrator.

Further features of the present invention will become apparent from the following description of exemplary embodiments with reference to the attached drawings.

BRIEF DESCRIPTION OF THE DRAWINGS

FIG. 4 is a perspective view for describing a lens driving mechanism of a lens barrel.

FIG. 7A and FIG. 7B are a timing chart for describing batch learning and online learning by a training unit.

FIG. 8A is an explanatory diagram illustrating a case where adaptive moment estimation (Adam) is used as a technique for optimizing NN parameters.

FIG. 8B is an explanatory diagram illustrating the case where Adam is used as the technique for optimizing NN parameters.

FIG. 8C is an explanatory diagram illustrating the case where Adam is used as the technique for optimizing NN parameters.

FIG. 10A is an explanatory diagram illustrating a result of feedback control performed with a predetermined target position pattern, using conventional proportional-integral-derivative (PID) control.

FIG. 10B is an explanatory diagram illustrating a result of feedback control performed with the predetermined target position pattern, using the control according to the present exemplary embodiment.

FIG. 10C is an explanatory diagram illustrating a result of feedback control performed with the predetermined target position pattern, using the control according to the present exemplary embodiment.

FIG. 25 is a flowchart for a case where Adam is used as an algorithm for optimizing parameters of the recurrent NN.

FIG. 26A is an explanatory diagram illustrating a result of feedback control performed with a predetermined target position pattern, using conventional PID control.

FIG. 26B is an explanatory diagram illustrating a result of feedback control performed with the predetermined target position pattern, using control according to the present exemplary embodiment.

FIG. 26C is an explanatory diagram illustrating a result of feedback control performed with the predetermined target position pattern, using control according to the present exemplary embodiment.

FIG. 29A illustrates a result indicating robustness of the control apparatus for the vibration actuator according to the present exemplary embodiment.

FIG. 29B illustrates a result indicating robustness of the control apparatus for the vibration actuator according to the present exemplary embodiment.

DESCRIPTION OF THE EMBODIMENTS

Figure 1:
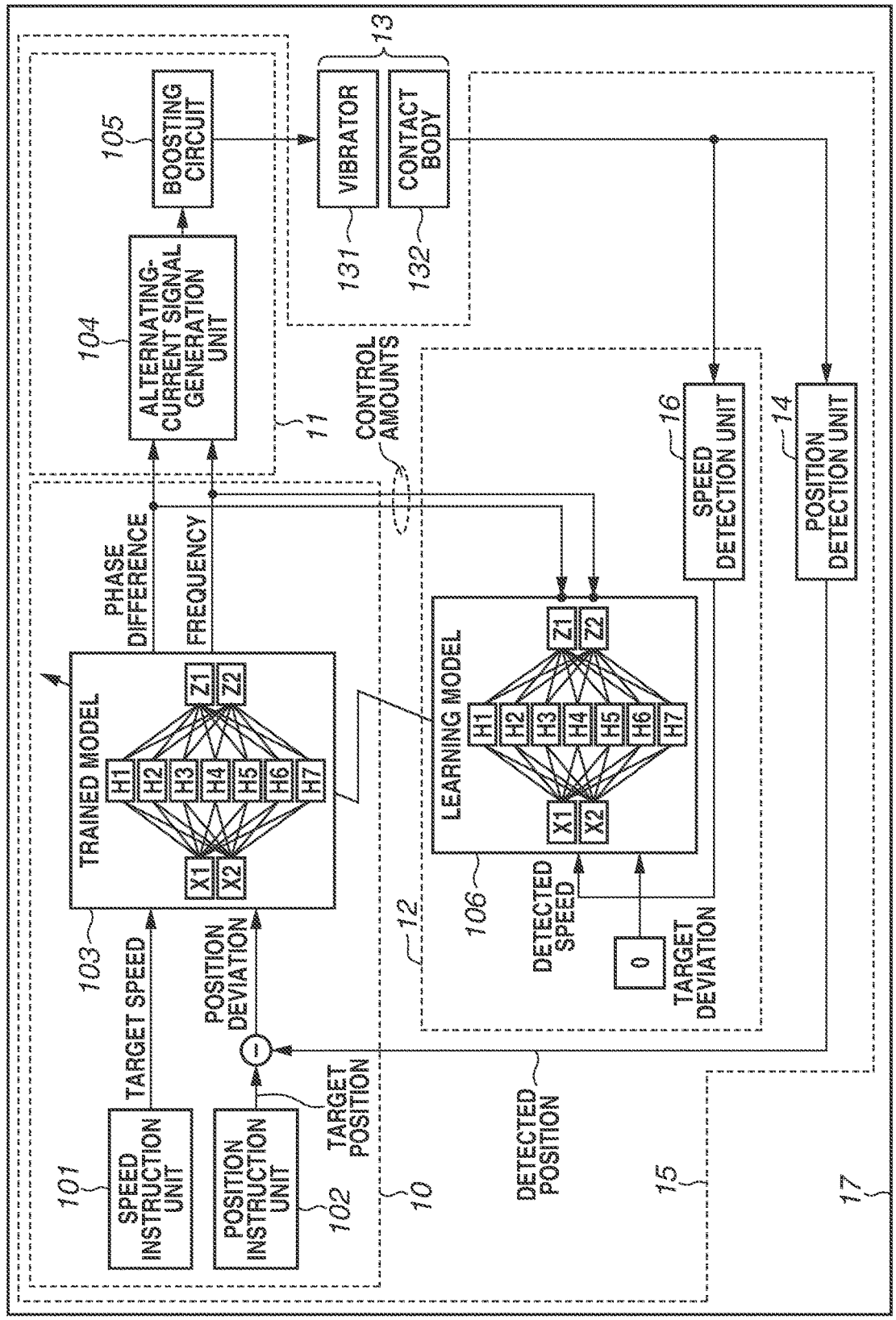
FIG. 1 is a control block diagram of a vibration driving apparatus according to a first exemplary embodiment.

FIG. 1 is a control block diagram of a vibration driving apparatus according to a first exemplary embodiment. A vibration driving apparatus 17 includes a control apparatus 15 and a vibration motor 13 (vibration actuator). In FIG. 1, the control apparatus 15 refers to the vibration driving apparatus 17 excluding the vibration actuator 13.

The control apparatus 15 includes a trained model control unit 10 (control unit) for controlling the vibration actuator 13, a driving unit 11, a machine learning unit 12 (training unit) including a speed detection unit 16 (speed detecting unit) and a learning model 106, and a position detection unit 14 (position detecting unit). The driving unit 11 includes an alternating-current signal generation unit 104 (alternating-current signal generating unit) and a boosting circuit 105.

The vibration actuator 13 includes a vibrator 131 and a body to be driven (contact body) 132. The speed detection unit 16 detects a speed (hereinafter, referred to as a "relative speed") of the contact body 132 relative to the vibrator 131. The position detection unit 14 detects a position (hereinafter, also referred to as a "relative position") of the contact body 132 relative to the vibrator 131. An absolute encoder or an incremental encoder is used as the position detection unit 14. However, the position detection unit 14 is not limited thereto. Any unit that can detect position information can be used as the position detection unit 14. The speed detection unit 16 is not limited to one (speed sensor) that directly detects speed information, and may be one that indirectly detects speed information through calculation of position information. Any unit that can detect speed information can be used as the speed detection unit 16.

The control unit 10 is configured such that signals for controlling driving of the vibrator 131 (relative movement of the contact body 132 with respect to the vibrator 131) can be generated. More specifically, a target speed (first speed) and a position deviation are input to a trained model, and the resulting outputs, namely, a phase difference and a frequency are used as control amounts (first control amounts) of the vibration actuator 13. The target speed (first speed) refers to a speed set for the relative speed (second speed, detected speed) to follow in relatively moving the contact body 132 with respect to the vibrator 131. The position deviation refers to a difference between a target position (first position) and the relative position (second position, detected position). The target position (first position) refers to a position set for the relative position (second position, detected position) to follow in relatively moving the contact body 132 with respect to the vibrator 131. A pulse width for changing a voltage amplitude may be used as a first control amount.

The control unit 10 includes a speed instruction unit 101 (speed instructing unit, speed generating unit) that generates the target speed, and a position instruction unit 102 (position instructing unit, position generating unit) that generates the target position. The control unit 10 also includes a trained model 103 (control amount output unit, control amount output device) to which the target speed and the position deviation are input and from which the phase difference and the frequency are output.

The speed instruction unit 101 generates the target speed at each unit time. The position instruction unit 102 generates the target position at each unit time. A difference at each unit time between the target position generated by the position instruction unit 102 at each unit time and the relative position detected by the position detection unit 14 at each unit time is calculated as the position deviation. The difference is given by the relative position at each unit time—the target value at each unit time.

For example, the target speed and the target position are generated at each control sampling period that is the unit time. Specifically, an instruction value indicating the target speed is output from the speed instruction unit 101 at each control sampling period, and an instruction value indicating the target position is output from the position instruction unit 102 at each control sampling period. The instruction values may be values associated with the target speed and the target position instead of the target speed and the target position themselves. The control sampling period refers to one cycle from the acquisition of a position deviation in FIG. 1 to immediately before a start of acquisition of another position deviation through the output of the control amounts, the application of alternating-current voltages to the vibrator 131, and the detection of the relative speed (second speed, detected speed) and the relative position (second position, detected position). The position or speed of the vibration actuator 13 is feedback-controlled in the foregoing cycle. Note that the target speed may be generated by differentiating the target position at each unit time. Conversely, the target position may be generated by integrating the target speed.

Figure 2A:
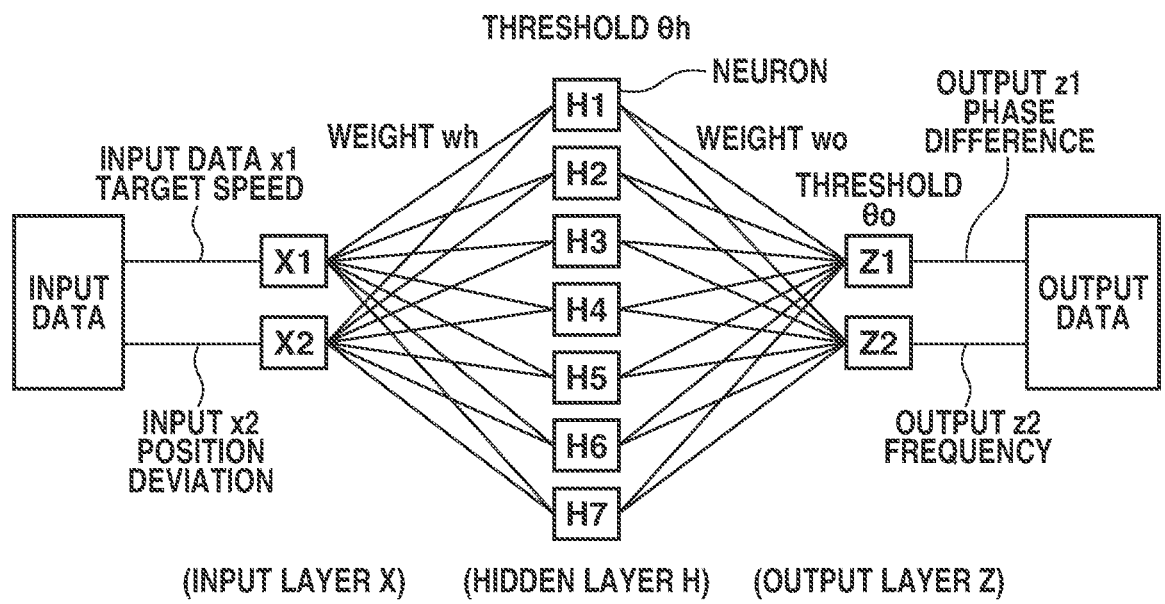
FIG. 2A is a diagram illustrating a neural network (NN) configuration of a learning model and a trained model according to the first exemplary embodiment.

Using the target speed and the position deviation, the trained model 103 calculates and outputs the control amounts (phase difference and frequency). The trained model 103 includes a neural network (NN) configuration illustrated in FIG. 2A. The NN includes an input layer X, a hidden layer H, and an output layer Z. In the present exemplary embodiment, input data is set such that the target speed is input x1 and the position deviation is input x2. Output data is set such that the phase difference is output z1 and the frequency is output z2.

Figure 2B:
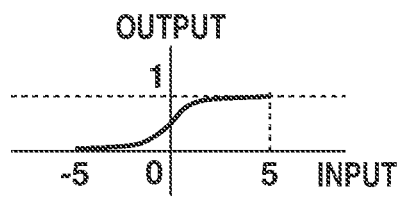
FIG. 2B is a diagram illustrating the NN configuration of the learning model and the trained model according to the first exemplary embodiment.
Figure 2C:
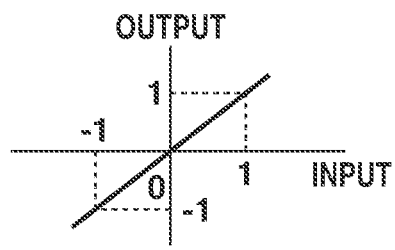
FIG. 2C is a diagram illustrating the NN configuration of the learning model and the trained model according to the first exemplary embodiment.

The input layer X includes two neurons (X1 and X2), the hidden layer H seven neurons (H1, H2, . . . , H7), and the output layer Z two neurons (Z1 and Z2). A typical sigmoid function (FIG. 2B) is used as an activation function. The number of neurons in the hidden layer H is not limited to seven, and desirably in the range of 3 to 20. The reason is that there is a trade-off between the leaning accuracy and the leaning speed. The smaller the number of neurons in the hidden layer H, the lower the leaning accuracy but the faster the training convergence (the higher the leaning speed). The greater the number of neurons in the hidden layer H, the more improved the leaning accuracy but the lower the leaning speed. While a sigmoid function or a rectified linear unit (ReLU) (ramp function) is typically used as the activation function of an output layer, a linear function (FIG. 2C) is used here to cope with the negative sign of the phase difference that is a control amount.

The neurons (first neurons) of the input layer X and the neurons (second neurons) of the hidden layer H are connected with weights (first weights) "wh". The thresholds for the neurons (second neurons) of the hidden layer H are "θh". The neurons (second neurons) of the hidden layer H and the neurons (third neurons) of the output layer Z are connected with weights "wo". The thresholds for the neurons (third neurons) of the output layer Z are "θo". The weights and thresholds applied are values trained by a machine learning unit 12 to be described below. The trained NN can be regarded as a collection of common feature patterns extracted from time-series data on the relative speed and the control amounts of the vibration actuator 13. The outputs therefore have values obtained by functions with the weights and the thresholds as variables (parameters).

The control amounts (phase difference and frequency) output from the NN are input to the alternating-current signal generation unit 104, whereby the speed and driving direction of the vibration actuator 13 are controlled. The alternating-current signal generation unit 104 generates two-phase alternating-current signals based on the phase difference, the frequency, and a pulse width.

The boosting circuit 105 includes coils and transformers, for example. The alternating-current signals (alternating-current voltages) boosted to a desired driving voltage by the boosting circuit 105 are applied to a piezoelectric element of the vibrator 131 and drive the contact body 132.

An example of a vibration actuator to which the present exemplary embodiment can be applied will be described with reference to the drawings. The vibration actuator to which the present exemplary embodiment can be applied includes a vibrator and a contact body. FIGS. 3A to 3D are diagrams for describing the driving principle of a linear driving (linear) vibration actuator using a chip vibrator, which is an example of the vibration actuator 13. The vibration actuator 13 illustrated in FIG. 3A includes the vibrator 131 and the contact body 132 driven by the vibrator 131. The vibrator 131 includes an elastic body 203 and a piezoelectric element 204 that is an electromechanical energy transducer bonded to the elastic body 203. The application of alternating-current voltages to the piezoelectric element 204 generates two vibration modes illustrated in FIGS. 3C and 3D, whereby the contact body 132 put in contact with protrusions 202 with pressure is moved in the direction of the arrow. The vibration actuator 13 to which the present exemplary embodiment can be applied is not limited to a linear driving (linear) vibration actuator using a chip vibrator, and various forms of vibration actuators are applicable. For example, the present exemplary embodiment can be applied to a ring-shaped (rotary) vibration actuator using a chip vibrator. The present exemplary embodiment can also be applied to an annular (rotary) vibration actuator using a ring-shaped vibrator. The vibration actuator 13 may be any actuator that can relatively move the vibrator 131 and the contact body 132 using vibration generated on the vibrator 131 by applying voltages to an electromechanical energy transducer.

Figure 3A:
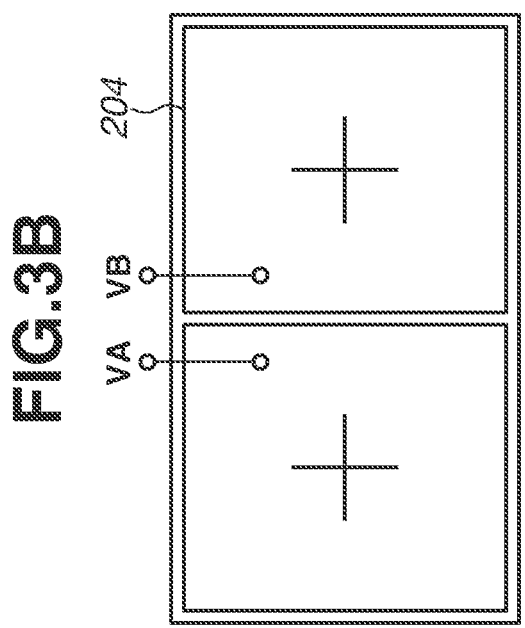
FIG. 3A is a diagram for describing a driving principle of a linear driving vibration actuator.
Figure 3B:
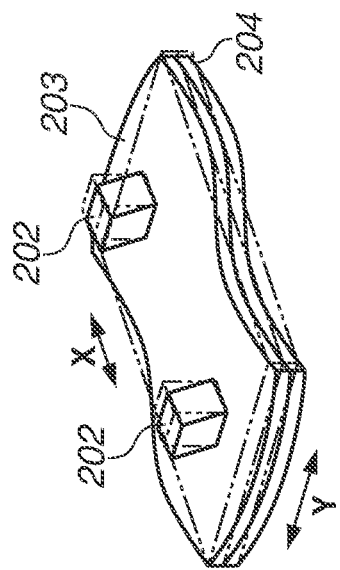
FIG. 3B is a diagram for describing the driving principle of the linear driving vibration actuator.
Figure 3C:
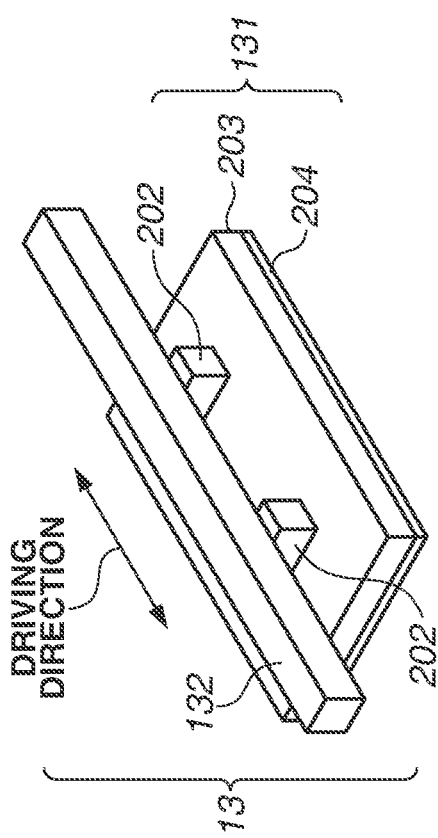
FIG. 3C is a diagram for describing the driving principle of the linear driving vibration actuator.

FIG. 3B is a diagram illustrating an electrode pattern of the piezoelectric element 204. For example, two longitudinally equally divided electrode areas are formed on the piezoelectric element 204 of the vibrator 131. The electrode areas have the same polarization direction (+). An alternating-current voltage VB is applied to one of the two electrode areas of the piezoelectric element 204 located to the right in FIG. 3B. An alternating-current voltage VA is applied to the one located to the left.

If the alternating-current voltages VB and VA have a frequency near the resonance frequency of the first vibration mode and have the same phase, the entire piezoelectric element 204 (two electrode areas) extends at one moment and contracts at another. As a result, vibration (hereinafter, thrust vibration) in the first vibration mode illustrated in FIG. 3C occurs on the vibrator 131. The protrusions 202 are thereby displaced in a thrust direction (Z direction).

If the alternating-current voltages VB and VA have a frequency near the resonance frequency of the second vibration mode and have 180° different phases, the right electrode area of the piezoelectric element 204 contracts and the left electrode area extends at one moment. The relationship is reversed at another moment. As a result, vibration in the second vibration mode illustrated in FIG. 3D (hereinafter, feed vibration) occurs on the vibrator 131. The protrusions 202 are thereby displaced in a driving direction (feed direction, X direction).

Vibration in the first and second vibration modes combined can therefore be excited by applying the alternating-current voltages having a frequency near the resonant frequencies of the first and second vibration modes to the electrodes of the piezoelectric element 204.

Figure 3D:
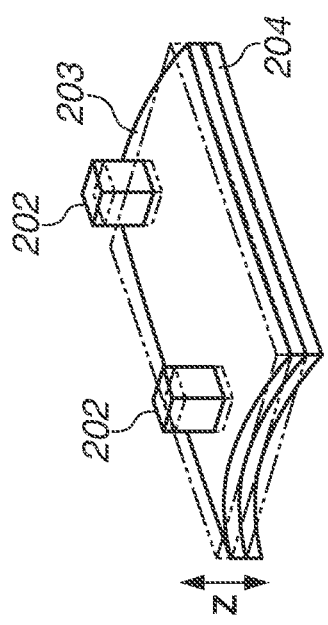
FIG. 3D is a diagram for describing the driving principle of the linear driving vibration actuator.

With the two vibration modes combined, the protrusions 202 make an elliptical motion in a cross-section perpendicular to a Y direction (direction perpendicular to the X and Z directions) in FIG. 3D. The elliptical motion drives the contact body 132 in the direction of the arrow in FIG. 3A. The direction of the relative movement between the contact body 132 and the vibrator 131, i.e., the direction in which the contact body 132 is driven by the vibrator 131 (here, X direction) is referred to as the driving direction.

The amplitude ratio R of the second vibration mode to the first vibration mode (the amplitude of the feed vibration/the amplitude of the thrust vibration) can be changed by changing a phase difference between the two-phase alternating-current voltages input to the two equally divided electrode areas. In this vibration actuator 13, the speed of the contact body 132 can be changed by changing the amplitude ratio of the vibrations.

In the foregoing description, a case where the vibrator 131 remains stationary (fixed) and the contact body 132 moves (is driven) is described as an example. However, the present invention is not limited thereto. The contact body 132 and the vibrator 131 can relatively change the positions of their contact portions in any manner. For example, the contact body 132 may be stationary (fixed) while the vibrator 131 moves (is driven). In other words, as employed in the present exemplary embodiment, to "drive" means to change the relative position of the contact body 132 with respect to the vibrator 131, and the absolute position of the contact body 132 (for example, the position of the contact body 132 with reference to the position of a casing accommodating the contact body 132 and the vibrator 131) does not necessarily need to be changed.

In the foregoing description, the linear driving (linear) vibration actuator 13 is described as an example. In other words, a case where the vibrator 131 or the contact body 132 moves (is driven) linearly is described as an example. However, the present invention is not limited thereto. The contact body 132 and the vibrator 131 can relatively change the positions of their contact portions in any manner. For example, the vibrator 131 and the contact body 132 may move in a rotational direction. An example of the vibration actuator 13 where the vibrator 131 and the contact body 132 move in a rotational direction is a ring-shaped (rotary) vibration actuator including a ring-shaped vibrator.

The vibration actuator 13 is used for autofocus driving of a camera, for example.

FIG. 4 is a perspective view for describing a lens driving mechanism of a lens barrel. A lens holder driving system using a vibration actuator includes a vibrator, a lens holder, and a first guide bar and a second guide bar that are disposed in parallel and slidably hold the lens holder. In the present exemplary embodiment, a case where the second guide bar is a contact body and the second guide bar is fixed while the vibrator and the lens holder move integrally will be described.

The vibrator generates a relative movement force between the vibrator and the second guide bar in contact with the protrusions of the elastic body thereof, using elliptical motion of the protrusions of the vibrator generated by the application of driving voltages to the electromagnetic energy transducer. With such a configuration, the lens holder integrally fixed to the vibrator can be moved along the first and second guide bars.

Specifically, a contact body driving mechanism 300 mainly includes a lens holder 302 that is a lens holding member, a lens 306, a vibrator coupled with a flexible printed circuit board, a pressure magnet 305, two guide bars 303 and 304, and a not-illustrated base. Here, the vibrator 131 will be described as an example of the vibrator.

A first guide bar 303 and a second guide bar 304 are each held by and fixed to the not-illustrated base at both ends so that the guide bars 303 and 304 are located in parallel with each other. The lens holder 302 includes a cylindrical holder portion 302a, a holding portion 302b that holds and fixes the vibrator 131 and the pressure magnet 305, and a first guide portion 302c that is fitted to the first guide bar 303 and functions as a guide.

The pressure magnet 305 for constituting a pressure unit includes a permanent magnet and two yokes located at both ends of the permanent magnet. The pressure magnet 305 and the second guide bar 304 form a magnetic circuit therebetween, whereby an attractive force is generated between the members. The pressure magnet 305 is located at a distance from the second guide bar 304. The second guide bar 304 is disposed to make contact with the vibrator 131.

The attractive force applies a pressurizing force between the second guide bar 304 and the vibrator 131. The two protrusions of the elastic body make contact with the second guide bar 304 with pressure to form a second guide portion. The second guide portion forms a guide mechanism using the magnetic attractive force. The vibrator 131 and the second guide bar 304 can be separated by external force. Measures against such a situation will now be described.

A retainer portion 302d disposed on the lens holder 302 is configured to make contact with the second guide bar 304 so that the lens holder 302 moves back to a desired position. Desired alternating-current voltages (alternating-current signals) are applied to the vibrator 131, whereby a driving force is generated between the vibrator 131 and the second guide bar 304. The lens holder 302 is driven by the driving force.

The relative position and the relative speed are detected by a not-illustrated position sensor attached to the contact body 132 (second guide bar 304) or the vibrator 131. The relative position is fed back to the control unit 10 as a position deviation, whereby the vibration actuator 13 is feedback-controlled to follow the target position at each unit time. The machine learning unit 12 uses the relative speed and the control amounts (phase difference and frequency) output from the control unit 10 as training data. The training data refers to data including input data paired with output data (correct answer data). In the present exemplary embodiment, the training data is data including the relative speed serving as input data, paired with the control amounts (phase difference and frequency) serving as output data (correct answer data). The present exemplary embodiment is described by using a two-phase driving control apparatus that drives the piezoelectric element 204 as an electromechanical energy transducer in two separate phases as an example. However, the present exemplary embodiment is not limited to the two-phase driving, and can be applied to a vibration actuator of three or more phases.

Figure 5:
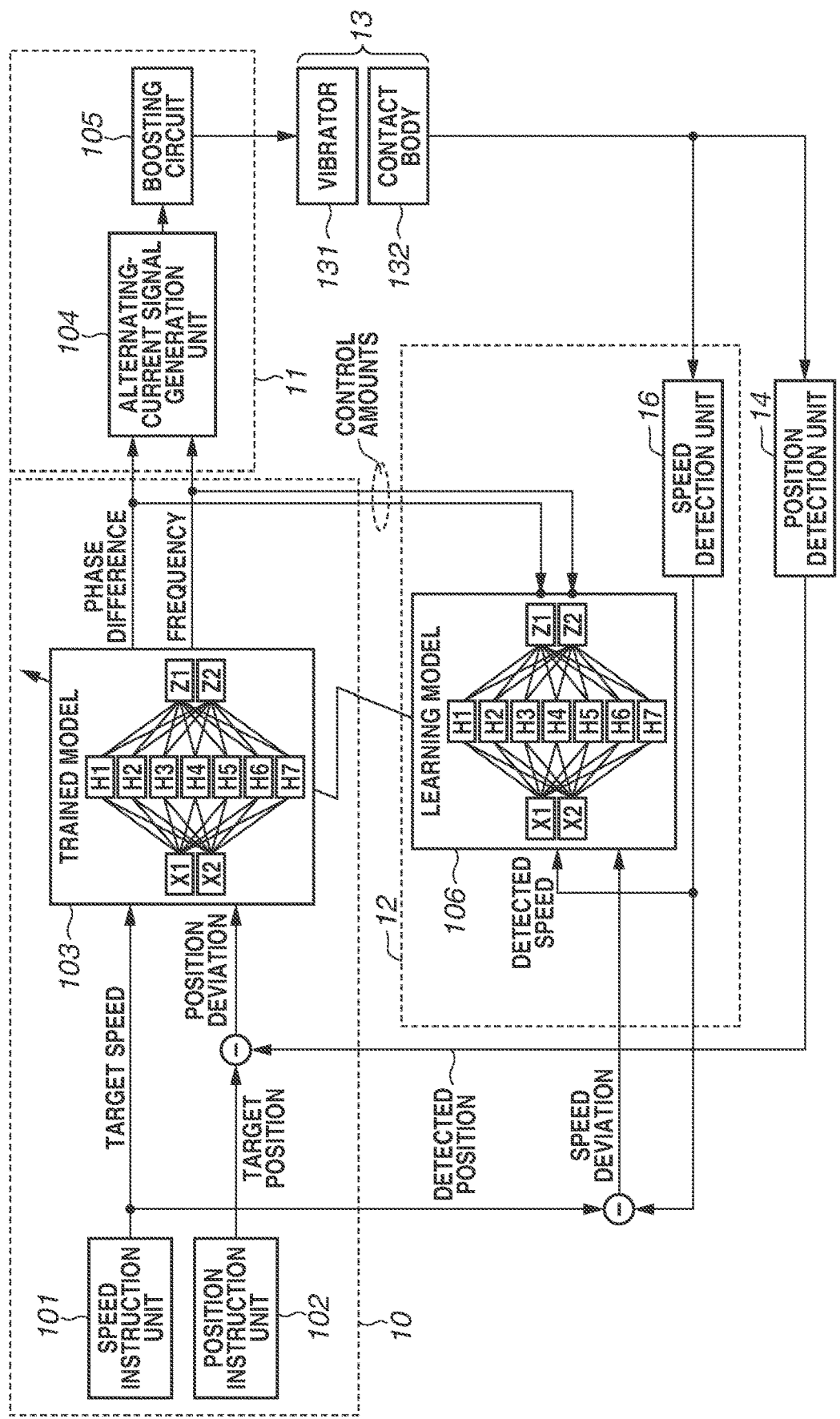
FIG. 5 is a control block diagram of the vibration driving apparatus according to the first exemplary embodiment (where a speed deviation is input to the trained model instead of a target deviation).

Next, the machine learning unit 12 will be described in detail. The learning model 106 includes an NN configuration (see FIG. 2) with the relative speed from the speed detection unit 16 and a target deviation as inputs, and the phase difference and the frequency as outputs. The target deviation refers to a value set for the position deviation to follow in relatively moving the contact body 132 with respect to the vibrator 131. The target deviation here is a value having the same dimension (data format) as that of the position deviation. For example, the target deviation is set to zero. An offset value to compensate for play in the mechanical system may be given as the target deviation. The learning model 106 may use a speed deviation that is a difference between the target speed and the detected speed as an input (see FIG. 5) instead of the target deviation. It has been found that motor characteristics that have conventionally been unable to be obtained can be collaterally learned by giving the speed deviation. Specifically, the learning model 106 is trained with features corresponding to the frequency response (transfer characteristic) of the vibration actuator 13 based on a relationship between various vibration components included in the speed deviation and the control amounts. The weight values and thresholds of the NN related to the speed deviation that is an input are thus trained to appropriate values, whereby the control system can be compensated.

The control amounts (phase difference and frequency) output from the control unit 10 are used as correct answer data, and errors are calculated by comparison with the control amounts output from the learning model 106 that is untrained or under training. While the phase difference and the frequency are used as the control amounts in this example, a combination of the pulse width and the frequency or a combination of the pulse width and the phase difference can also be used as the control amounts. The number of neurons in the output layer Z of the NN may be one. The machine learning unit 12 may be designed to select any one of the phase difference, frequency, and pulse width as a control amount.

Figure 6:
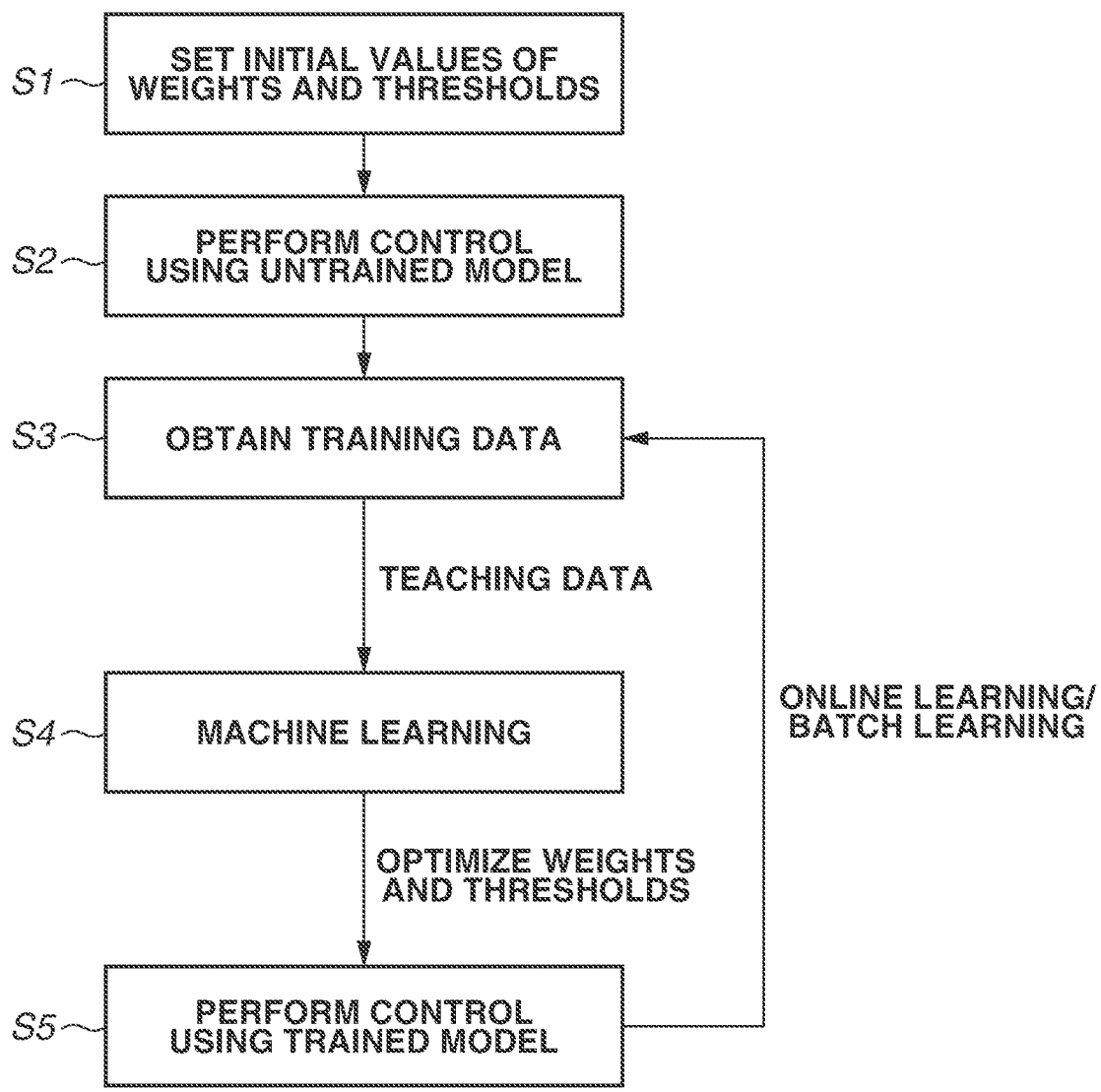
FIG. 6 is a flowchart of machine learning and control by the trained model according to the first exemplary embodiment.

FIG. 6 is a flowchart of machine learning and control by the trained model 103 according to the present exemplary embodiment. In step S1, initial values of the weights and thresholds of the trained model 103 in the control unit 10 are set using a random function (untrained state). In step S2, the vibration actuator 13 is controlled using the untrained model (untrained NN).

In step S3, time-series data on the control amounts (phase difference and frequency) output from the untrained model during the driving of the vibration actuator 13 and the relative speed detected by the speed detection unit 16 is obtained as training data.

In step S4, machine learning-based optimization calculation using the learning model 106 is performed with the control amounts in the training data as correct answer data. Optimization refers to adjusting NN parameters such that the output from the NN in response to the input to the NN approaches the training data, and is not limited to adjusting the NN parameters such that the output from the NN with respect to the input to the NN becomes the same as the training data. The learning model 106 has the same NN configuration as that of the trained model 103 used for control. The weights and thresholds of the NN are optimized by the machine learning, and the parameters of the trained model 103 in the control unit 10 are updated.

In step S5, the vibration actuator 13 is controlled using the trained model 103 of which the weights and thresholds are updated. The machine learning unit 12 includes a program for causing a not-illustrated computer to perform these steps.

After the control, the processing returns to step S3 to obtain training data to cope with a change in the driving condition or the temperature environment. As a method for obtaining the training data, batch learning where training is performed with driving stopped or online learning where training is successively performed during driving is implemented.

FIGS. 7A and 7B illustrate a timing chart for describing the batch learning and the online learning by the machine learning unit 12 (method for outputting the control amount for the vibration actuator 13). The horizontal axis indicates time. The vertical axis indicates a target position pattern to be given as instruction values for the sake of feedback control of the vibration actuator 13.

FIG. 7A illustrates an example of the batch learning where training is performed with the driving stopped (other than when the contact body 132 is relatively moved with respect to the vibrator 131). In this example, time-series data on the relative speed and the control amounts detected in a driving period of the vibration actuator 13 is obtained as training data, and the machine learning is performed and the NN parameters (weights and thresholds) are updated using a stopped period. Note that the machine learning does not necessarily need to be performed in every stopped period. For example, training may be performed only when a change in the temperature environment or the driving condition is detected.

FIG. 7B illustrates an example of the online learning where training is successively performed during driving (when the contact body 132 is relatively moved with respect to the vibrator 131). In this example, the machine learning is performed online in parallel with the driving periods of the vibration actuator 13, whereby the NN parameters are updated during the driving periods. The application of the online learning can cope with load variations occurring during a driving period that are unable to be handled by the batch learning.

The machine learning in the foregoing step S4 will be further described with reference to FIG. 8A and subsequent diagrams. FIG. 8A is a flowchart for a case where adaptive moment estimation (Adam) is used as a technique (optimization algorithm) for optimizing the NN parameters.

Steps S1 and S2 are the same as described above with reference to FIG. 6.

In step S3, a control amount (n) and a detected speed (n) that are time-series training data illustrated in FIG. 8B are obtained. The control amount (n) and the detected speed (n) are measurement data in the case where the vibration actuator 13 is controlled using the untrained model. The detected speed (n) is the speed detected by the speed detection unit 16 when the vibration actuator 13 is driven with the control amount (n). The numbers of samples n of each of the control amount (phase difference) and the detected speed are 3400. The measurement data is actually measured data when the vibration actuator 13 was driven for 0.34 sec at a control sampling rate of (1/the control sampling period)=10 kHz.

The training data does not necessarily need to be obtained at the control sampling rate, and can be thinned to save memory and reduce training time. In the present exemplary embodiment, an error e(n) is calculated by comparing an output z(n), which is the result calculated (derived) and output by the learning model 106 with the detected speed (n) as an input of the learning model 106, with correct answer data t(n) in the training data. Specifically, the error e(n) is calculated by $e(n)=(t(n)-z(n))^2$.

In step S4, an error E of the 3400 samples ($=\Sigma e(n)=\Sigma(t(n)-z(n))^2$) is calculated in the first loop, and an error gradient $\nabla E$ of each of the weights (wh and wo) and thresholds ($\theta h$ and $\theta o$) is calculated.

Next, the parameters are optimized using Adam, which is one of the optimization calculation techniques (optimization algorithms), and the error gradients $\nabla E$ as follows:

$$v_t = \beta_1 \cdot v_{t-1} + (1 - \beta_1) \cdot \nabla E \quad \text{[Eqs. 1]}$$

$$s_t = \beta_2 \cdot s_{t-1} + (1 - \beta_2) \cdot \nabla E^2$$

$$w_t = w_{t-1} - \eta \cdot \frac{v_1}{\sqrt{s_t + \varepsilon}}$$

Here, $w_t$ is the amount of update of a parameter, $\nabla E$ is the error gradient, $v_t$ is a moving average of the error gradient $\nabla E$, $s_t$ is a moving average of the square of the error gradient $\nabla E$, $\eta$ is a learning rate, and c is a divide-by-zero prevention constant. Parameters are $\eta=0.001$, $\rho_1=0.9$, $\beta2=0.999$, and $\varepsilon=10e-12$. The weights and the thresholds are updated each time the optimization calculation is repeated, and the output z(n) of the learning model 106 approaches the correct answer data t(n). As a result, the error E decreases.

In step S5, the vibration actuator 13 is controlled using the trained NN of which the weights and the thresholds are updated.

FIG. 8C illustrates the transition of the error E based on the number of calculation loops. Techniques (algorithms) other than the foregoing may be used as the optimization technique (optimization algorithm).

Figure 9A:
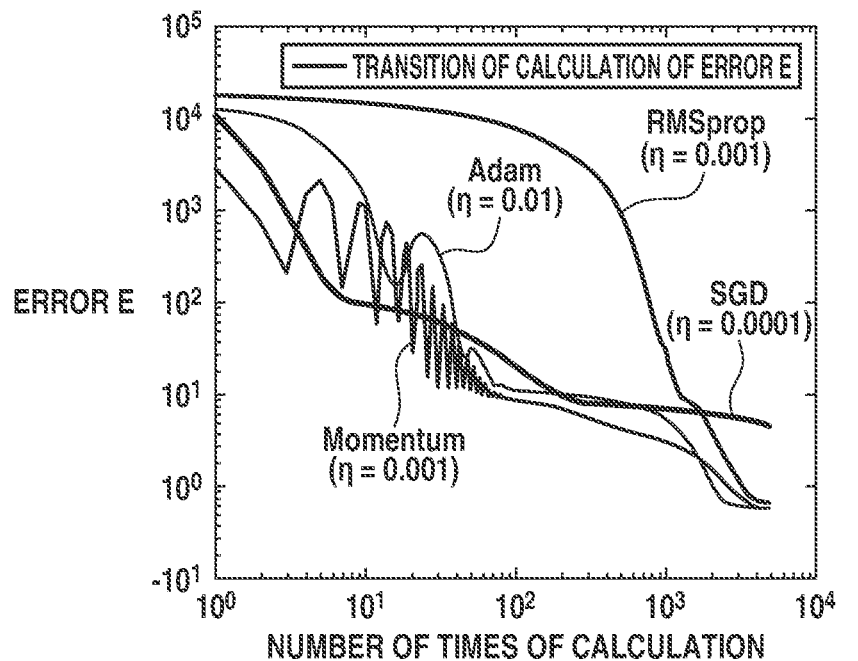
FIG. 9A compares the results of calculation by Adam, Root Mean Square Propagation (RMSProp), Momentum, and stochastic gradient descent (SGD) using the learning model according to the first exemplary embodiment and training data obtained by actual measurement.

FIG. 9A compares the calculation results by Adam, Root Mean Square Propagation (RMSProp), Momentum, and stochastic gradient descent (SGD), using the learning model 106 according to the present exemplary embodiment and training data obtained by actual measurement. Adam provided the most excellent result in terms of the number of times of calculation, stability, and the eventual error.

Figure 9B:
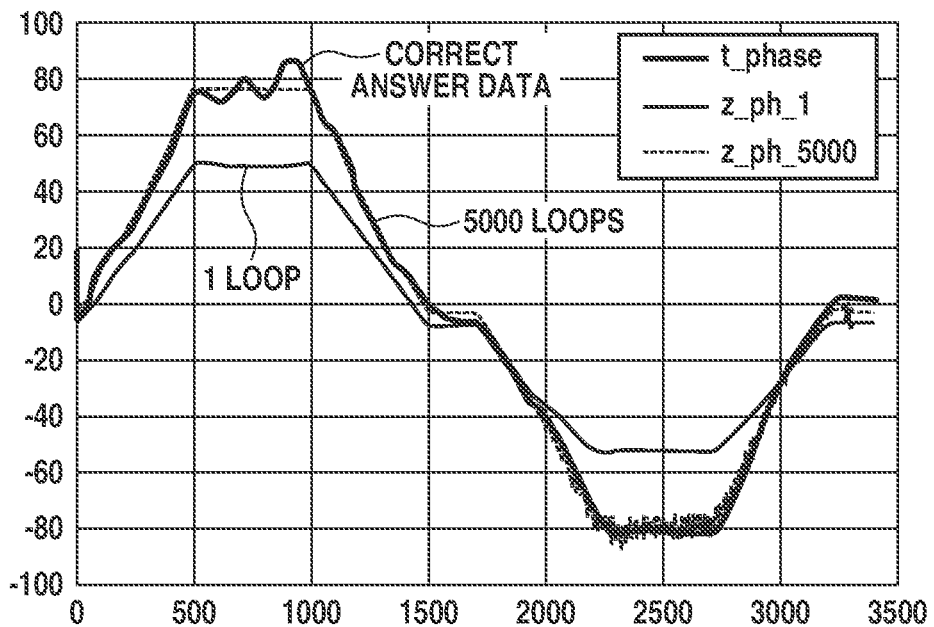
FIG. 9B illustrates learning examples of a control amount (phase difference) using Adam.

FIG. 9B illustrates a learning example of the control amount (phase difference) by Adam. It can be seen that the output z of the learning model 106 at the first loop is greatly different from the control amount of the correct answer data t. The output z of the learning model 106 at the 5000th loop of repetitive calculation is approximately the same as the control amount of the correct answer data t. In this learning example, the optimization is performed with the number of loops as 5000. However, the number of loops is desirably adjusted as appropriate based on the convergence rate.

The configuration of the control apparatus 15 according to the present exemplary embodiment has been described above. The control unit 10 and the machine learning unit 12 include, for example, a digital device, such as a central processing unit (CPU) and a programmable logic device (PLD) (including an application specific integrated circuit [ASIC]), and elements, such as an analog-to-digital (A/D) converter. The alternating-current signal generation unit 104 of the driving unit 11 includes a CPU, a function generator, and a switching circuit, for example. The boosting circuit 105 of the driving unit 11 includes coils, transformers, and capacitors, for example. The control unit 10, the machine learning unit 12, and the driving unit 11 may each be composed of a plurality of elements or circuits instead of a single element or circuit. The processing in the control unit 10, the machine learning unit 12, and the driving unit 11 may be performed by any of the elements or circuits.

FIGS. 10A, 10B, and 10C compare the results of feedback control performed with a predetermined target position pattern, using conventional proportional-integral-derivative (PID) control and the control by the trained model 103 according to the present exemplary embodiment. The target position pattern is a trapezoidal driving pattern with a maximum target speed of 50 mm/s to make 5-mm-stroke reciprocations including positioning operations. The horizontal axes indicate time (sec). The vertical axes indicate, in order from above, a phase difference control amount (deg), the detected speed (mm/s) and the speed deviation (mm/s), and the target position (number of encoder pulses: 8000 pls per 1 mm) and the position deviation (μm).

Figure 45A:
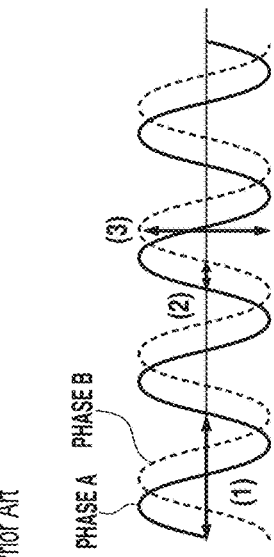
FIG. 45A is an explanatory diagram illustrating a conventional typical PID-controlled vibration driving apparatus.
Figure 45B:
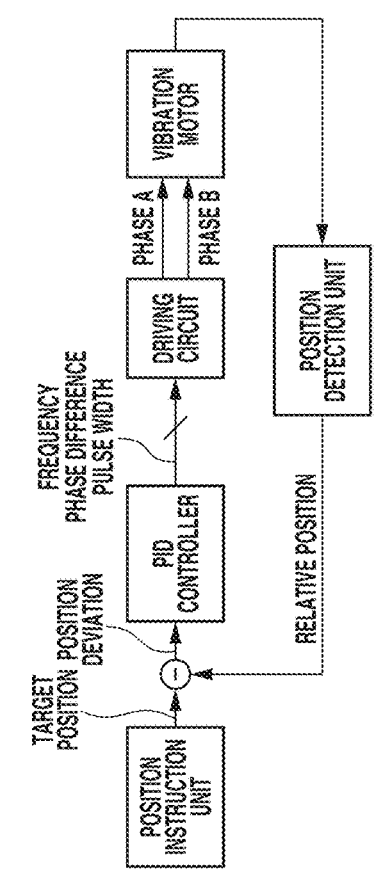
FIG. 45B is an explanatory diagram illustrating the conventional typical PID-controlled vibration driving apparatus.
Figure 45D:
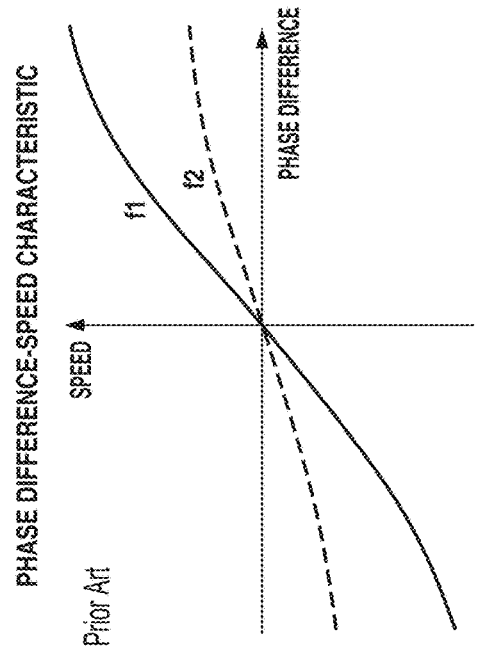
FIG. 45D is an explanatory diagram illustrating the conventional typical PID-controlled vibration driving apparatus.
Figure 45C:
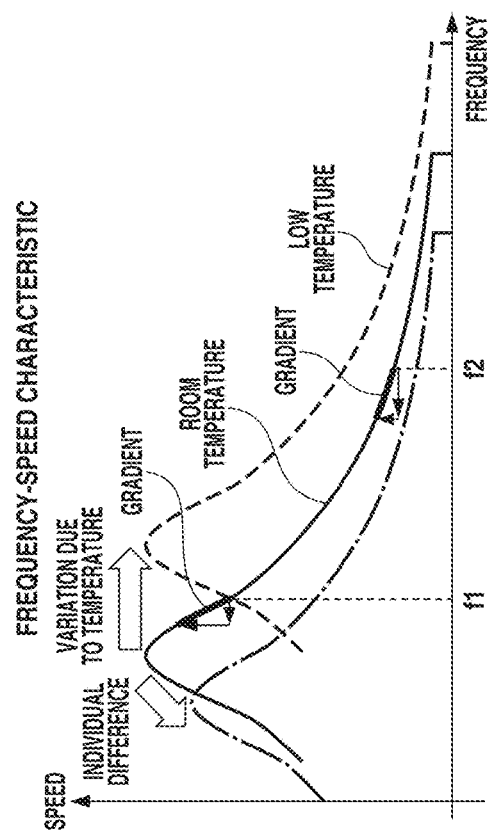
FIG. 45C is an explanatory diagram illustrating the conventional typical PID-controlled vibration driving apparatus.

FIG. 10A illustrates the result of control by a vibration actuator control apparatus using a conventional PID controller (see FIG. 45A). For the conventional PID control, the frequency (driving frequency) of the alternating-current voltages applied to the vibration actuator 13 was fixed at 93 kHz. The vibration actuator 13 was controlled by operating only the phase difference.

Between the speed deviation and the position deviation, the position deviation in particular tends to increase in acceleration and deceleration domains. The reason is that the vibration actuator 13 is affected by the inertia of the body to be driven the vibration actuator 13 drives. It can also be seen that it takes a long time for the position deviation to settle down (for the actual position to stop changing after the target position stops changing). The position deviation can be reduced by further increasing the PID control gain. However, a PID control gain having a certain gain margin and phase margin was applied to provide robustness against a change in the driving condition (use frequency range of 91 kHz to 95 kHz) and the ambient temperature.

FIG. 10B illustrates the result of control by the control apparatus 15 for the vibration actuator 13 using the trained model 103 according to the present exemplary embodiment. The driving frequency was also fixed at 93 kHz, and only the phase difference was operated for control. It was found that the application of the present exemplary embodiment improves the position deviation in all the domains during acceleration, deceleration, and settling-down.

FIG. 10C illustrates the result of control by the control apparatus 15 for the vibration actuator 13 using the trained model 103. The frequency was operated in parallel with the phase difference, whereby the driving frequency was operated starting at 93 kHz. Note that the frequency has a signless absolute value. The driving frequency was always operated to frequencies lower than 93 kHz. If there is a plurality of control amounts as in this example, there are an indefinite number of combinations of the control amounts at which a predetermined speed can be obtained in machine learning. The relationship between the control amounts is therefore desirably defined in advance in obtaining the training data.

In the present exemplary embodiment, the training is performed by defining the ratio between the frequency and the phase difference. Alternatively, for example, parameters that make the position deviation or power most favorable may be defined by setting NN parameters using a random function and comparing a plurality of training results. It was found that the use of the phase difference and the frequency as the control amounts can extend the speed range of the vibration actuator 13, and improves the speed deviation and the position deviation compared to the PID control. Note that FIGS. 10B and 10C illustrate imaginary variations in the phase difference due to PID control (top charts). The variations represent the output of a control amount obtained by an observation device performing PID control based on the position deviation, and are not directly used to control the vibration actuator 13.

Figure 11A:
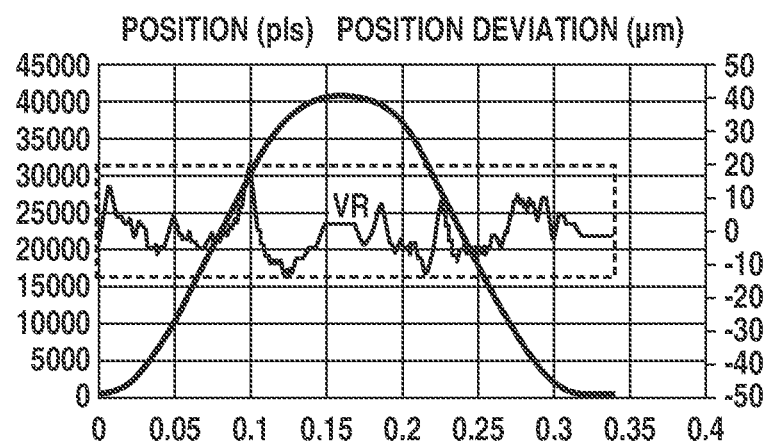
FIG. 11A illustrates a result indicating robustness of a control apparatus according to the present exemplary embodiment.
Figure 11B:
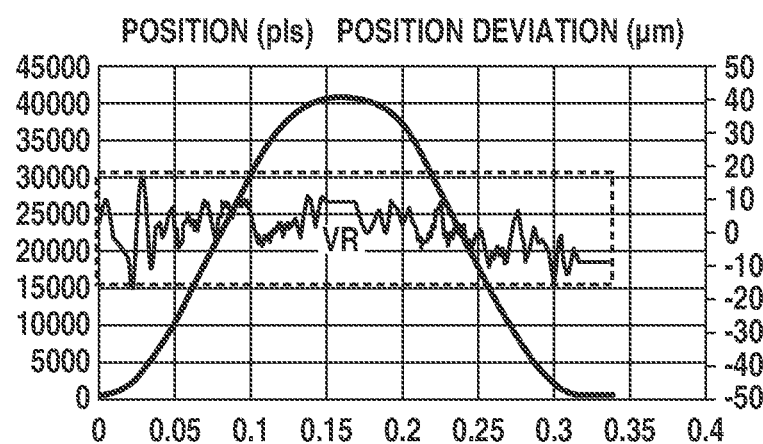
FIG. 11B illustrates a result indicating robustness of the control apparatus according to the present exemplary embodiment.

Such a PID control amount can be used to detect a control anomaly of the trained model 103. More specifically, if the control amount output from the trained model 103 is compared with the PID control amount and found to deviate greatly from a predetermined range, the NN parameters can be predicted to be different from normal values, and the parameters can be reset. This function is not an indispensable configuration in obtaining the effects of the present exemplary embodiment, but can improve reliability in terms of guaranteeing the control performance of the trained model 103. FIGS. 11A and 11B illustrate results indicating the robustness of the control apparatus 15 according to the present exemplary embodiment. Feedback control was performed using a predetermined target position pattern, which is a trapezoidal driving pattern with a maximum target speed of 50 mm/s to make 5-mm-stroke reciprocations including positioning operations. The horizontal axes indicate time (sec). The vertical axes indicate the target position in units of encoder pulses (left axes), and the position deviation in units of µm (right axes).

FIG. 11A illustrates the result of control by the trained model 103 trained at a frequency of 95 kHz. FIG. 11B illustrates the result of control by the trained model 103 trained at a frequency of 91 kHz. As described above with reference to FIGS. 45A, 45B, 45C, and 45D, the gradient of the speed varies with the control frequency due to the nonlinear characteristics of the vibration actuator 13. Conventional PID control thus has difficulty in accommodating control at various frequencies.

According to the present exemplary embodiment, a trained model 103 capable of coping with a change in the gradient of the speed curve can be generated by machine learning. Favorable controllability can thus be provided at different frequencies.

Figure 12:
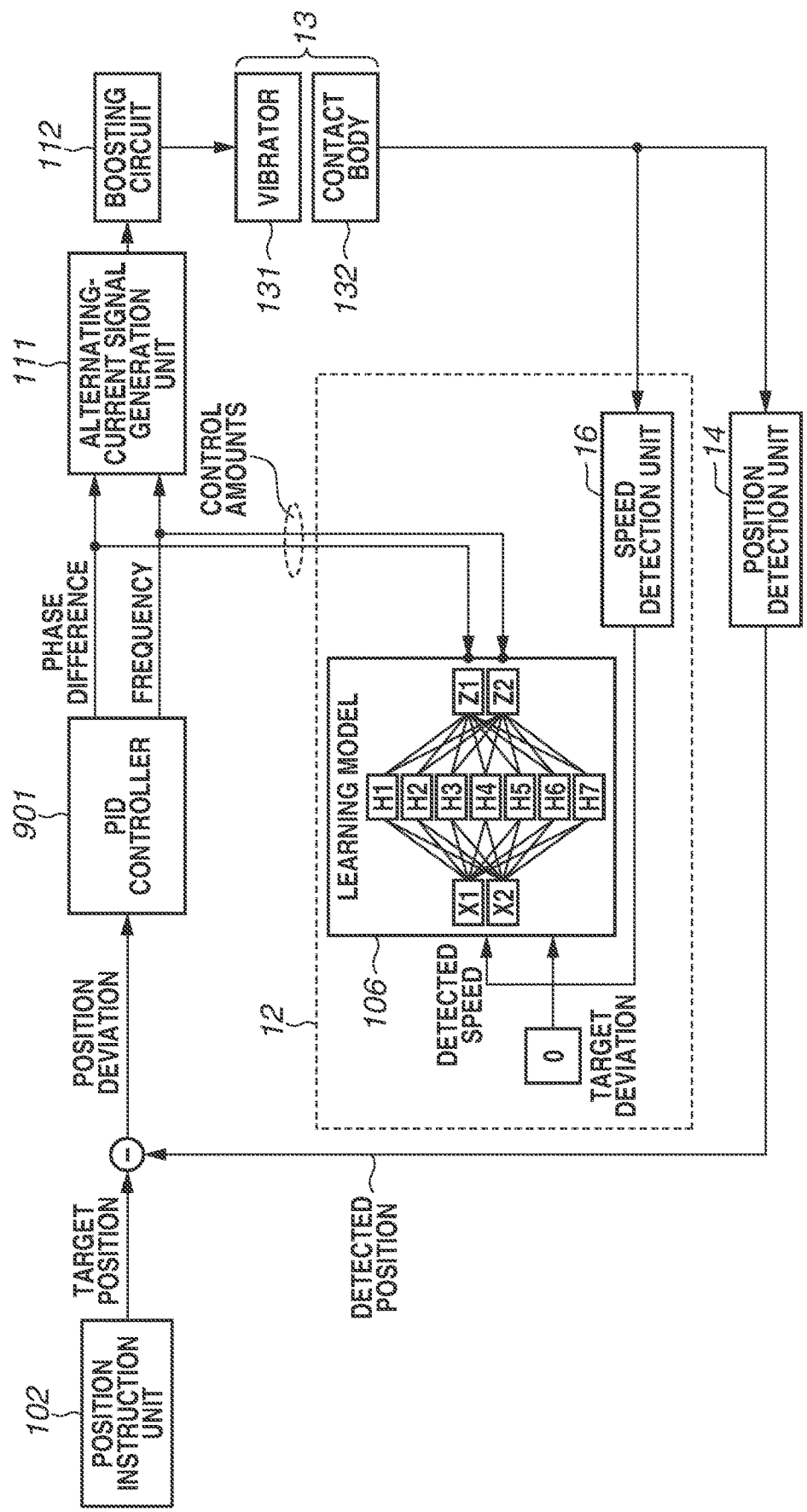
FIG. 12 is a control block diagram of a vibration driving apparatus according to a second exemplary embodiment (where results of control by a PID controller are used as training data).

A second exemplary embodiment of the machine learning according to the present invention will be described. FIG. 12 is a control block diagram of a vibration driving apparatus in a case where a control result of PID control is used as training data. In FIG. 12, the control blocks excluding a vibration actuator 13 constitute a control apparatus. These control blocks perform feedback control on the position of the vibration actuator 13 using a PID controller 901. The PID controller 901 receives a position deviation as an input, and outputs a phase difference and a frequency as PID-calculated control amounts. The controller may have a configuration other than that of a PID controller. For example, proportional (P), proportional-integral (PI), and proportional-derivative (PD) controllers can also be applied.

A machine learning unit 12 trains a learning model 106 using a relative speed (detected speed) detected by a speed detection unit 16 and the control amounts (phase difference and frequency) output from the PID controller 901. The present exemplary embodiment is characterized in that the result of control by the PID controller 901 and the result of control by the trained model (learning model 106) trained using the control amounts of the PID controller 901 as correct answer data can be compared. The comparison with the PID controller 901 enables determination as to whether the learning model 106 is well trained. The reliability of the trained model can thus be guaranteed.

Figure 13:
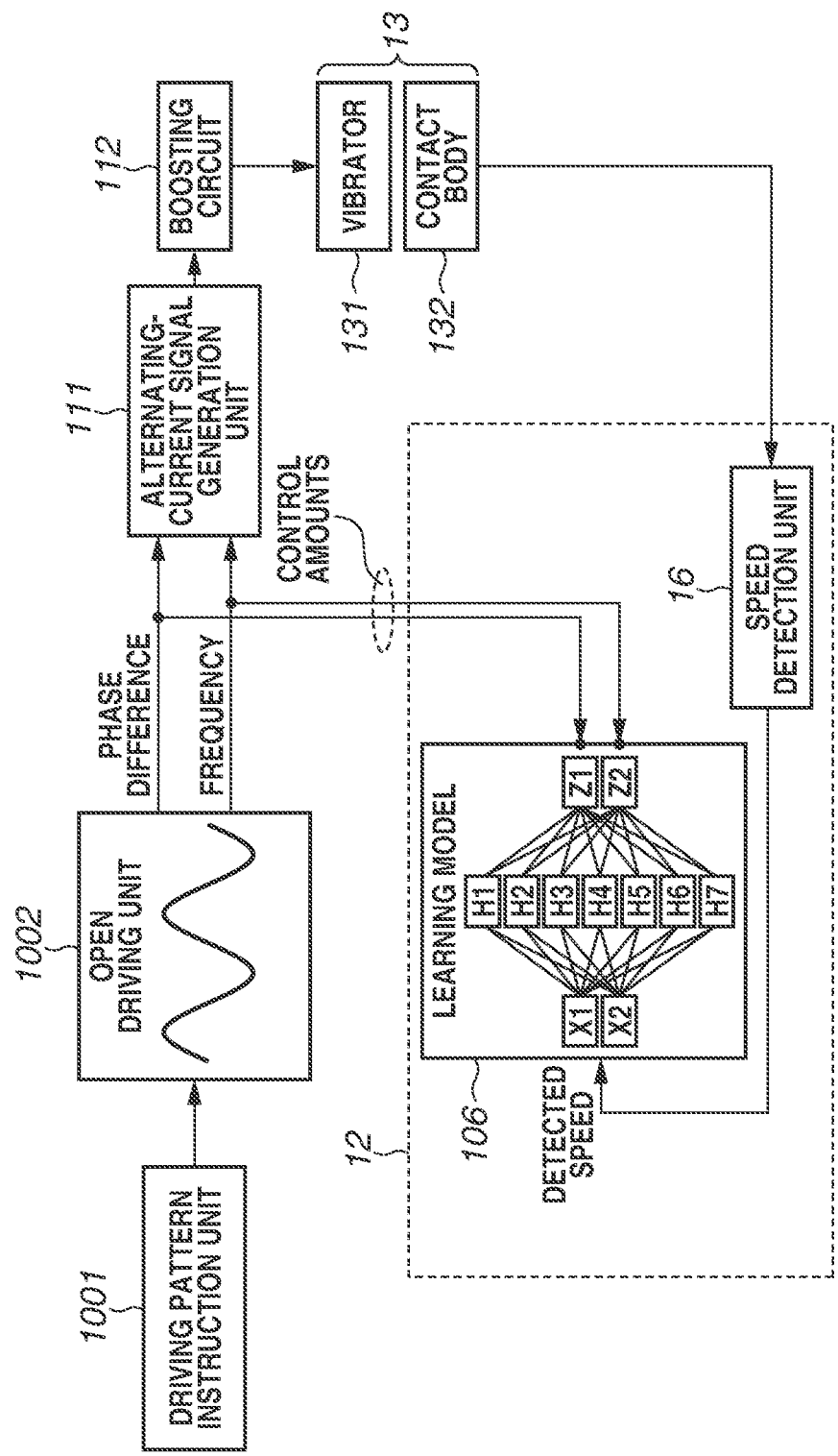
FIG. 13 is a control block diagram of a vibration driving apparatus according to a third exemplary embodiment (where results of control by open driving are used as training data).

A third exemplary embodiment of the machine learning according to the present invention will be described. FIG. 13 is a control block diagram of a vibration driving apparatus in a case where the result of control by open driving is used as training data. In FIG. 13, the control blocks excluding a vibration actuator 13 constitute a control apparatus. These control blocks are characterized in that the vibration actuator 13 is not feedback-controlled.

A pattern waveform generated by a driving pattern generation unit 1001 (driving pattern instruction unit) is output (instructed) from an open driving unit 1002 to an alternating-current signal generation unit 111. For example, signals that repeat a sine wave pattern or a rectangular pattern are used.

In the present exemplary embodiment, a phase-difference sine wave pattern and a frequency sine wave pattern having the same frequency are output. The control performance of a trained model (learning model 106) can be adjusted by adjusting the ratio of the amplitudes of the sine wave patterns. In this example, the phase-difference sine wave pattern has an amplitude of 90°, and the frequency sine wave pattern an amplitude of 1 kHz.

A machine learning unit 12 trains the learning model 106 using a relative speed detected by a speed detection unit 16 and control amounts (phase difference and frequency) output from the open driving unit 1002. The present exemplary embodiment is characterized in that the result of control by the open driving unit 1002 and the result of control by the trained model trained using the control amounts of the open driving unit 1002 as correct answer data can be compared. The comparison with the open driving unit 1002 enables determination as to whether the trained model is well trained. The reliability of the trained model can thus be guaranteed.

Figure 14:
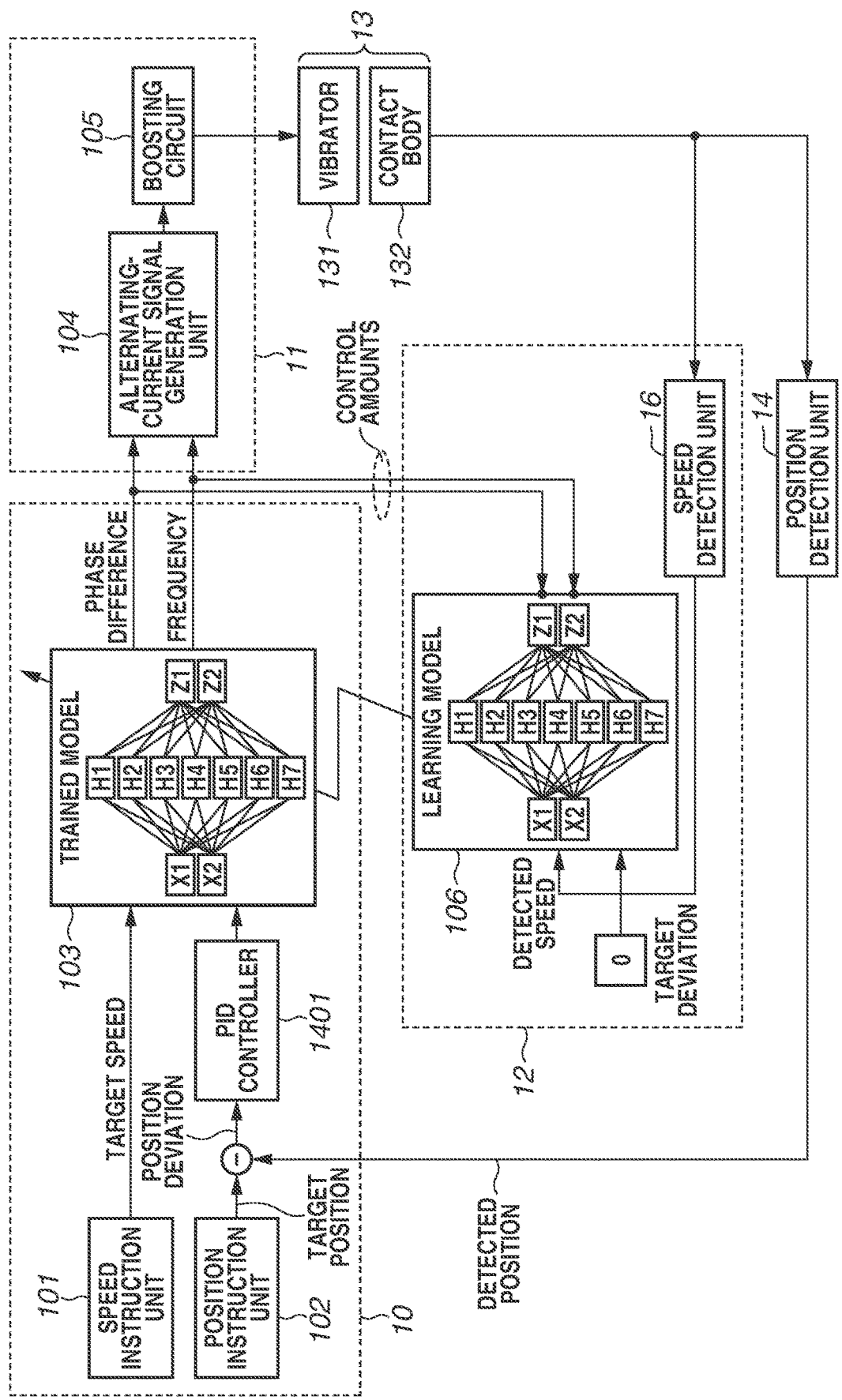
FIG. 14 is a control block diagram of a vibration driving apparatus according to a fourth exemplary embodiment (where a trained model and a PID controller are used in combination).

Another exemplary embodiment (fourth exemplary embodiment) of the control unit 10 according to the first exemplary embodiment illustrated in FIG. 1 will be described. FIG. 14 is a control block diagram of a vibration driving apparatus in a case where a trained model and a PID controller are used in combination. In FIG. 14, the control blocks excluding a vibration actuator 13 constitute a control apparatus. These control blocks perform feedback control on the position of the vibration actuator 13 using a PID controller 1401 (first PID controller) and a trained model 103.

The first PID controller 1401 receives a position deviation as an input, and outputs a PID-calculated position deviation. Configurations other than a PID controller may be used. For example, P, PI, and PD controllers can be applied.

Figure 15:
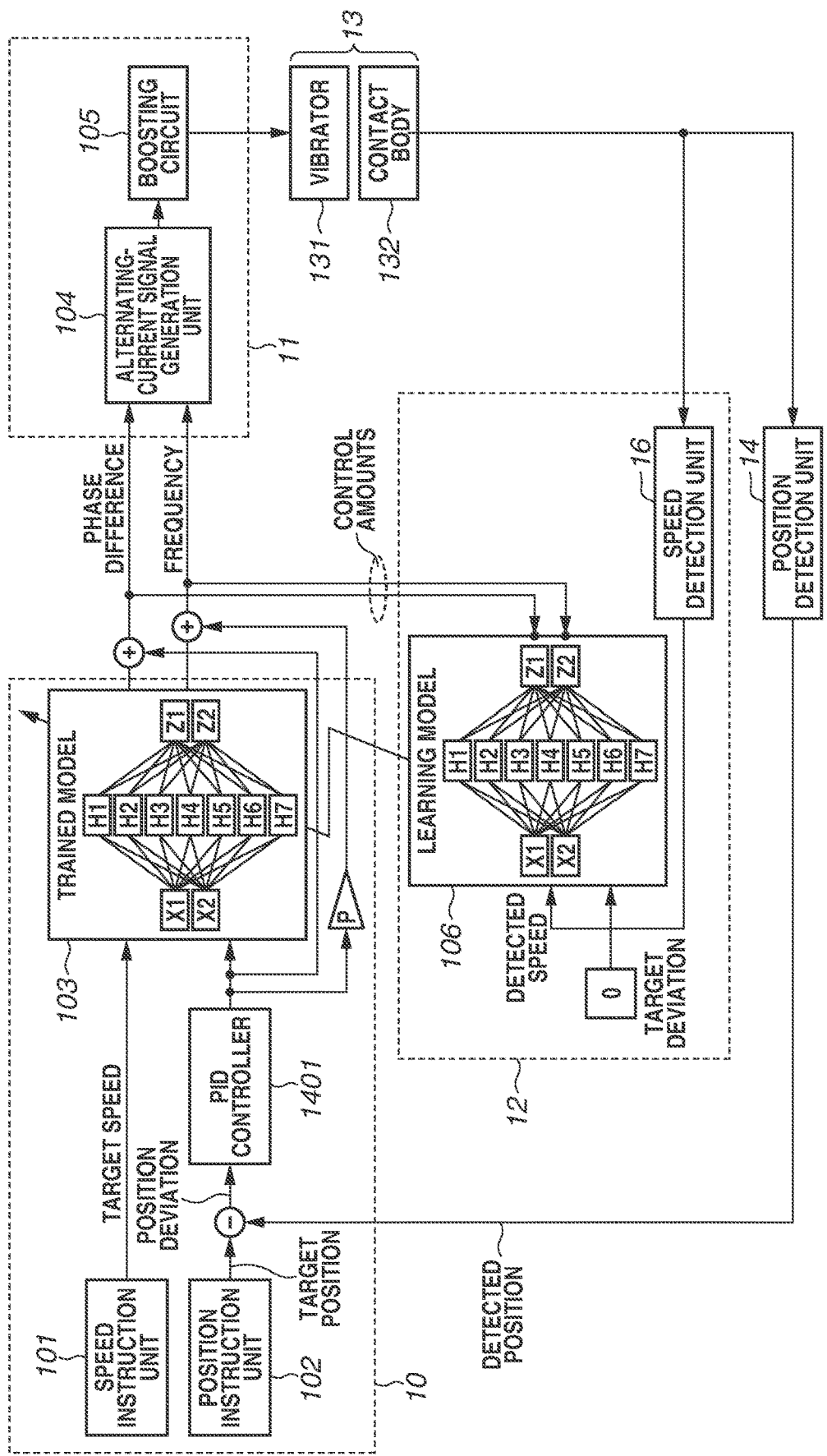
FIG. 15 is a control block diagram of the vibration driving apparatus according to the fourth exemplary embodiment (where the trained model and the PID controller are used in combination, and an output from the PID controller is input to the trained model and added to outputs from the trained model as well).

The trained model 103 receives a target speed and the PID-calculated position deviation as inputs. A machine learning unit 12 trains a learning model 106 using a relative speed detected by a speed detection unit 16 and control amounts (phase difference and frequency) output from the trained model 103. While the trained model 103 receives the PID-calculated position deviation as an input, the PID-calculated position deviation may also be added to the output (control amounts) from the trained model 103 as in a fifth exemplary embodiment to be described below (see FIG. 15). The purpose is to make the PID-calculated amount of the position deviation function in series and in parallel to the trained model 103. The serial component can significantly increase the effect of the position deviation (responsiveness improves). The parallel component can provide the effect of stabilizing the control system. The trained model 103 according to the present exemplary embodiment can thus be configured with PID calculators in series and in parallel, whereby a control system having a high degree of freedom can be constructed.

The application of the present exemplary embodiment enables gain adjustment to the position deviation input to the trained model 103. The control system can thus be more finely adjusted.

Figure 16:
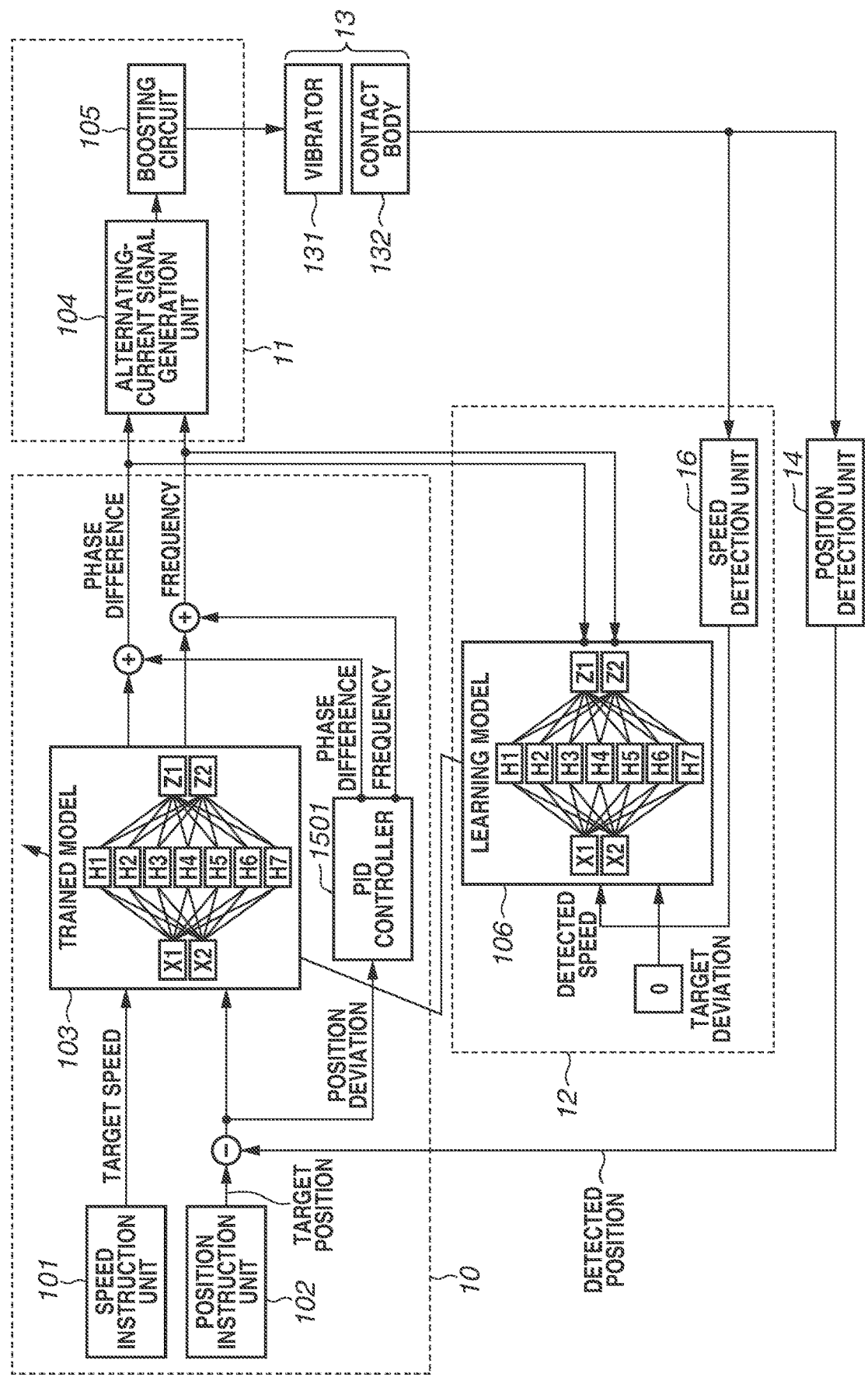
FIG. 16 is a control block diagram of a vibration driving apparatus according to a fifth exemplary embodiment (where a trained model and a PID controller are used in combination).

Another exemplary embodiment (fifth exemplary embodiment) of the control unit 10 according to the first exemplary embodiment illustrated in FIG. 1 will be described. FIG. 16 is a control block diagram of a vibration driving apparatus in a case where a trained model and a PID controller are used in combination. In FIG. 16, the control blocks excluding a vibration actuator 13 constitute a control apparatus. These control blocks perform feedback control on the position of the vibration actuator 13 by adding control amounts output from a PID controller 1501 (second PID controller) and control amounts output from a trained model 103.

The second PID controller 1501 receives a position deviation as an input, and outputs a PID-calculated phase difference and frequency. Configurations other than a PID controller may be used. For example, P, PI, and PD controllers can also be applied. A phase compensator may also be disposed at the stage subsequent to the PID controller 1501. The trained model 103 receives a target speed and the position deviation, but the position deviation may be zero.

The trained model 103 outputs a phase difference and a frequency, to which the phase difference and the frequency output from the second PID controller 1501 are added, respectively. A machine learning unit 12 trains a learning model 106 using the added control amounts and a relative speed detected by a speed detection unit 16.

The application of the present exemplary embodiment enables gain adjustment to the position deviation input to the trained model 103. The control system can thus be finely adjusted.

Figure 17:
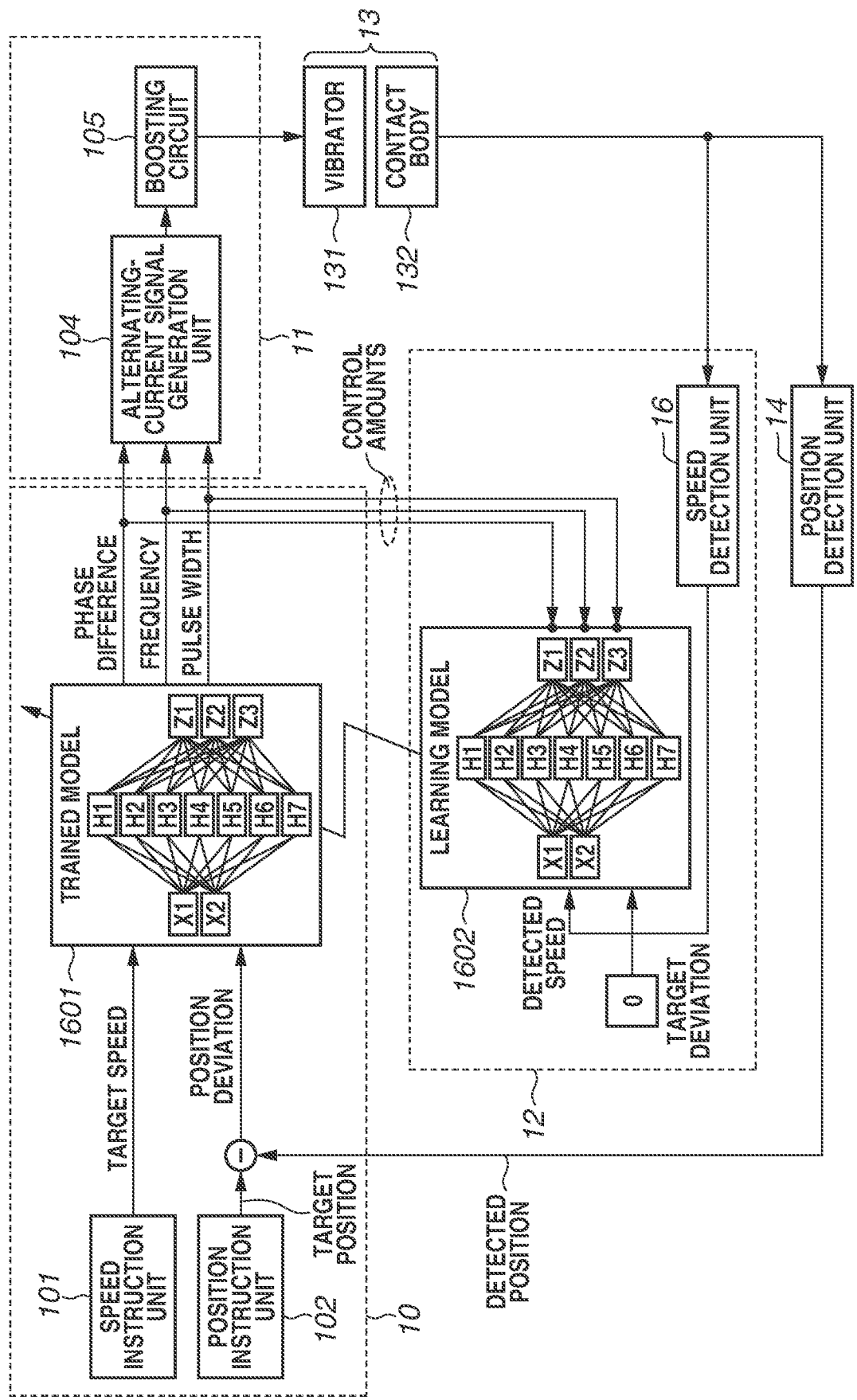
FIG. 17 is a control block diagram of a vibration driving apparatus according to a sixth exemplary embodiment (where control is performed using a trained model trained by machine learning using a phase difference, a frequency, and a pulse width as control amounts).

Another exemplary embodiment (sixth exemplary embodiment) of the control unit 10 according to the first exemplary embodiment illustrated in FIG. 1 will be described. FIG. 17 is a control block diagram of a vibration driving apparatus in a case where control is performed using a trained model trained with a phase difference, a frequency, and a pulse width as control amounts. In FIG. 17, the control blocks excluding a vibration actuator 13 constitute a control apparatus. The control blocks perform feedback control on the position of the vibration actuator 13 using control amounts (phase difference, frequency, and pulse width) output from a trained model 1601.

Figure 18:
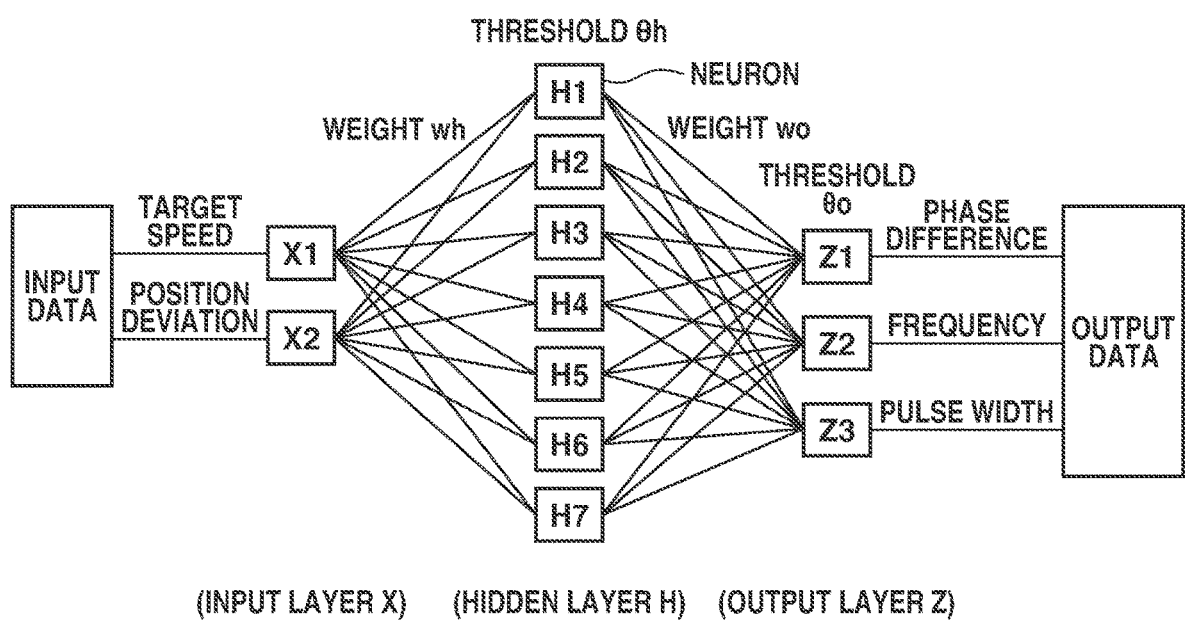
FIG. 18 is a diagram illustrating an NN configuration with the phase difference, the frequency, and the pulse width as outputs.

The trained model 1601 receives a target speed and a position deviation as inputs, and outputs the phase difference, the frequency, and the pulse width calculated by the NN to a driving unit 11, whereby the vibration actuator 13 is controlled. A machine learning unit 12 obtains the three control amounts output from the trained model 1601 and a relative speed detected by a speed detection unit 16 as learning data, and performs machine learning using a learning model 1602. FIG. 18 is a diagram illustrating an NN configuration with the phase difference, the frequency, and the pulse width as outputs. The trained model 1601 and the learning model 1602 include the NN configuration with the target speed and the position deviation as inputs and the three control amounts as outputs. The training data used in the machine learning may be measurement data resulting from the control by the trained model 1601 as described above, or measurement data obtained in a case where the vibration actuator 13 is controlled using an untrained model of which parameters are set using a random function. Alternatively, measurement data obtained by open driving or measurement data obtained by PID control may be used.

In determining the weights and thresholds of the NN, condition parameters optimum in terms of the position deviation and power consumption may be selected from a plurality of pieces of training data. The reason is that there are an indefinite number of combinations of conditions, namely, the phase difference, the frequency, and the pulse width, at which the vibration actuator 13 provides a predetermined speed.

The application of the present exemplary embodiment increases the parameters to operate the vibration actuator 13 with. The control performance can thus be finely adjusted by performing appropriate machine learning.

Figure 19:
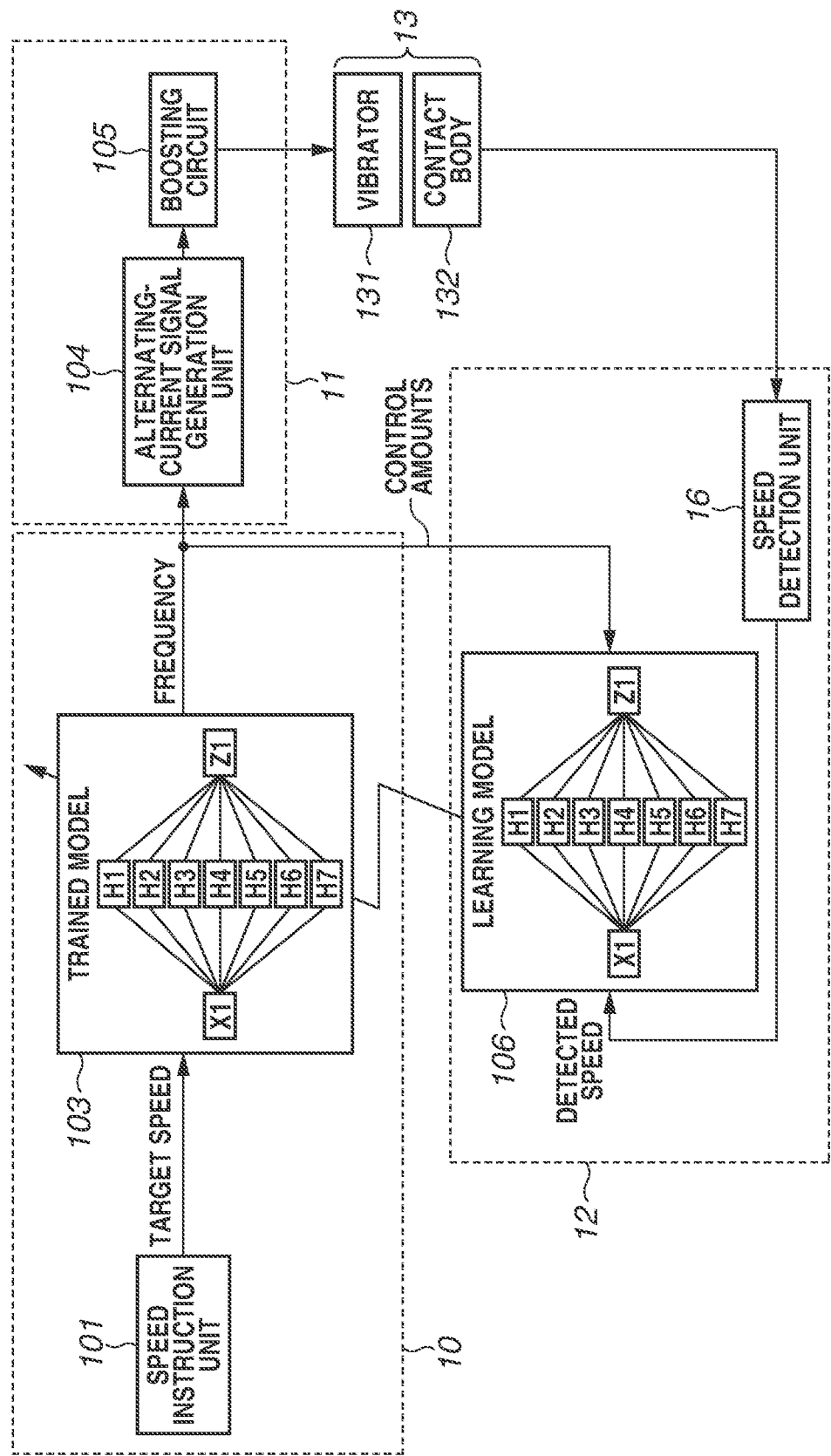
FIG. 19 is a control block diagram of a vibration driving apparatus according to a seventh exemplary embodiment.
Figure 20A:
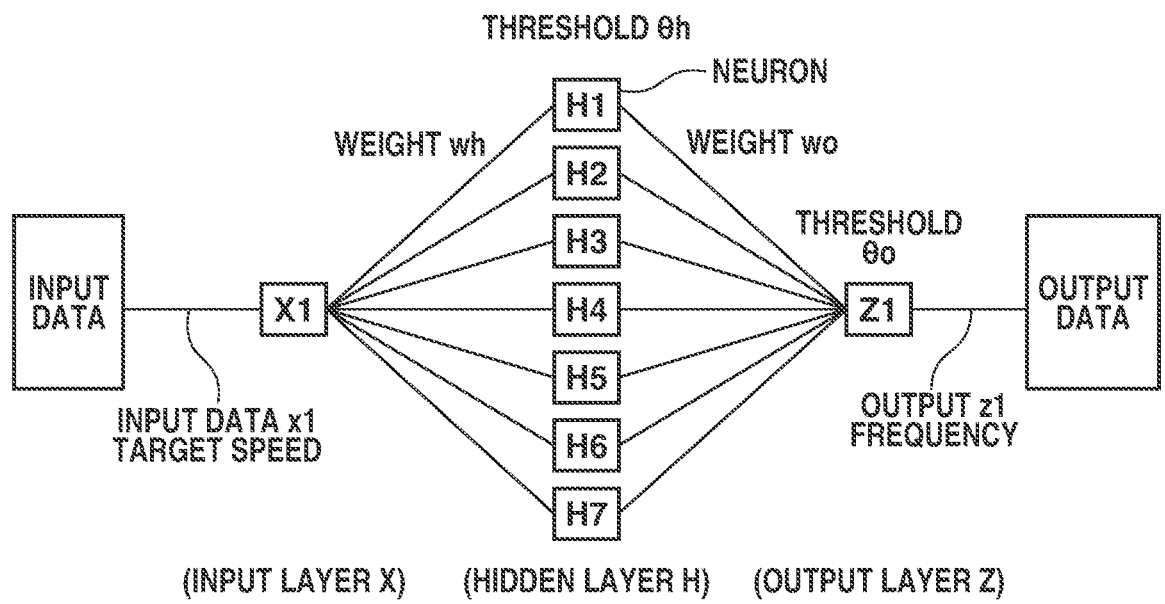
FIG. 20A is a diagram illustrating an NN configuration of a learning model and a trained model according to the seventh exemplary embodiment.
Figure 20B:
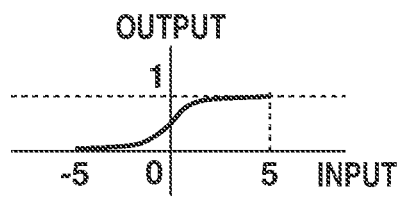
FIG. 20B is a diagram illustrating the NN configuration of the learning model and the trained model according to the seventh exemplary embodiment.
Figure 20C:
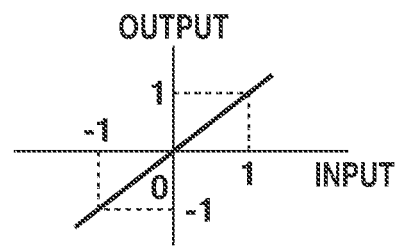
FIG. 20C is a diagram illustrating the NN configuration of the learning model and the trained model according to the seventh exemplary embodiment.

Another exemplary embodiment (seventh exemplary embodiment) of the control unit 10 according to the first exemplary embodiment illustrated in FIG. 1 will be described. FIG. 19 corresponds to the control block diagram of the vibration driving apparatus 17 of FIG. 1 from which the position instruction unit 102 and the position detection unit 14 are omitted. In FIG. 19, the control blocks excluding a vibration actuator 13 constitute a control apparatus. FIGS. 20A to 20C are diagrams illustrating an NN configuration of a learning model 106 and a trained model control unit 10 used in FIG. 19.

Even with such a configuration, a trained model 103 can be generated as in the foregoing exemplary embodiments.

Figure 21:
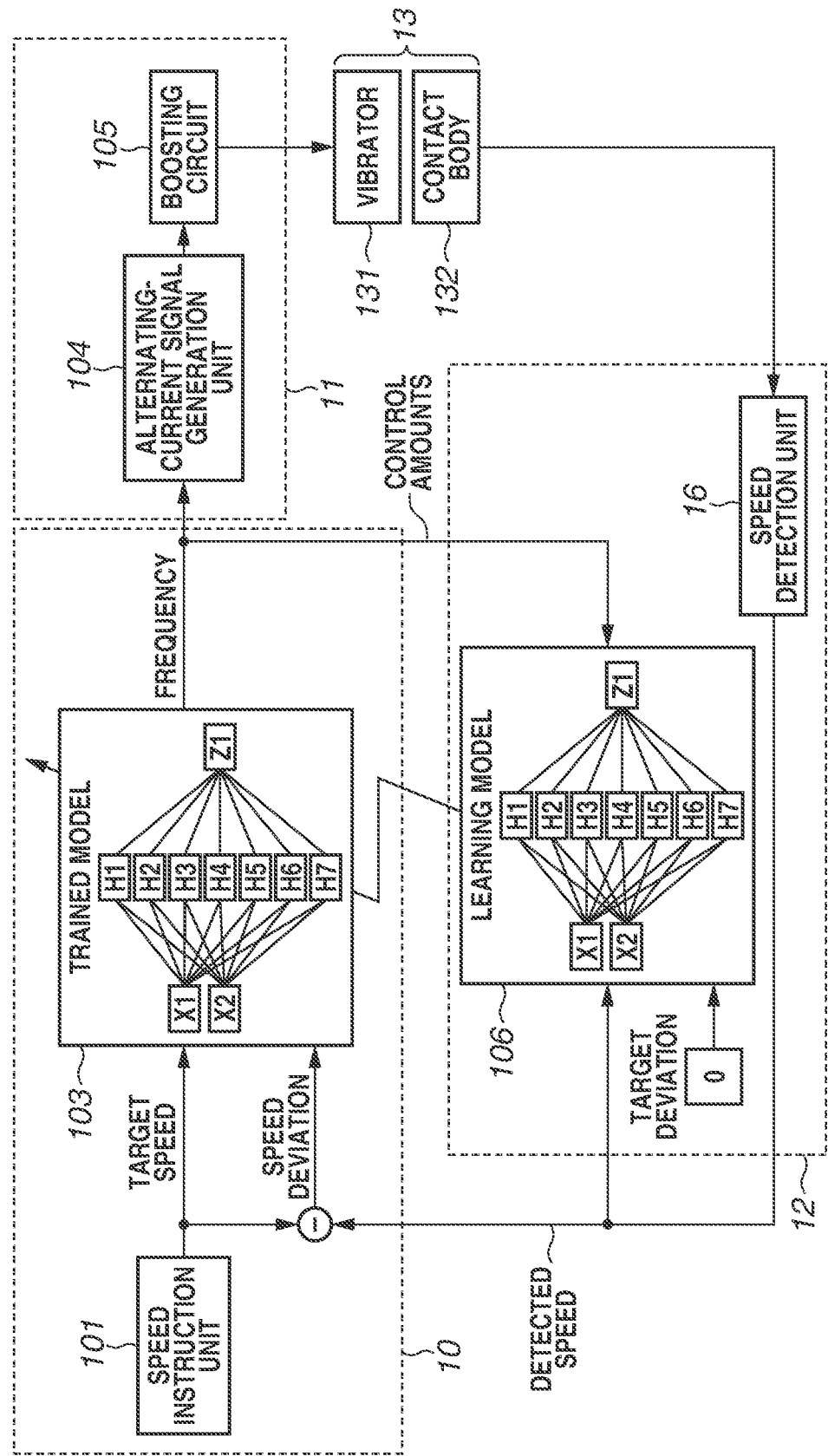
FIG. 21 is a control block diagram of a vibration driving apparatus according to an eighth exemplary embodiment.
Figure 22A:
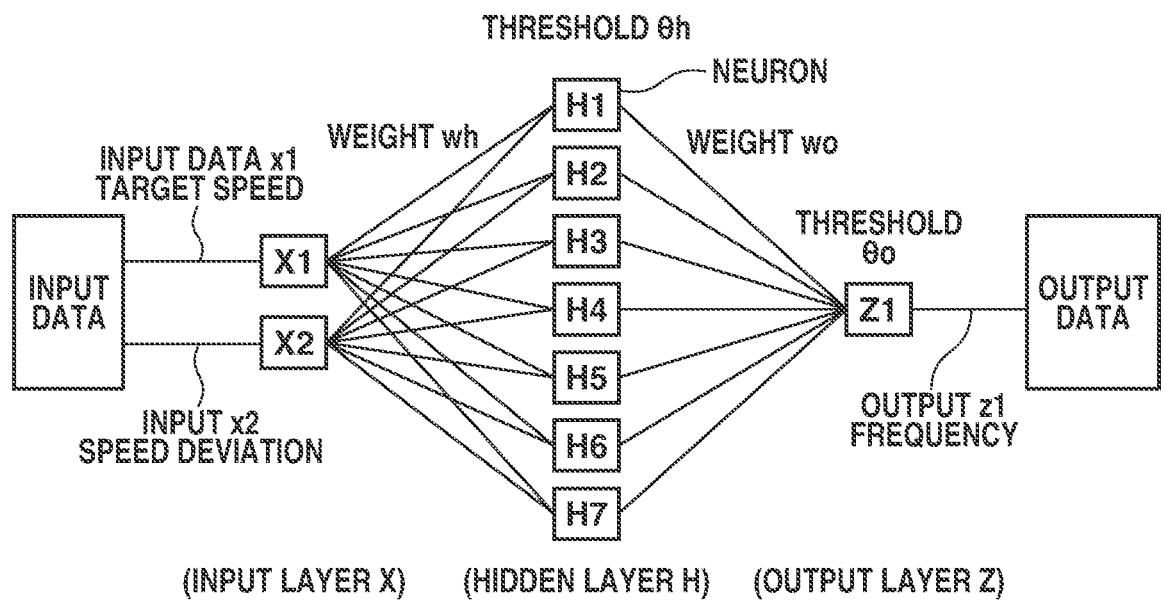
FIG. 22A is a diagram illustrating an NN configuration of a learning model and a trained model according to the eighth exemplary embodiment.
Figure 22B:
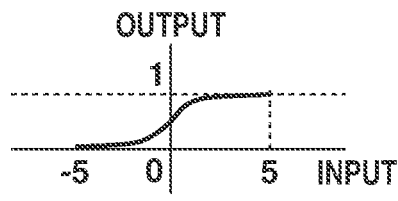
FIG. 22B is a diagram illustrating the NN configuration of the learning model and the trained model according to the eighth exemplary embodiment.
Figure 22C:
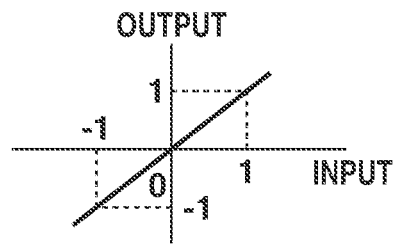
FIG. 22C is a diagram illustrating the NN configuration of the learning model and the trained model according to the eighth exemplary embodiment.

Another exemplary embodiment of the control unit 10 according to the first exemplary embodiment illustrated in FIG. 1 will be described. FIG. 21 corresponds to the control block diagram of the vibration driving apparatus 17 of FIG. 1 from which the position instruction unit 102 and the position detection unit 14 are omitted and where feedback control using a speed deviation is performed instead of the feedback control using a position deviation. In FIG. 21, the control blocks excluding a vibration actuator 13 constitute a control apparatus. FIGS. 22A to 22C are diagrams illustrating an NN configuration of a learning model 106 and a trained model control unit 10 used in FIG. 21.

Even with such a configuration, a trained model 103 can be generated as in the foregoing exemplary embodiments.

An eighth exemplary embodiment will be described. If, in the foregoing exemplary embodiments, the control apparatus includes a control amount output unit including a trained model trained to output first control amounts when an instruction about a first speed is issued, the machine learning unit 12 may be omitted from the control apparatus. Such a control apparatus 15 has a disadvantage of being unable to train the trained model again. However, the simpler configuration without the machine learning unit 12 is advantageous if the vibration driving apparatus is less likely to perform the machine learning again.

In the foregoing exemplary embodiments, a storage unit for storing the parameters of the trained model (the first weights, the second weights, the thresholds for the second neurons, and the thresholds for the third neurons) may be included. The trained model may be trained by replacing the parameters of the trained model with those stored in the storage unit. A memory such as a read-only memory (ROM) is used as the storage unit. However, this is not restrictive. Any storage unit that can store the parameters of the trained model may be used.

In the foregoing exemplary embodiments, an environment sensor for detecting a state of an environment may be included. The trained model may be trained if the environment sensor detects a change in the environment. The environment sensor may be at least either one of a temperature sensor and a humidity sensor.

Figure 23:
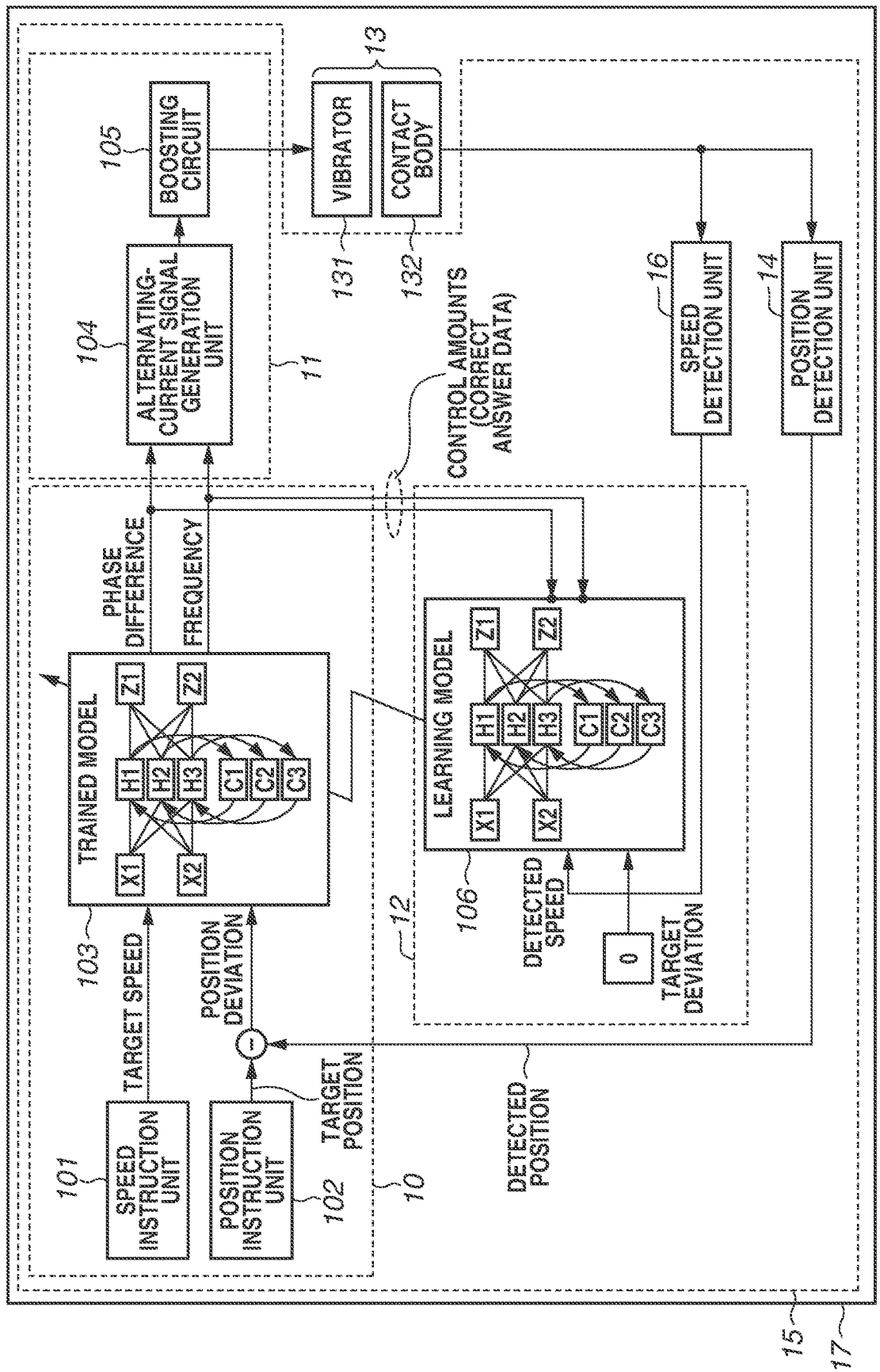
FIG. 23 is a control block diagram of a vibration driving apparatus according to a ninth exemplary embodiment.

FIG. 23 is a control block diagram of a vibration driving apparatus according to a ninth exemplary embodiment. A vibration driving apparatus 17 includes a control apparatus 15 and a vibration actuator 13. In FIG. 23, the control apparatus 15 refers to the vibration driving apparatus 17 excluding the vibration actuator 13.

The control apparatus 15 includes a trained model control unit 10 (control unit) for controlling the vibration actuator 13, a driving unit 11, a machine learning unit 12 including a learning model 116, a position detection unit 14, and a speed detection unit 16. The driving unit 11 includes an alternating-current signal generation unit 104 and a boosting circuit 105.

The vibration actuator 13 includes a vibrator 131 and a contact body 132. The speed detection unit 16 detects a speed (relative speed) of the contact body 132 relative to the vibrator 131. The position detection unit 14 detects a position (relative position) of the contact body 132 relative to the vibrator 131. An absolute encoder or an incremental encoder is used as the position detection unit 14. However, the position detection unit 14 is not limited thereto. The speed detection unit 16 is not limited to one that directly detects speed information (speed sensor), and may be one that indirectly detects speed information through calculation of position information.

The control unit 10 is configured to be able to generate signals for controlling driving of the vibrator 131 (relative movement of the contact body 132 with respect to the vibrator 131). More specifically, a target speed and a position deviation are input to a trained model 113, and the resulting outputs, namely, an output phase difference and a frequency, are used as control amounts (first control amounts) of the vibration actuator 13. The target speed refers to a speed set for an actual speed (detected speed) to follow in relatively moving the contact body 132 with respect to the vibrator 131. The position deviation refers to a difference between a target position and an actual position (detected position). The target position refers to a position set for the actual position (detected position) to follow in relatively moving the contact body 132 with respect to the vibrator 131. A pulse width for changing a voltage amplitude may be used as a control amount.

The control unit 10 includes a speed instruction unit 101 that issues an instruction about the target speed, and a position instruction unit 102 that issues an instruction about the target position. The control unit 10 also includes a control amount output unit 103 including a trained model that receives the target speed and the position deviation as inputs and outputs the phase difference and the frequency. The "control amount output unit including the trained model" will hereinafter be also referred to simply as a "trained model".

The driving unit 11 incudes the alternating-current signal generation unit 104 and the boosting circuit 105.

The speed instruction unit 101 generates a target speed at each unit time and issues an instruction about the target speed. The position instruction unit 102 generates a target position at each unit time and issues an instruction about the target position. A difference between the target position and the detected position detected by the position detection unit 14 at each unit time is calculated as the position deviation. The difference is given by the detected position at each unit time—the target position at each unit time.

For example, the target speed and the target position are generated at each control sampling period that is the unit time. Specifically, the speed instruction unit 101 outputs an instruction value indicating the target speed at each control sampling period. The position instruction unit 102 outputs an instruction value indicating the target position at each control sampling period. These instruction values may be values associated with the target speed and the target position instead of the target speed and the target position themselves.

The control sampling period refers to one cycle from the acquisition of a position deviation in FIG. 23 to immediately before a start of acquisition of another position deviation through the output of the control amounts, the application of alternating-current voltages to the vibrator 131, and the detection of the actual speed (detected speed) and the actual position (detected position). The position or speed of the vibration actuator 13 is feedback-controlled in the foregoing cycle. Note that the target speed may be generated by differentiating the target position at each unit time. Conversely, the target position may be generated by integrating the target speed.

The trained model 113 calculates the control amounts (phase difference and frequency) using the target speed and the position deviation, and outputs the control amounts. The trained model 113 has a recurrent neural network (RNN) structure illustrated in FIGS. 24A, 24B, and 24C. An RNN includes an input layer X, a hidden layer H, an output layer Z, and a state layer C, and has a deep learning structure. The present exemplary embodiment is characterized by the application to the feedback control of the vibration actuator 13, taking advantage of the characteristic of an RNN that machine learning is performed while storing time-series information. In the present exemplary embodiment, input data is set so that the target speed is input x1 and the position deviation is input x2. Output data is set so that the phase difference is output z1 and the frequency is output z2.

The input layer X includes two neurons (X1 and X2), the hidden layer H seven neurons (H1, H2, . . . , and H7), and the output layer Z two neurons (Z1 and Z2). A typical sigmoid function (FIG. 24B) is used as the activation function. The number of neurons in the hidden layer H is not limited to seven, and desirably in the range of 3 to 20. The reason is that there is a trade-off between the leaning accuracy and the leaning speed. The smaller the number of neurons in the hidden layer H, the lower the leaning accuracy but the faster the training convergence (the higher the leaning speed). The greater the number of neurons in the hidden layer H, the more improved the leaning accuracy but the lower the leaning speed. While a sigmoid function or ReLU (ramp function) is typically used as the activation function of an output layer, a linear function (FIG. 24C) is used here to cope with the negative sign of the phase difference that is a control amount.

The state layer C includes seven neurons (C1, C2, . . . , and C7). The outputs of the hidden layer H are retained in the respective neurons of the state layer C. In other words, the pieces of time-series data at the previous control sampling are retained. The data retained in the state layer C is made to recur to the hidden layer H at the next control sampling. Specifically, the data (target speed and position deviation) from the input layer X and the retained data from the state layer C are multiplied by respective weights and input to the hidden layer H. As a result, the output data (phase difference and frequency) is calculated with the past time-series data stored.

The neurons (first neurons) of the input layer H and the neurons (second neurons) of the hidden layer H are connected with weights (first weights) wh. The thresholds for the neurons (second neurons) of the hidden layer H are θh. The neurons (second neurons) of the hidden layer H and the neurons (third neurons) of the output layer Z are connected with weights wo. The thresholds for the neurons (third neurons) of the output layer Z are θo. The neurons (fourth neurons) of the state layer C and the neurons (second neurons) of the hidden layer H are connected with weights wc. The weights and thresholds applied are values trained by the machine learning unit 12 to be described below. The trained RNN can be regarded as a collection of common feature patterns extracted from time-series data on the actual speed (detected speed) and the control amounts of the vibration actuator 13. The outputs therefore have values obtained by functions with the weights and the thresholds as variables (parameters).

The control amounts (phase difference and frequency) output from the RNN are input to the alternating-current signal generation unit 104, whereby the speed and driving direction of the vibration actuator 13 are controlled. The alternating-current signal generation unit 104 generates two-phase alternating-current signals based on the phase difference, the frequency, and a pulse width.

The boosting circuit 105 includes coils and transformers, for example. The alternating-current signals (alternating-current voltages) boosted to a desired driving voltage by the boosting circuit 105 are applied to a piezoelectric element of the vibrator 131 and drive the contact body 132.

The machine learning in the foregoing step S4 will be further described with reference to FIG. 25. FIG. 25 is a flowchart in a case where Adam is used as a technique (optimization algorithm) for optimizing the RNN parameters. Steps S1 to S5 are similar to those described above with reference to FIG. 8A and subsequent drawings except that the error gradients calculated and used are the error gradients ∇E of the weights (wh, wc, and wo) and the thresholds (θh and θo).

FIGS. 26A, 26B, and 26C compare the results of control in cases where feedback control is performed with a predetermined target position pattern, using the conventional PID control and the control by the trained model 113 according to the present exemplary embodiment. The target position pattern is a trapezoidal driving pattern with a maximum target speed of 50 mm/s to make 5-mm-stroke reciprocations including positioning operations. The horizontal axes indicate time (sec). The vertical axes indicate, in order from above, a phase difference control amount (deg), the detected speed (mm/s) and the speed deviation (mm/s), and the target position (number of encoder pulses: 8000 pls per 1 mm) and the position deviation (μm).

FIG. 26A illustrates the result of control by a vibration actuator control apparatus using a conventional PID controller (see FIG. 45A). For the conventional PID control, the frequency (driving frequency) of the alternating-current voltages applied to the vibration actuator 13 was fixed at 93 kHz. The vibration actuator 13 was controlled by operating only the phase difference.

Between the speed deviation and the position deviation, the position deviation in particular tends to increase in acceleration and deceleration domains. The reason is that the vibration actuator 13 is affected by the inertia of the body to be driven that the vibration actuator 13 drives. It can also be seen that it takes a long time for the position deviation to settle down (for the actual position to stop changing after the target position stops changing). The position deviation can be reduced by further increasing the PID control gain. However, a PID control gain having a certain gain margin and phase margin was applied to provide robustness against a change in the driving condition (use frequency range of 91 kHz to 95 kHz) and the ambient temperature.

Figure 24A:
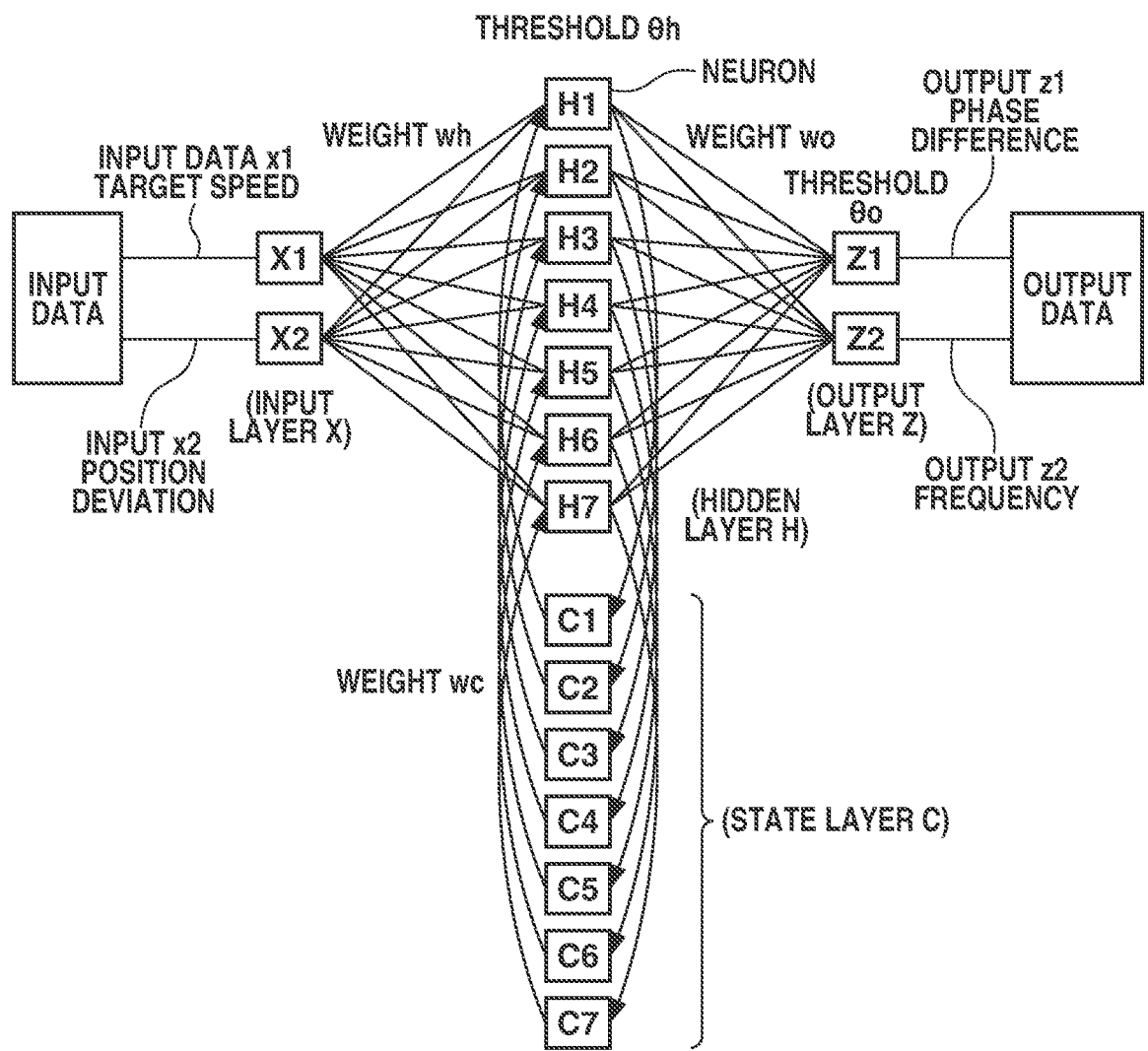
FIG. 24A is a diagram illustrating an H-layer recurrent NN structure of a learning model and a trained model according to the ninth exemplary embodiment.
Figure 24B:
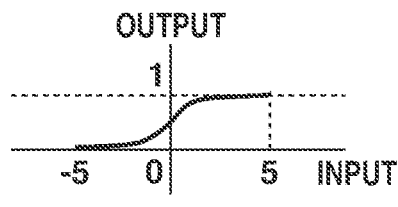
FIG. 24B is a diagram illustrating the H-layer recurrent NN structure of the learning model and the trained model according to the ninth exemplary embodiment.
Figure 24C:
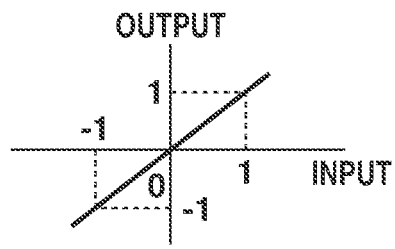
FIG. 24C is a diagram illustrating the H-layer recurrent NN structure of the learning model and the trained model according to the ninth exemplary embodiment.

FIG. 26B illustrates the result of control by a vibration actuator control apparatus (control apparatus 15 in FIG. 23) using the trained model 113 (trained model having an H-layer RNN structure) according to the present exemplary embodiment. The H-layer RNN refers to an NN where the outputs of the hidden layer H are stored in the state layer C and made to recur to the hidden layer H. FIGS. 24A, 24B, and 24C illustrate the H-layer RNN structure.

The control apparatus 15 of the vibration actuator using the trained model 113 according to the present exemplary embodiment performs control by fixing the driving frequency and changing the phase difference. Specifically, the driving frequency ("frequency" in FIG. 23, output z2 in FIG. 24A) was fixed at 93 kHz, and the vibration actuator 13 was controlled by changing the phase difference (the phase difference in FIG. 23, output z1 in FIG. 24A). It was found that the application of the H-layer RNN according to the present exemplary embodiment improved the position deviation in all the domains during acceleration, deceleration, and settling-down.

Figure 36A:
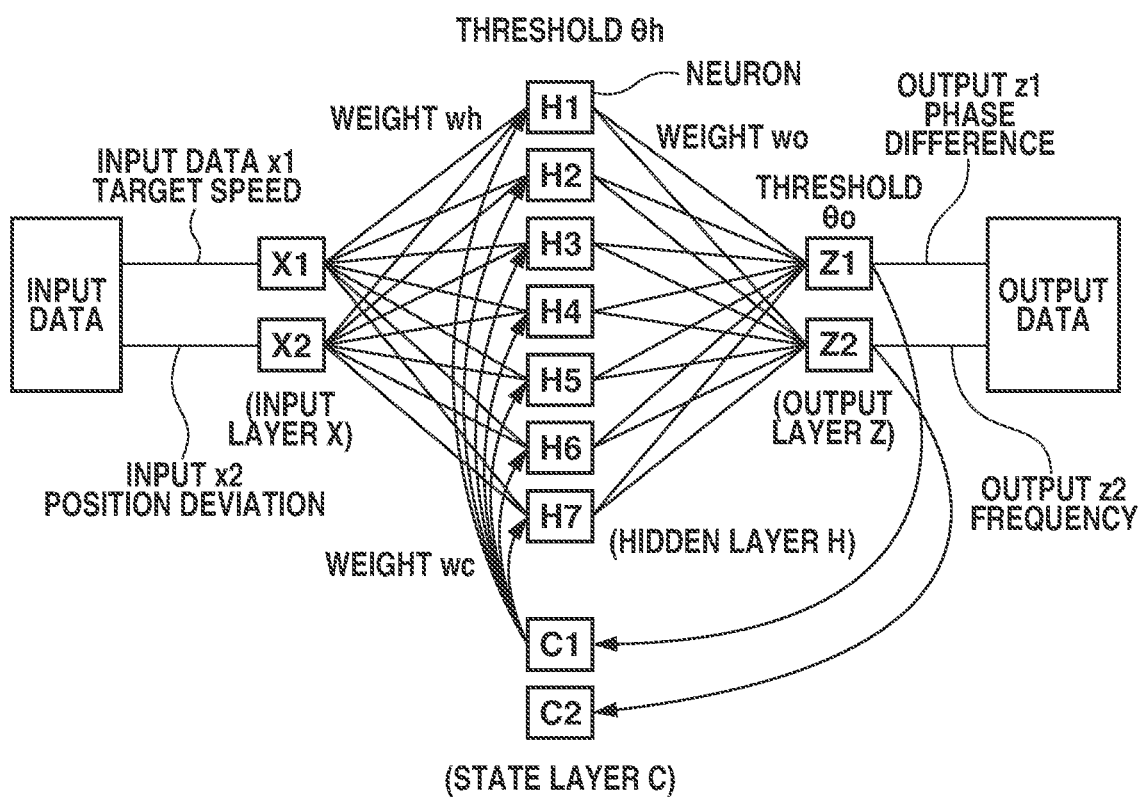
FIG. 36A is a diagram illustrating a Z-layer recurrent NN structure of a learning model and a trained model according to a fifteenth exemplary embodiment (where control is performed using a trained model trained with a phase difference and a frequency as control amounts).
Figure 36B:
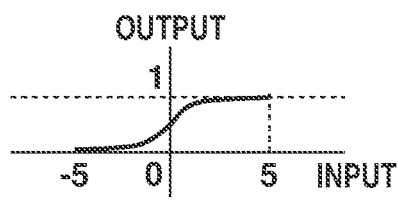
FIG. 36B is a diagram illustrating a Z-layer recurrent NN structure of the learning model and the trained model according to the fifteenth exemplary embodiment (where control is performed using the trained model trained with the phase difference and the frequency as control amounts).
Figure 36C:
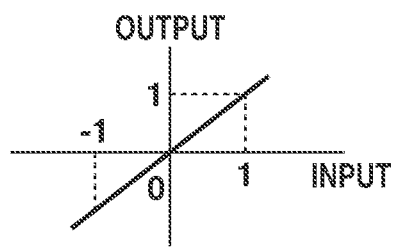
FIG. 36C is a diagram illustrating a Z-layer recurrent NN structure of the learning model and the trained model according to the fifteenth exemplary embodiment (where control is performed using the trained model trained with the phase difference and the frequency as control amounts).

FIG. 26C illustrates the result of control by a vibration actuator control apparatus using a trained model (trained model having a Z-layer RNN structure) according to the present exemplary embodiment (the control apparatus 15 of FIG. 23 where the H-layer RNN trained model 113 and learning model 116 are replaced with Z-layer RNN ones). The Z-layer RNN refers to an NN where the outputs of the output layer Z are stored in the state layer C and made to recur to the hidden layer H. FIGS. 36A, 36B, and 36C illustrate the Z-layer RNN structure.

The control apparatus 15 of the vibration actuator using the foregoing Z-layer RNN trained model according to the present exemplary embodiment performs control by fixing the driving frequency and changing the phase difference. Specifically, the driving frequency ("frequency" in FIG. 23, output z2 in FIG. 36A) was fixed at 93 kHz, and the vibration actuator 13 was controlled by changing the phase difference (the phase difference in FIG. 23, output z1 in FIG. 36A). It was found that the application of the Z-layer RNN according to the present exemplary embodiment improved the position deviation in all the domains during acceleration, deceleration, and setting-down.

In the present exemplary embodiment, the input data is set so that the target speed is input x1 and the position deviation is input x2. The output data is set so that the phase difference is output z1 and the frequency is output z2.

While the case of using the phase difference and the frequency as the control amounts is illustrated for the purpose of description, the output may be the phase difference alone, or the driving frequency ("frequency" in FIG. 23) alone. The pulse width may be used.

The hidden layer H includes seven neurons, and uses a sigmoid function (FIG. 36B) as the activation function. The activation function of the output layer Z is a linear function (FIG. 36C). The state layer C includes two neurons, and the outputs of the output layer Z are retained in the respective neurons of the state layer C. In other words, the pieces of time-series data at the previous control sampling are retained. The data retained in the state layer C is made to recur to the hidden layer H at the next control sampling. Specifically, the data from the input layer X (target speed and position deviation) and the retained data from the state layer C (phase difference and frequency) are multiplied by respective weights and input to the hidden layer H. As a result, the output data (phase difference and frequency) is calculated with the past time-series data stored.

The neurons of the input layer X and the hidden layer H are connected with weights wh. The neurons of the state layer C and the hidden layer H are connected with weights wc. The thresholds for the neurons of the hidden layer H are θh. The neurons of the hidden layer H and the output layer Z are connected with weights wo. The thresholds for the neurons of the output layer Z are θo. All the weights and thresholds applied are values trained by the machine learning unit 12.

It was found that the application of the present exemplary embodiment improved the position deviation in all the domains during acceleration, deceleration, and settling-down.

FIGS. 26B and 26C illustrate imaginary variations in the phase difference due to PID control (top charts). The variations represent the output of a control amount obtained by an observation device performing PID control based on the position deviation, and are not directly used to control the vibration actuator 13. Such a PID control amount can be used to detect a control anomaly of the trained model 113. More specifically, if the control amount output from the trained model 113 is compared with the PID control amount and found to deviate greatly from a predetermined range, the RNN parameters can be predicted to be different from normal values, and the parameters can be reset. This function is not an indispensable configuration in obtaining the effects of the present exemplary embodiment, but can improve reliability in terms of guaranteeing the control performance of the trained model 113.

Figure 27A:
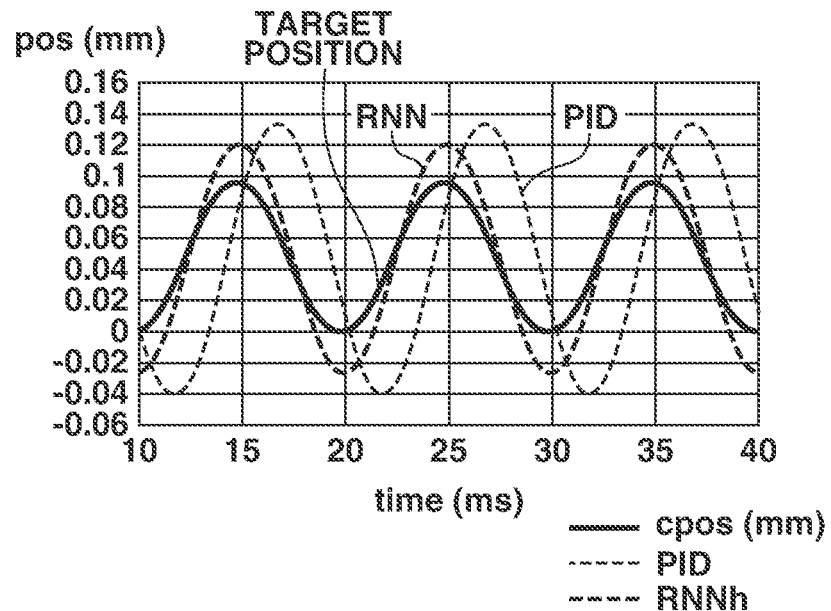
FIG. 27A illustrates a result of a simulation demonstrating high-frequency responsiveness of a control apparatus for a vibration actuator according to the present exemplary embodiment.
Figure 27B:
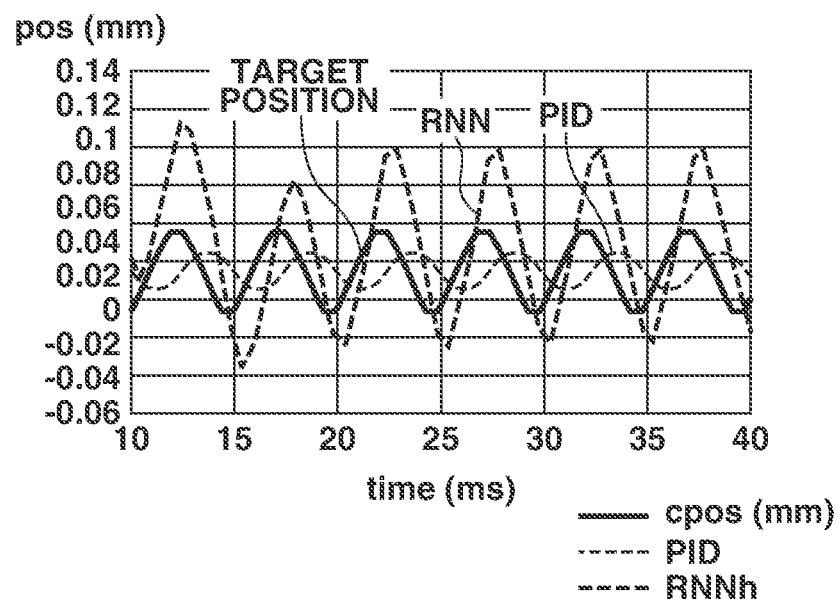
FIG. 27B illustrates a result of a simulation demonstrating high-frequency responsiveness of the control apparatus for the vibration actuator according to the present exemplary embodiment.

FIGS. 27A and 27B illustrate the results of a simulation demonstrating high-frequency responsiveness of the control apparatus 15 for the vibration actuator 13 according to the present exemplary embodiment. Feedback control was performed with a predetermined target position pattern (position instruction values) indicated by the solid-lined sine wave. The target position pattern was a sine wave driving pattern with a maximum target speed of 30 mm/s to make reciprocations over a small distance (50 to 100 µm) at a high frequency (100 Hz or 200 Hz). The horizontal axes indicate time (ms), and the vertical axes position (mm). FIG. 27A illustrates the result of control with position instruction values at 100 Hz. FIG. 27B illustrates the result of control with the 200-Hz target position pattern. It can be seen that the PID control lagged behind the target position pattern greatly in phase and failed to provide sufficient following performance. This is more noticeable the higher the frequency of the target position pattern. By contrast, it can be seen that the RNN control (control by the RNN-based control unit 10) according to the present exemplary embodiment provides favorable followability to the target position pattern. In other words, it can be seen that the RNN control according to the present exemplary embodiment lagged less behind the target position pattern in terms of temporal phase (lagged less behind the target position pattern in phase in the time axis direction) than the PID control. The reason is considered to be that the RNN stores past time-series information and thus improves the prediction accuracy of the control amounts during acceleration and deceleration. A specific description will now be given.

Figure 28A:
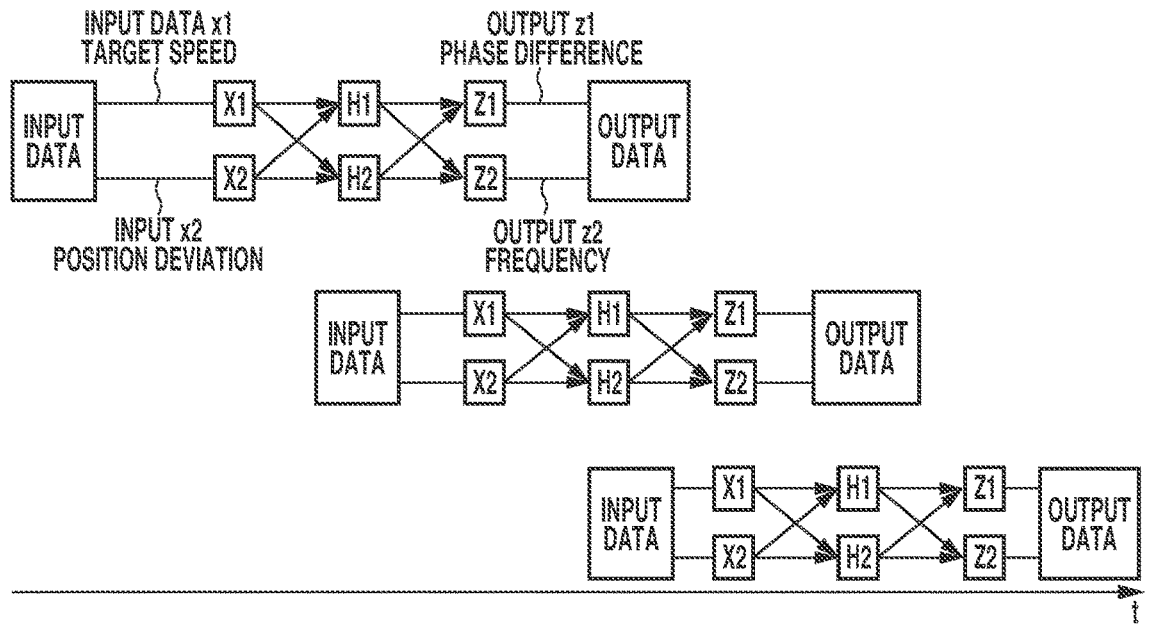
FIG. 28A is a development diagram of an NN structure.

In driving the vibration actuator 13 to follow a target speed, the actual speed (detected speed) inevitably deviates from the target speed (there occurs a following delay in the detected speed). To reduce such a following delay, the control amounts are desirably output based on a predicted target speed. NN control (control by an NN-based control unit) outputs the control amounts based only on the target speed (output from the input layer X) as the speed instruction, and does not predict the target speed (see FIG. 28A).

Figure 28B:
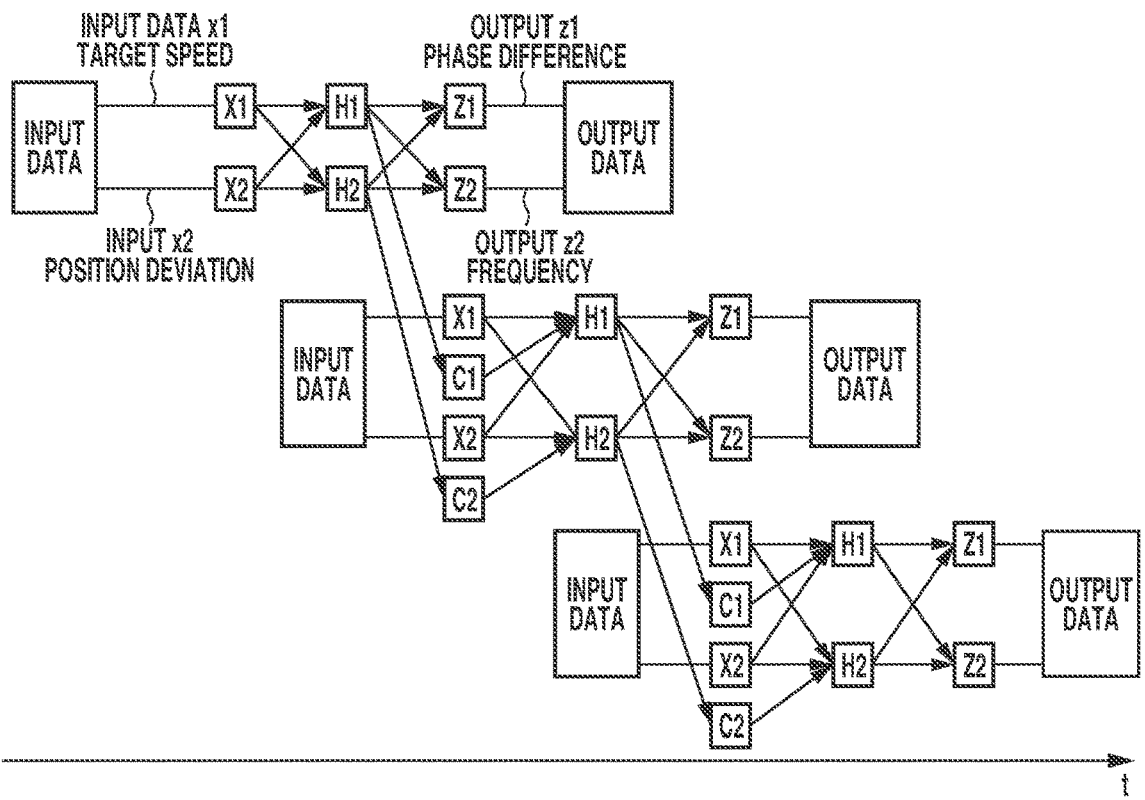
FIG. 28B is a development diagram of an H-layer recurrent NN structure.

By contrast, the RNN control (H-layer RNN control) predicts the target speed by inputting (adding) the outputs from the state layer C (past outputs from the hidden layer H) to the hidden layer H along with the target speed (output from the input layer X). In other words, the outputs from the state layer C are based on the history of the past target speed (include information about the history of the past target speed). The control amounts are thus output with the future target speed predicted by adding such outputs from the state layer C to the current target speed (see FIG. 28B). In FIG. 28B, the number of neurons in the hidden layer H is two for simplicity of the diagram. However, the same applies if the number of neurons in the hidden layer H is three or more.

Figure 28C:
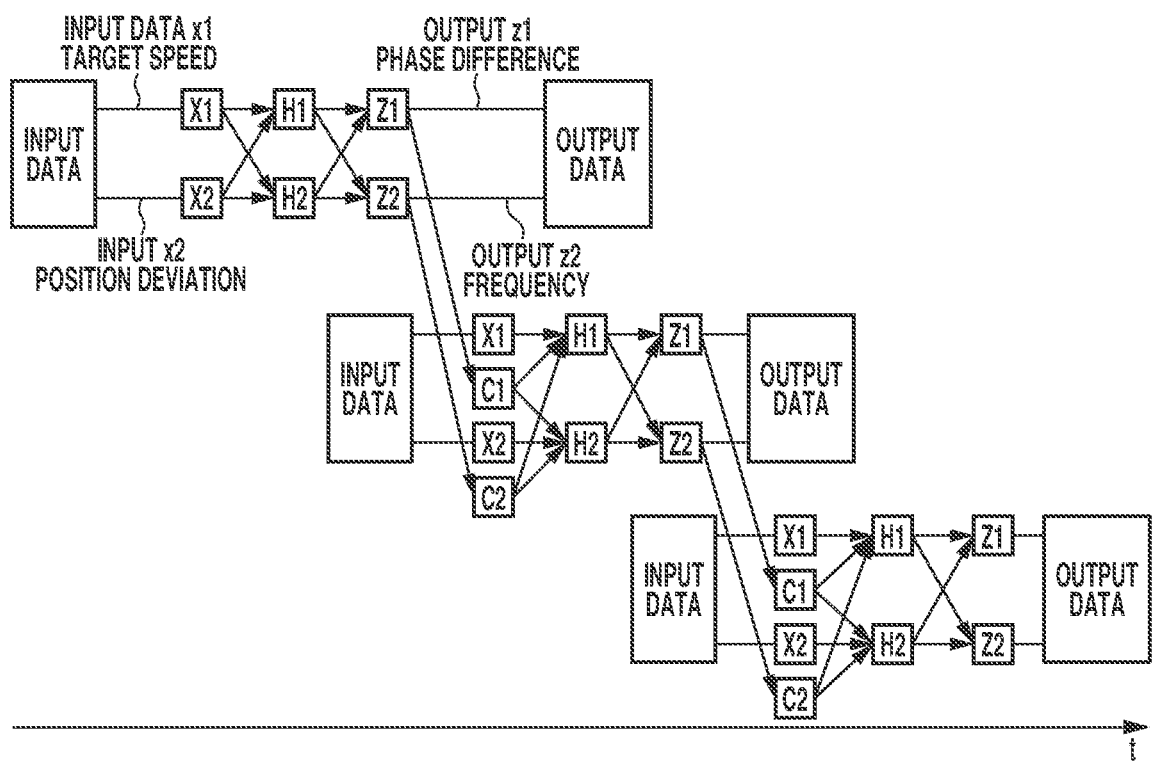
FIG. 28C is a development diagram of a Z-layer recurrent NN structure.

Another RNN control (Z-layer RNN control) predicts the target speed by inputting (adding) the outputs from the output layer Z (past outputs from the output layer Z) to the hidden layer H along with the target speed (output from the input layer X). In other words, the outputs from the state layer C are based on the history of the past target speed (includes information about the history of the past target speed). The control amounts are thus output with the future target speed predicted by adding such outputs from the state layer C to the current target speed (see FIG. 28C). In FIG. 28C, the number of neurons in the hidden layer H is two for simplicity of the diagram. However, the same applies if the number of neurons in the hidden layer H is three or more.

FIGS. 29A and 29B illustrate results indicating robustness of the control apparatus 15 according to the present exemplary embodiment. Feedback control was performed with a predetermined target position pattern, which is a trapezoidal driving pattern with a maximum target speed of 50 mm/s to make 5-mm-stroke reciprocations including positioning operations. The horizontal axes indicate time (sec). The vertical axes indicate the target position in units of encoder pulses (left axes), and the position deviation in units of µm (right axes).

FIG. 29A illustrates the result of control using the trained model 113 trained with a starting frequency of 95 kHz. FIG. 29B illustrates the result of control using the trained model 113 trained with a starting frequency of 91 kHz. As described above with reference to FIGS. 45A, 45B, 45C, and 45D, the conventional PID control has difficulty in coping with different starting frequencies since the speed gradient varies due to the nonlinear characteristics of the vibration actuator 13. By contrast, the present exemplary embodiment can generate a trained model 113 capable of coping with a change in the gradient of the speed curve by machine learning, and can thus provide favorable controllability even with different starting frequencies.

A tenth exemplary embodiment of the machine learning according to the present invention will be described.

Figure 30:
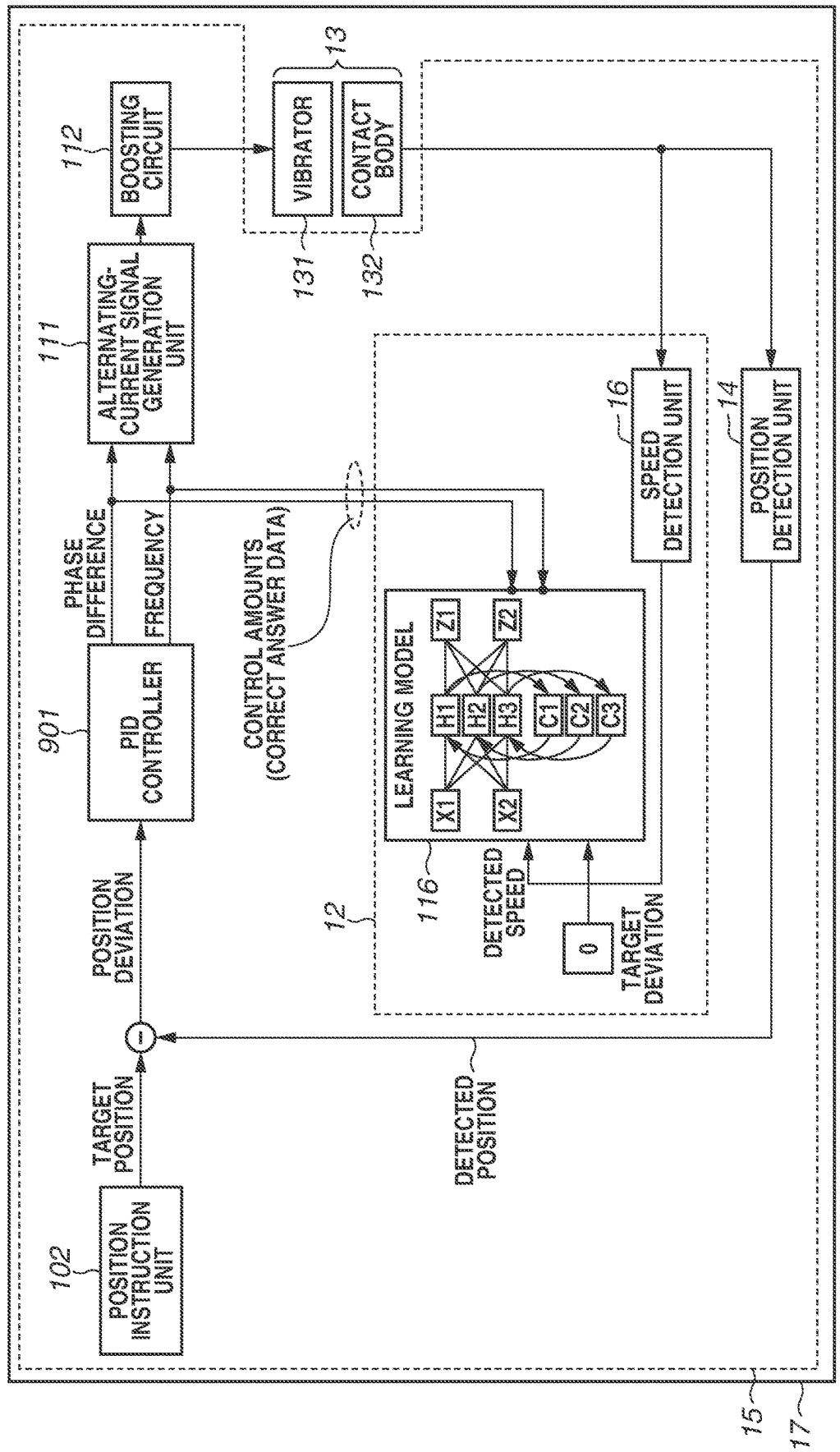
FIG. 30 is a control block diagram of a vibration driving apparatus according to a tenth exemplary embodiment (where results of control by a PID controller are used as training data).

FIG. 30 is a control block diagram in a case where the result of control by a vibration actuator control apparatus using a PID controller is used as training data. These control blocks perform feedback control on the position of a vibration actuator 13 by using a PID controller 901. The PID controller 901 receives a position deviation as an input, and outputs a phase difference and a frequency that are PID-calculated control amounts. Configurations other than a PID controller may be used. For example, P, PI, and PD controllers can be applied.

Like the ninth exemplary embodiment, a machine learning unit 12 trains a learning model 116 using a detected speed detected by a speed detection unit 16 and the control amounts output from the PID controller 901. The present exemplary embodiment is characterized in that the result of control by the PID controller 901 and the result of control by the trained model (learning model 116) can be compared. The comparison with the PID controller 901 enables determination as to whether the trained model is well trained. The reliability of the trained model can thus be guaranteed.

An eleventh exemplary embodiment of the machine learning according to the present invention will be described.

Figure 31:
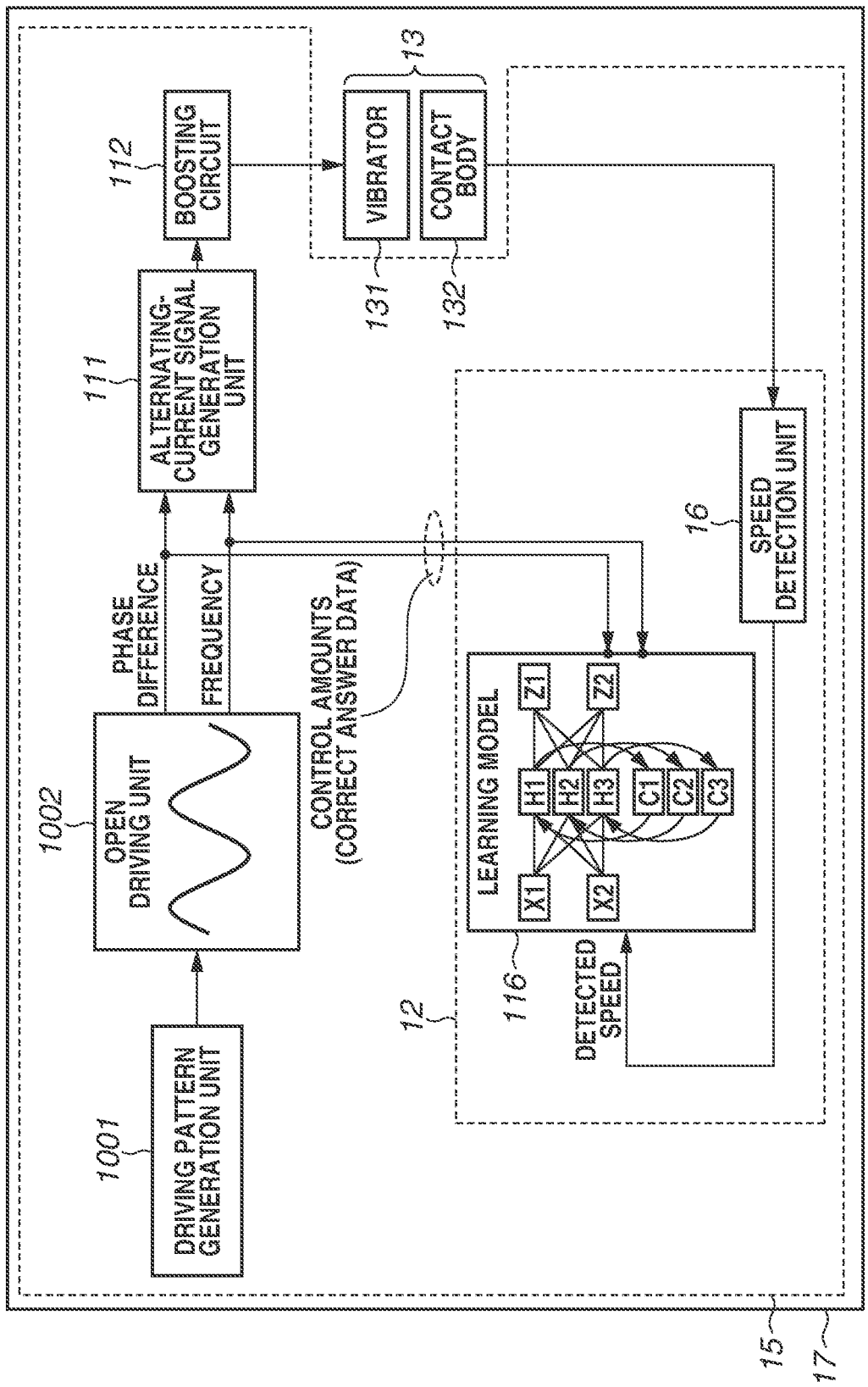
FIG. 31 is a control block diagram of a vibration driving apparatus according to an eleventh exemplary embodiment (where results of control by open driving are used as training data).

FIG. 31 is a control block diagram in a case where the result of control by open driving (the result of control by a vibration actuator control apparatus using an open driving unit) is used as training data. These control blocks are characterized in that a vibration actuator 13 is not feedback-controlled. A pattern waveform generated by a driving pattern generation unit 1001 is output from an open driving unit 1002 to an alternating-current signal generation unit 111. For example, repetitive signals having a sine wave pattern or a rectangular pattern are used. In the present exemplary embodiment, phase-difference and frequency sine wave patterns having the same frequency are output. The control performance of a trained model can be adjusted by adjusting the ratio of the amplitudes of the sine wave patterns. In this example, the phase-difference sine wave pattern has an amplitude of 90°, and the frequency sine wave pattern has an amplitude of 1 kHz.

Like the ninth exemplary embodiment, a machine learning unit 12 trains a learning model 116 using a detected speed detected by a speed detection unit 16 and the control amounts output from the open driving unit 1002. The present exemplary embodiment can use the results obtained during open driving as the training data, and can provide similar effects.

Another exemplary embodiment (twelfth exemplary embodiment) of the control unit 10 according to the ninth exemplary embodiment illustrated in FIG. 23 will be described.

Figure 32:
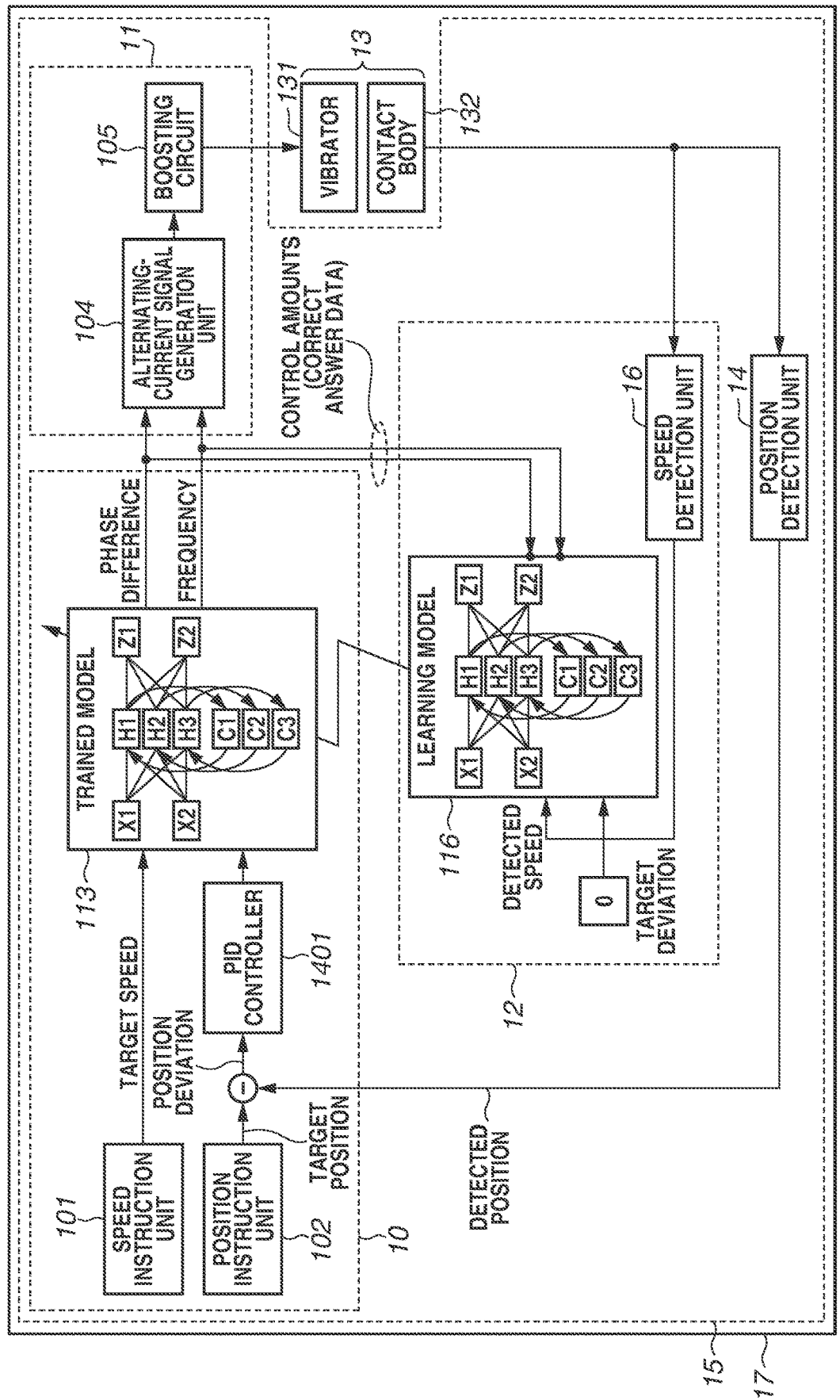
FIG. 32 is a control block diagram of a vibration driving apparatus according to a twelfth exemplary embodiment (where a trained model and a PID controller are used in combination).

FIG. 32 is a control block diagram in a case where a trained model and a PID controller are used in combination. These control blocks perform feedback control on the position of a vibration actuator 13 by using a PID controller 1401 and a trained model 113. The PID controller 1401 receives a position deviation as an input and outputs a PID-calculated position deviation. Configurations other than a PID controller may be used. For example, P, PI, and PD controllers can be applied. The trained model 113 receives a target speed and the PID-calculated position deviation as inputs. A machine learning unit 12 trains a learning model 116 by using a detected speed detected by a speed detection unit 16 and the control amounts output from the trained model 113.

The application of the present exemplary embodiment enables gain adjustment to the position deviation input to the trained model 113. This enables fine adjustments to the control system (adjustments to the control amounts).

Another exemplary embodiment (thirteenth exemplary embodiment) of the control unit 10 according to the ninth exemplary embodiment illustrated in FIG. 23 will be described.

Figure 33:
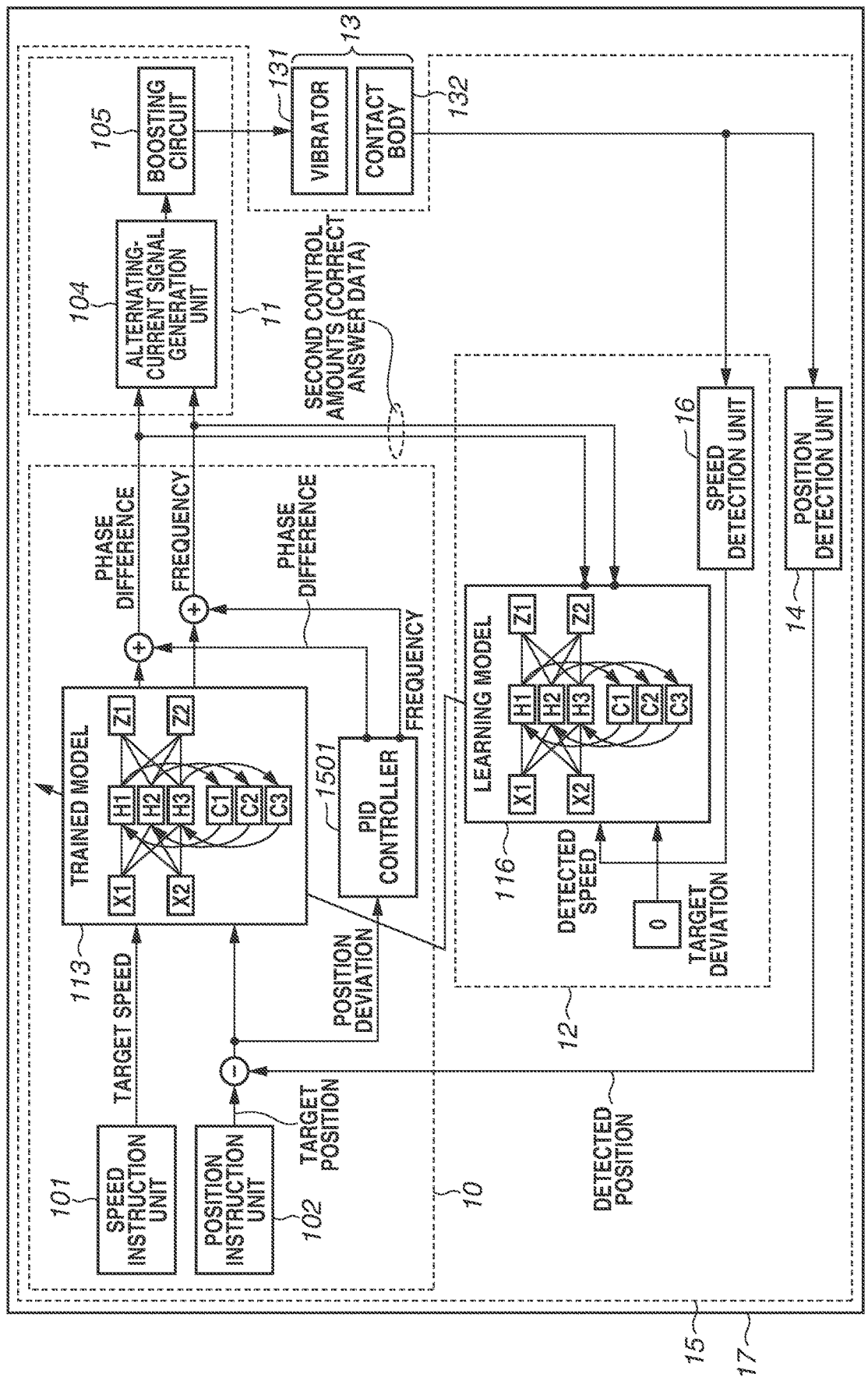
FIG. 33 is a control block diagram of a vibration driving apparatus according to a thirteenth exemplary embodiment (where a trained model and a PID controller are used in combination).

FIG. 33 is a control block diagram in a case where a trained model and a PID controller are used in combination. These control blocks perform feedback control on the position of a vibration actuator 13 by adding the control amounts from a PID controller 1501 and those from a trained model 113. The PID controller 1501 receives a position deviation as an input, and outputs a PID-calculated phase difference and frequency. Configurations other than a PID controller may be used. For example, P, PI, and PD controllers can be applied. A phase compensator may be disposed at the stage subsequent to the PID controller 1501. The trained model 113 receives a target speed and the position deviation as inputs, but the position deviation may be zero. The trained model 113 outputs a phase difference and a frequency, to which the phase difference and the frequency output from the PID controller 1501 are added, respectively. A machine learning unit 12 trains a learning model 116 using the added control amounts and a detected speed detected by a speed detection unit 16.

The application of the present exemplary embodiment enables gain adjustment to the position deviation. This enables fine adjustments to the control system (adjustments to the control amounts).

Another exemplary embodiment (fourteenth exemplary embodiment) of the control unit 10 according to the ninth exemplary embodiment illustrated in FIG. 23 will be described.

Figure 34:
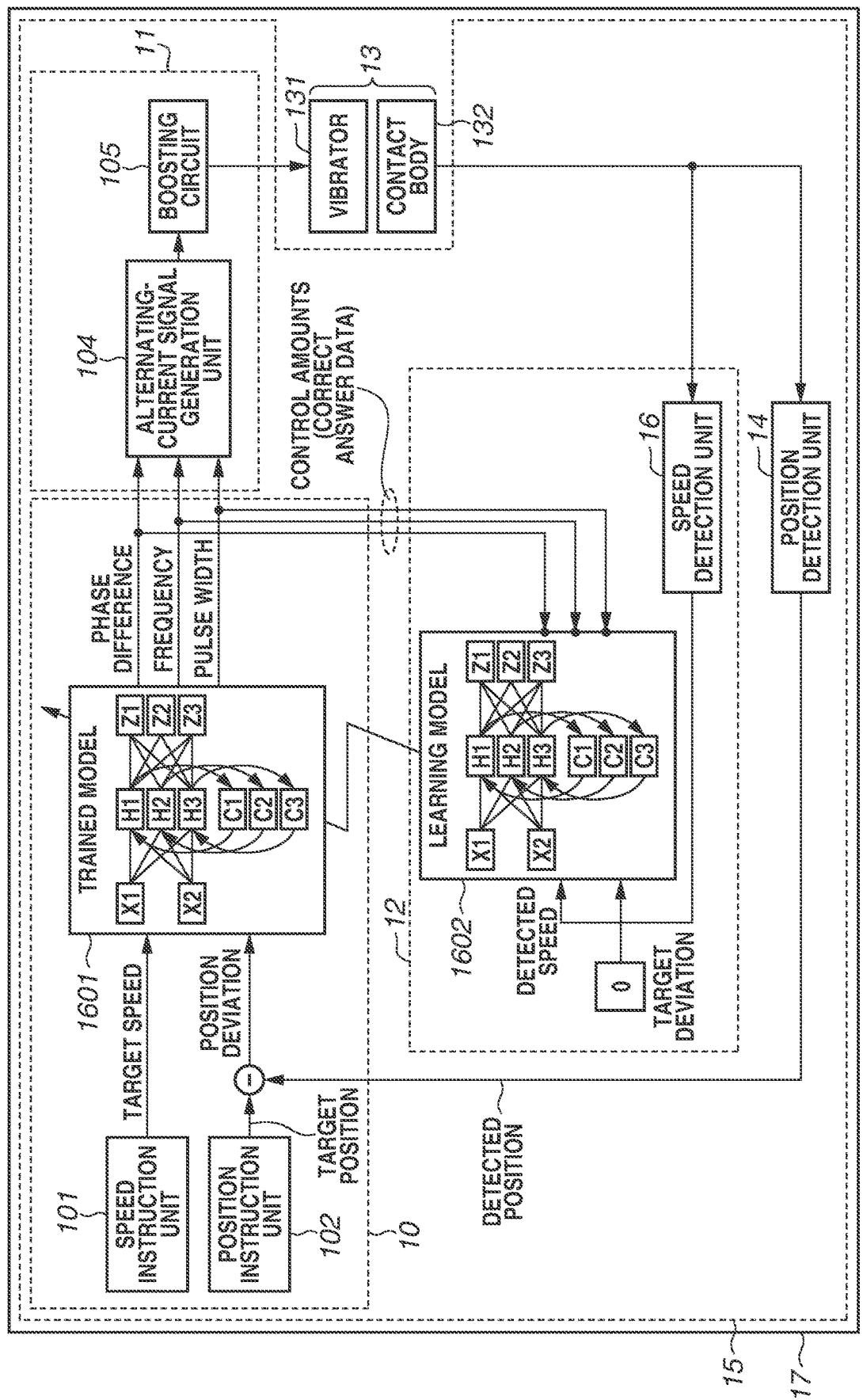
FIG. 34 is a control block diagram of a vibration driving apparatus according to a fourteenth exemplary embodiment (where control is performed using a trained model trained with a phase difference, a frequency, and a pulse width as control amounts).

FIG. 34 is a control block diagram for performing control using a trained model trained with a phase difference, a frequency, and a pulse width as control amounts. These control blocks perform feedback control on the position of a vibration actuator 13 using control amounts (phase difference, frequency, and pulse width) output from a trained model 1601. The trained model 1601 receives a target speed and a position deviation as inputs, and outputs a phase difference, a frequency, and a pulse width calculated by an RNN to a driving unit 11, whereby the vibration actuator 13 is controlled. A machine learning unit 12 obtains the three control amounts output from the trained model 1601 and a detected speed detected by a speed detection unit 16 as training data, and performs machine learning using a learning model 1602.

Figure 35:
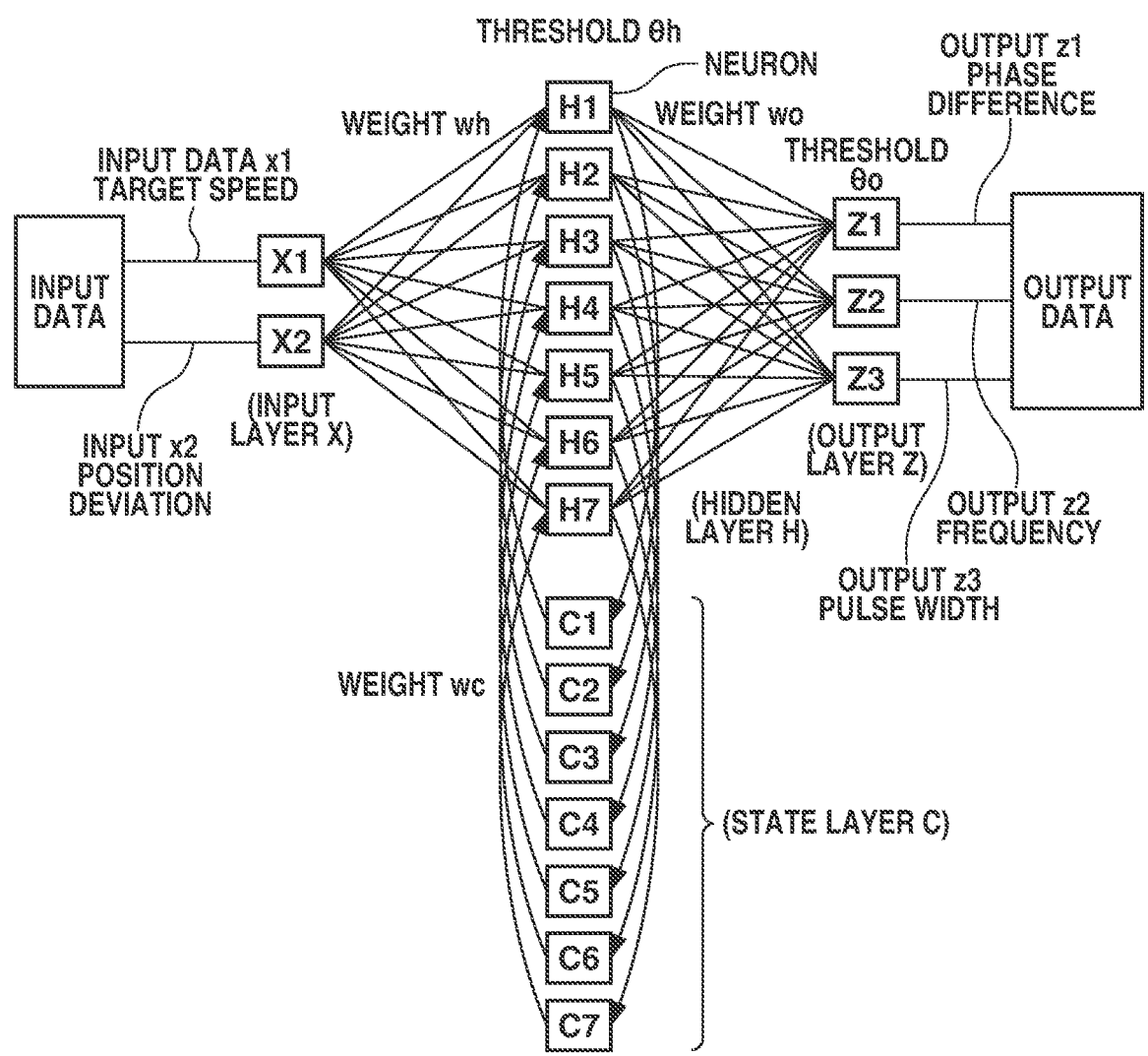
FIG. 35 is a diagram illustrating an H-layer recurrent NN structure of a learning model and a trained model according to the fourteenth exemplary embodiment.

FIG. 35 illustrates an H-layer RNN structure of the learning model 1602 with a phase difference, a frequency, and a pulse width as outputs. The trained model 1601 and the learning model 1602 of FIG. 34 have the H-layer RNN structure with the target speed and the position deviation as inputs and with the three control amounts as outputs. The training data to be used for the machine learning may be measurement data obtained during control by the trained model 1601 as described above, or measurement data obtained during control by an untrained model of which parameters are set using a random function. Alternatively, measurement data obtained by open driving or measurement data obtained by PID control may be used. In determining the weights and thresholds of the RNN, condition parameters optimum in terms of the position deviation and power consumption may be selected from a plurality of pieces of training data. The reason is that there are an indefinite number of combinations of conditions, namely, the phase difference, the frequency, and the pulse width, at which the vibration actuator 13 provides a predetermined speed.

The application of the present exemplary embodiment increases the parameters to operate the vibration actuator 13 with. The control performance can thus be finely adjusted by performing appropriate machine learning.

Another exemplary embodiment (fifteenth exemplary embodiment) of the control unit 10 according to the ninth exemplary embodiment illustrated in FIG. 23 will be described.

FIGS. 36A, 36B, and 36C illustrate a Z-layer RNN structure of a learning model with a phase difference and a frequency as outputs. The trained model 113 and the learning model 116 of FIG. 23 may have the Z-layer RNN structure with the target speed and the position deviation as inputs and the two control amounts as outputs. Training data to be used for the machine learning may be measurement data obtained during control by the trained model 113 as described above, or measurement data obtained during control by an untrained model of which parameters are set using a random function. Alternatively, measurement data obtained by open driving or measurement data obtained by PID control may be used. In determining the weights and thresholds of the RNN, condition parameters optimum in terms of the position deviation and power consumption may be selected from a plurality of pieces of training data. The reason is that there are an indefinite number of combinations of conditions, namely, the phase difference and the frequency, at which the vibration actuator 13 provides a predetermined speed.

As illustrated in FIG. 26C, the application of the present exemplary embodiment (Z-layer RNN) can improve the position deviation in all the domains during acceleration, deceleration, and settling-down.

Another exemplary embodiment (sixteenth exemplary embodiment) of the control unit 10 according to the ninth exemplary embodiment illustrated in FIG. 23 will be described.

Figure 37:
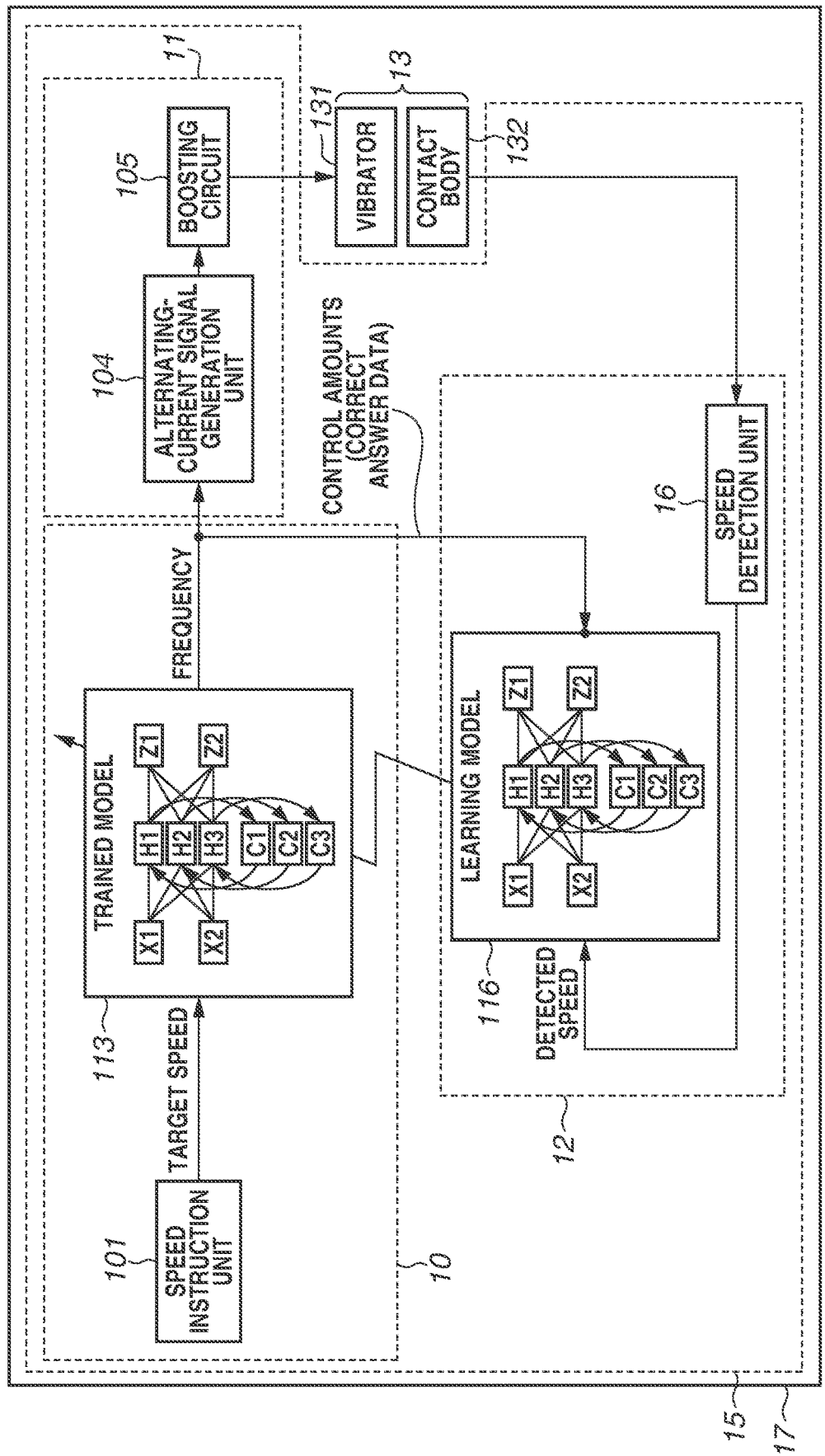
FIG. 37 is a control block diagram of a vibration driving apparatus according to a sixteenth exemplary embodiment.
Figure 38:
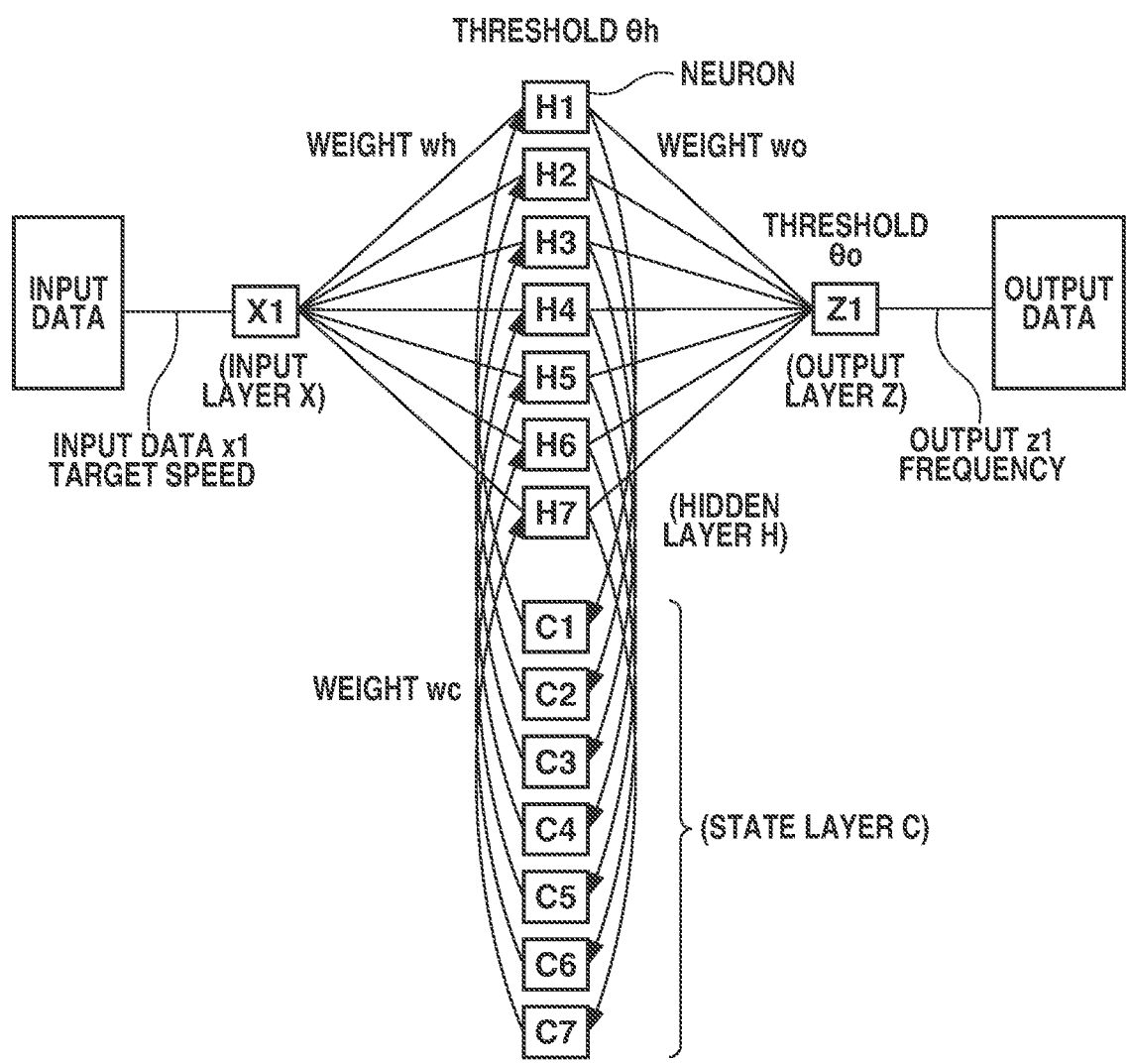
FIG. 38 is a diagram illustrating an H-layer recurrent NN structure of the vibration driving apparatus according to the sixteenth exemplary embodiment.

FIG. 37 corresponds to the control block diagram of the vibration driving apparatus 17 of FIG. 23 from which the position instruction unit 102 and the position detection unit 14 are omitted. In FIG. 37, the control blocks excluding a vibration actuator 13 constitute a control apparatus 15. FIG. 38 is a diagram illustrating an RNN structure of a learning model 116 and a trained model 113 used in FIG. 37.

Even with such a configuration, the trained model 113 can be generated as in the foregoing exemplary embodiments.

Another exemplary embodiment (seventeenth exemplary embodiment) of the control unit 10 according to the ninth exemplary embodiment illustrated in FIG. 23 will be described.

Figure 39:
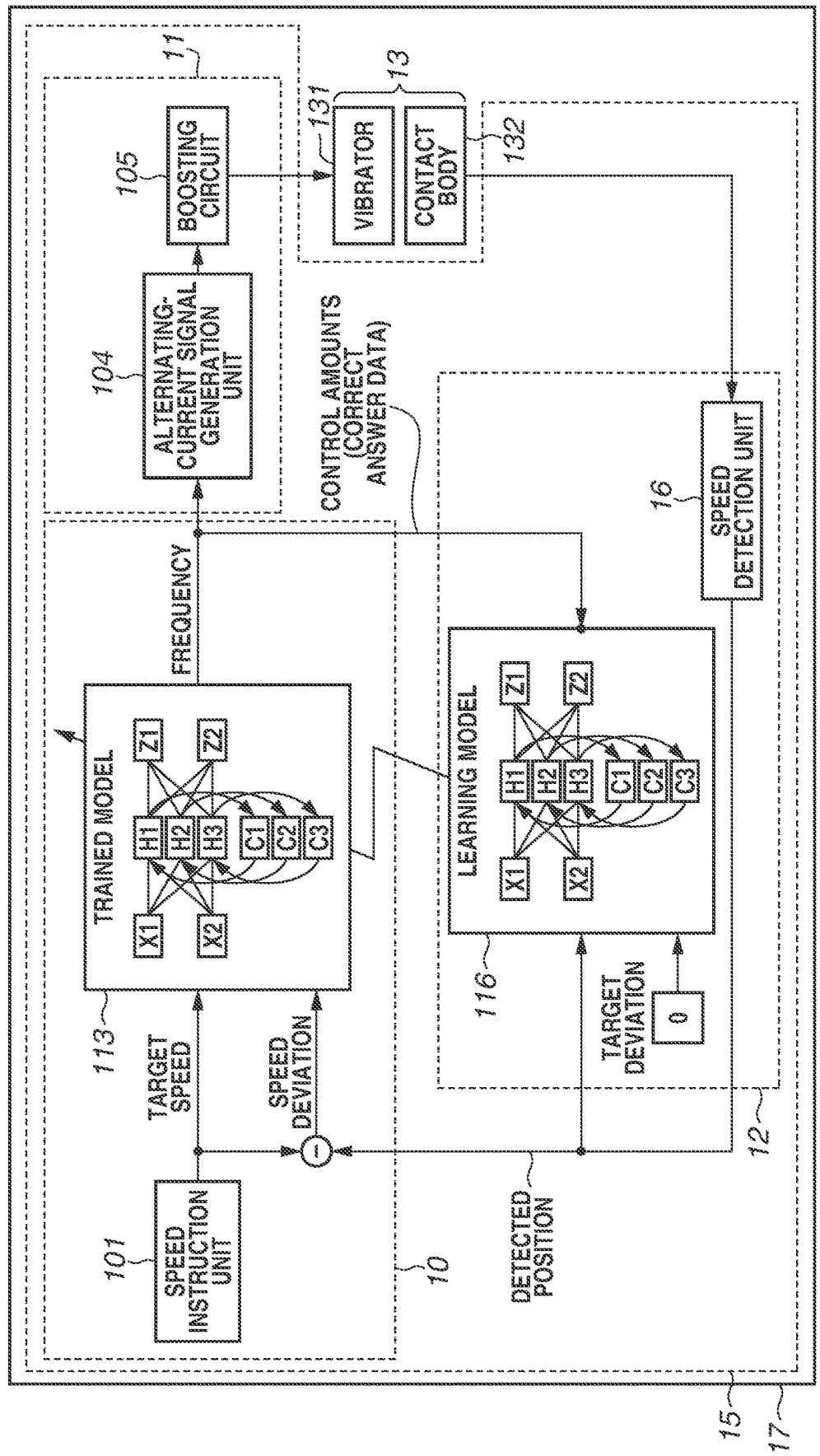
FIG. 39 is a control block diagram of a vibration driving apparatus according to a seventeenth exemplary embodiment.
Figure 40:
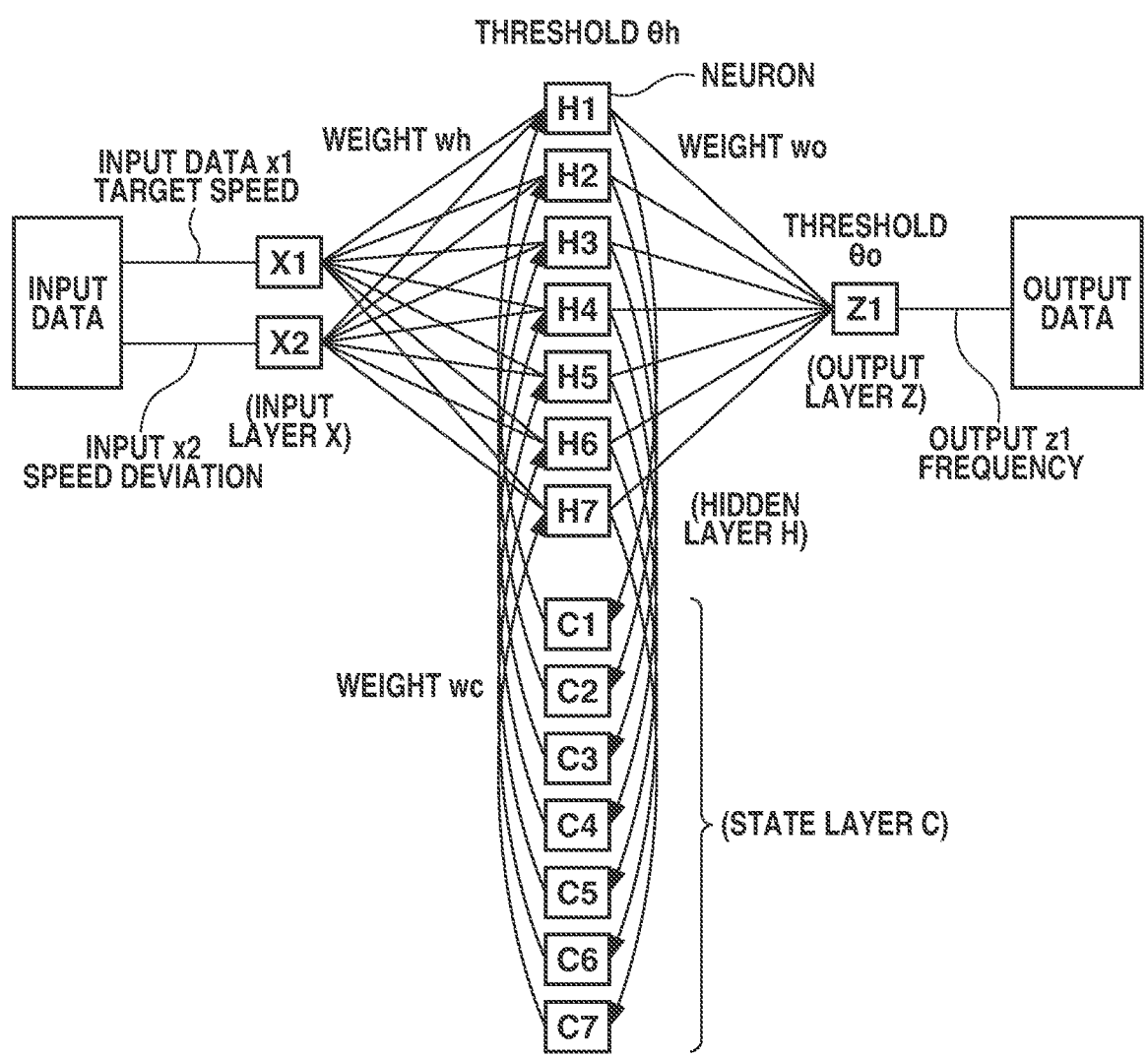
FIG. 40 is a diagram illustrating an H-layer recurrent NN structure of the vibration driving apparatus according to the seventeenth exemplary embodiment.

FIG. 39 corresponds to the control block diagram of the vibration driving apparatus 17 illustrated in FIG. 23 from which the position instruction unit 102 and the position detection unit 14 are omitted and where feedback control based on a speed deviation is performed instead of the feedback control based on the position deviation. In FIG. 39, the control blocks excluding a vibration actuator 13 constitute a control apparatus 15. FIG. 40 is a diagram illustrating an RNN structure of a learning model 116 and a trained model 113 used in FIG. 39.

Even with such a configuration, the trained model 113 can be generated as in the foregoing exemplary embodiments.

An eighteenth exemplary embodiment will be described. In the foregoing exemplary embodiments, if the control apparatus 15 includes a control amount output unit 103 including a trained model that is trained to output the first control amount(s) when an instruction about the first speed is issued, the machine learning unit 12 may be omitted from the control apparatus 15. Such a control apparatus 15 has the disadvantage of being unable to train the trained model again. However, the simple configuration without the machine learning unit 12 is advantageous if the vibration driving apparatus 17 is less likely to perform the machine learning again.

In the foregoing exemplary embodiments, a storage unit for storing the parameters of the trained model (the first weights, the second weights, the third weights, the thresholds for the second neurons, and the threshold(s) for the third neuron(s)) may be included. The trained model may be trained by replacing the parameters of the trained model with those stored in the storage unit. A memory such as a ROM is used as the storage unit. However, this is not restrictive. Any storage unit that can store the parameters of the trained model may be used.

In the foregoing exemplary embodiments, an environment sensor for detecting a state of an environment may be included. The trained model may be trained if the environment sensor detects a change in the environment. The environment sensor may be at least either one of a temperature sensor and a humidity sensor.

Another exemplary embodiment (nineteenth exemplary embodiment) of the control unit 10 according to the ninth exemplary embodiment illustrated in FIG. 23 will be described.

Figure 41:
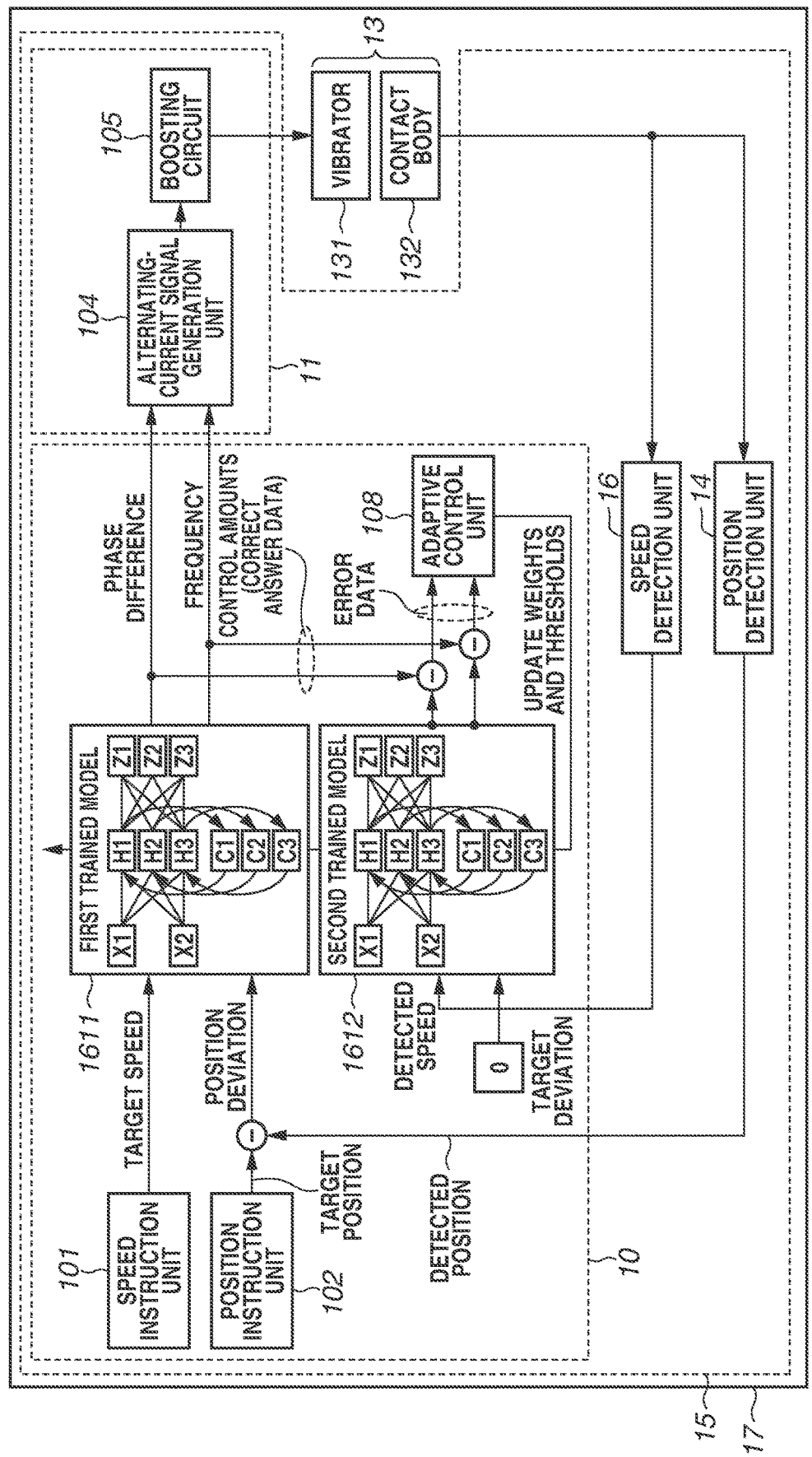
FIG. 41 is a control block diagram of a vibration driving apparatus according to a nineteenth exemplary embodiment.

FIG. 41 is a diagram illustrating a control apparatus 15 for a vibration actuator 13 according to the nineteenth exemplary embodiment of the present invention, and adaptive control using an RNN. A machine learning unit is not illustrated or necessarily needed in this example. The control unit 10 includes a first trained model 1611, a second trained model 1612, and an adaptive control unit 108. The two trained models 1611 and 1612 have the same RNN structure. A target speed and a position deviation are input to the first trained model 1611. A detected speed and a target deviation (zero) are input to the second trained model 1612.

The adaptive control unit 108 calculates an error gradient based on error data on the control amounts output from the two trained models 1611 and 1612 at each control sampling period. The weight and threshold parameters of the RNNs are updated using SGD, and reflected on the two trained models 1611 and 1612. In other words, the data between the control sampling periods is used as training data.

The calculation at each control sampling period is repeated during driving, and the control amounts (phase difference and frequency) output from the first trained model 1611 and the control amounts output from the second trained model 1612 converge to minimize the error. This enables feedback control to follow the target speed and bring the position deviation close to zero.

As described above, the RNN-based trained models 1611 and 1612 according to the present exemplary embodiment can be applied to adaptive control to compensate for a change in the characteristics of the vibration actuator 13 during driving.

Another exemplary embodiment (twentieth exemplary embodiment) of an NN used in a learning model according to the present invention will be described.

Figure 42A:
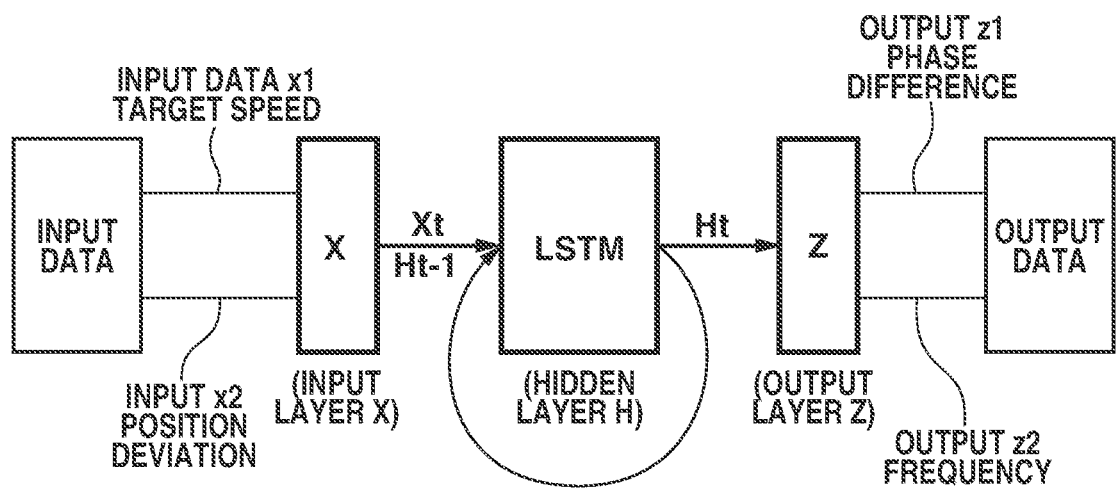
FIG. 42A is a diagram illustrating an H-layer recurrent NN structure according to a twentieth exemplary embodiment (where long short-term memory (LSTM) is applied to a learning model).
Figure 42B:
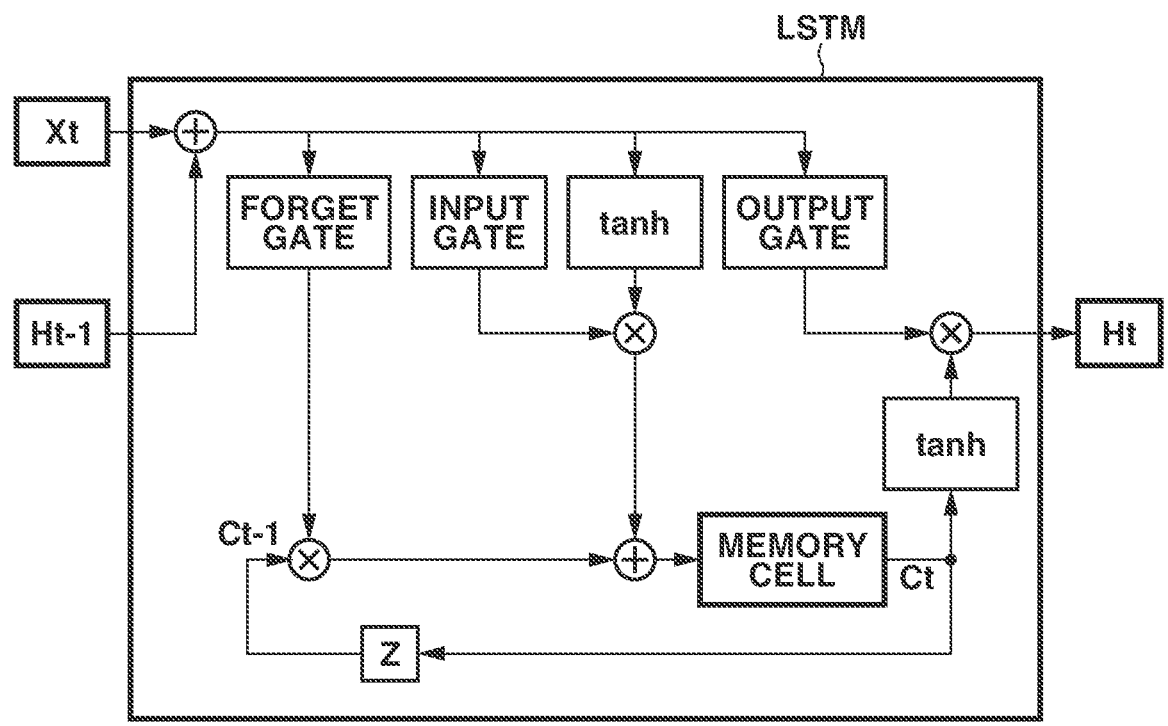
FIG. 42B is a diagram illustrating the H-layer recurrent NN structure according to the twentieth exemplary embodiment (where LSTM is applied to the learning model).

FIGS. 42A and 42B are diagrams illustrating a control apparatus for a vibration actuator according to the twentieth exemplary embodiment of the present invention and the structure of a long short-term memory (LSTM)-based learning model. LSTM is a derivative network of an RNN. LSTM includes a loop inside and can retain information. Weights in the future are thus determined based on past weights. In addition to the structure of having a loop inside the RNN, LSTM also includes a forget gate, an input gate, and an output gate. In particular, the provision of the forget gate enables long-term learning of continuous data that is unable to be achieved by RNNs.

FIG. 42A illustrates the configuration in the case where LSTM is applied to a learning model according to the present exemplary embodiment. LSTM receives an input Xt from an input layer X and an output Ht−1 of a hidden layer H at a previous time (t−1), and outputs an output Ht to an output layer Z. LSTM includes a memory cell inside, and stores the internal state at each time.

FIG. 42B is a block diagram illustrating the internal configuration of the LSTM. The forget gate, the input gate, and the output gate are a sigmoid function each. The forget gate determines how much past information to store. The input gate determines which value to update. The memory cell is updated using a tan h function. The tan h function generates a new candidate value to be added to the memory cell. The output gate selects a memory cell candidate element and selects how much information to pass on to the next time.

The LSTM model described above is a basic one, and not limited to the illustrated network. The connection between the network elements may be changed. A quasi-recurrent neural network (QRNN) may be used instead of LSTM.

Figure 43B:
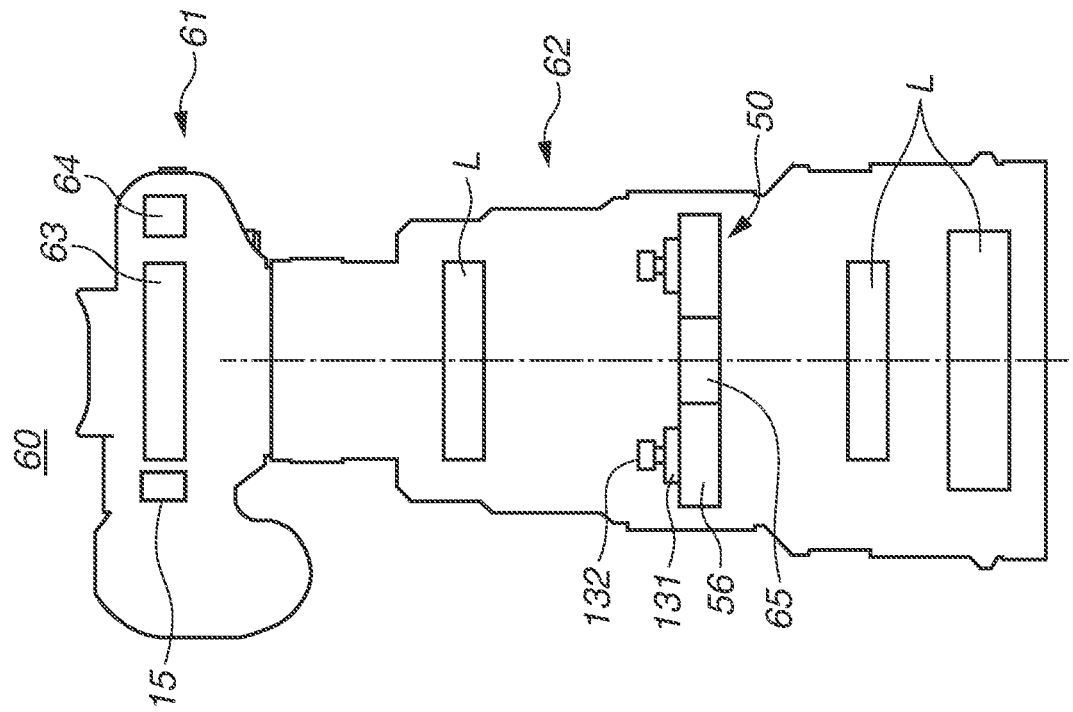
FIG. 43B is a schematic diagram illustrating an internal configuration of the imaging apparatus that is an application example of the control apparatus for the vibration actuator according to the twenty-first exemplary embodiment.
Figure 43A:
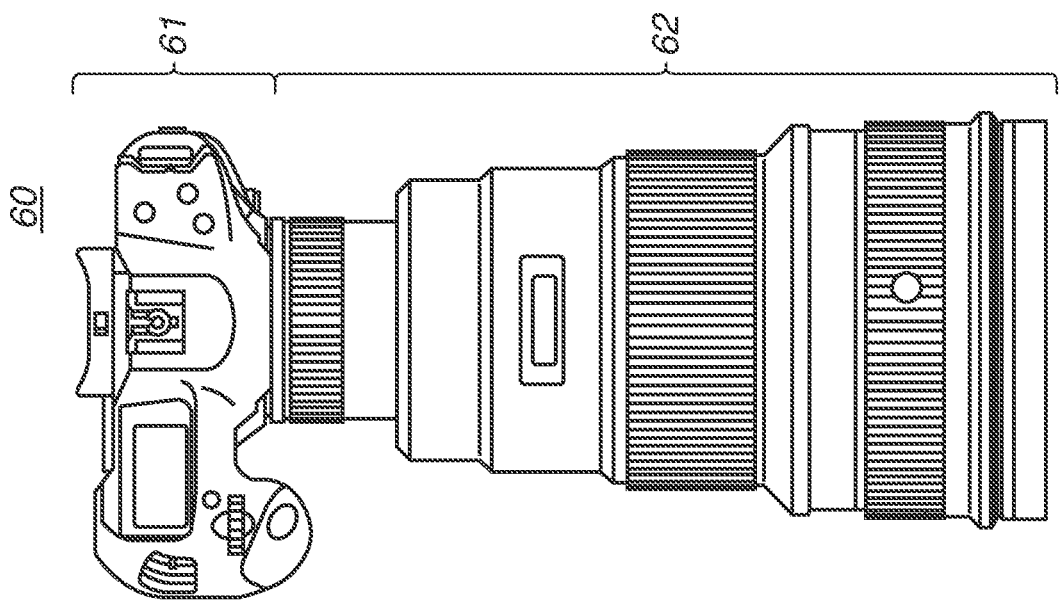
FIG. 43A is a plan view illustrating appearance of an imaging apparatus that is an application example of a control apparatus for a vibration actuator according to a twenty-first exemplary embodiment.

A twenty-first exemplary embodiment will be described. In the first exemplary embodiment, the control apparatus 15 for the vibration actuator 13 is described to be used to drive an autofocus lens of an imaging apparatus. However, application examples of the present invention are not limited thereto. For example, as illustrated in FIGS. 43A and 43B, the control apparatus 15 for the vibration actuator 13 can be used to drive a lens or image sensor for camera shake correction. FIG. 43A is a plan view (top view) illustrating appearance of an imaging apparatus 60. FIG. 43B is a schematic diagram illustrating an internal configuration of the imaging apparatus 60.

The imaging apparatus 60 broadly includes a main body 61 and a lens barrel 62 detachably attachable to the main body 61. The main body 61 includes an image sensor 63 that converts an optical image formed of light passed through the lens barrel 62 into an image signal, and a camera control microcomputer 64 that controls overall operation of the imaging apparatus 60. Examples of the image sensor 63 include a charge-coupled device (CCD) sensor and a complementary metal-oxide-semiconductor (CMOS) sensor.

The lens barrel 62 includes a plurality of lenses L, such as a focus lens and a zoom lens, located at predetermined positions. The lens barrel 62 also includes a built-in image blur correction apparatus 50. The image blur correction apparatus 50 includes a disc member 56 and vibrators 131 disposed on the disc member 56. An image blur correction lens 65 is located in a hole at the center of the disc member 56.

The image blur correction apparatus 50 is disposed so that the image blur correction lens 65 can be moved within a plane orthogonal to the optical axis of the lens barrel 62. In such a case, a control apparatus 15 according to the present exemplary embodiment is used to drive the vibrators 131, whereby the vibrators 131 and the disc member 56 are relatively moved with respect to contact bodies 132 fixed to the lens barrel 62, and the image blur correction lens 65 is driven.

The control apparatus 15 according to the present exemplary embodiment can be also used to drive a lens holder for moving the zoom lens. For the purpose of lens driving, another control apparatus 15 according to the present exemplary embodiment can thus be mounted on an interchangeable lens in addition to the imaging apparatus 60.

Figure 44:
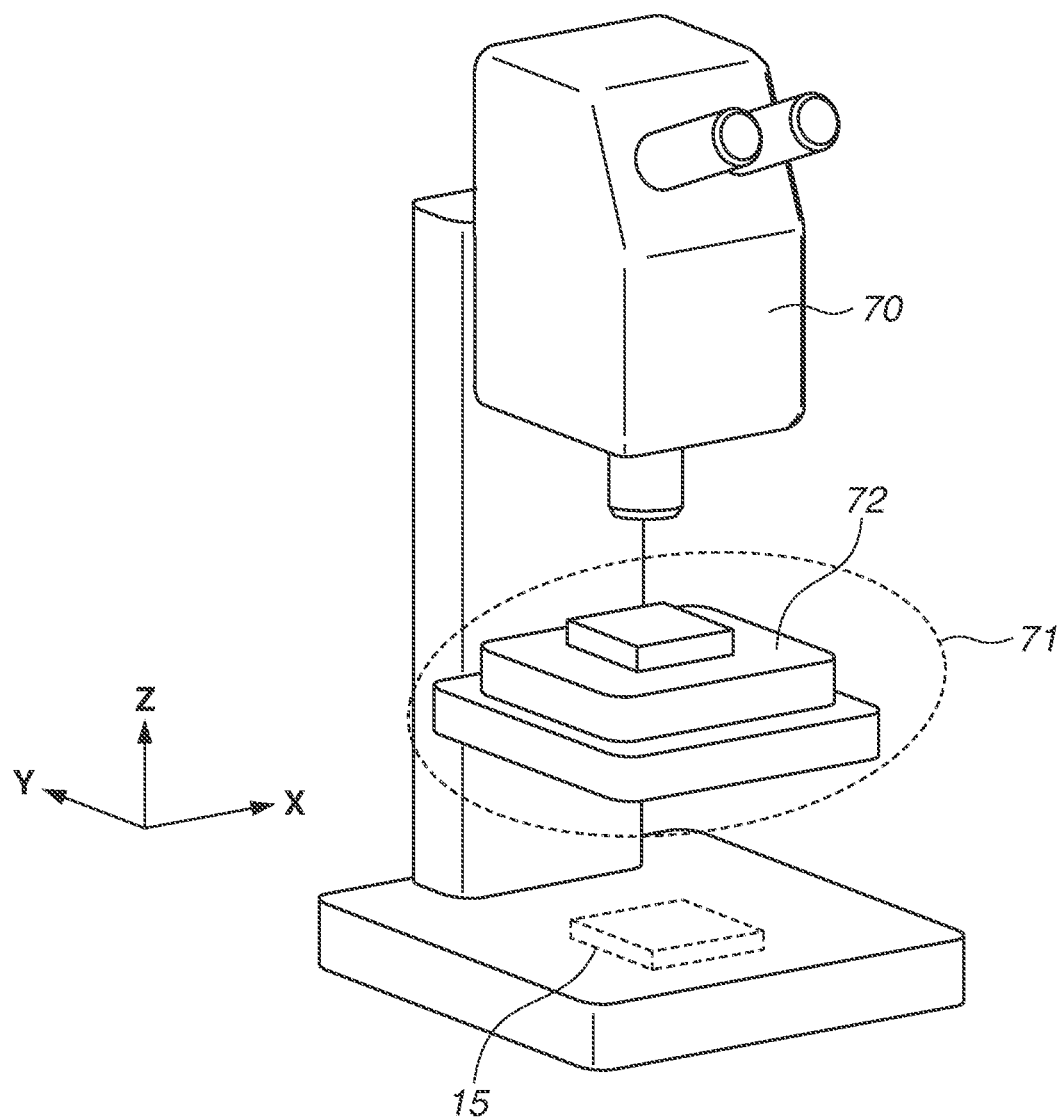
FIG. 44 is a perspective view illustrating appearance of a microscope that is an application example of the control apparatus for the vibration actuator according to the twenty-first exemplary embodiment.

The control apparatus 15 for the vibration actuator 13 described in the first exemplary embodiment can be also used to drive an automatic stage. For example, FIG. 44 is a perspective view illustrating appearance of a microscope. The control apparatus 15 can be used to drive the automatic stage of the microscope.

The microscope illustrated in FIG. 44 includes an imaging unit 70 including a built-in image sensor and optical system, and an automatic stage 71 disposed on a base. The automatic stage 71 includes a stage 72 to be moved by vibration actuators. An object to be observed is placed on the stage 72, and the imaging unit 70 captures a magnified image of the object. If the observation range is wide, the stage 72 is moved by driving the vibration actuators using the control apparatus 15 according to the first or second exemplary embodiment.

The object to be observed is thereby moved in an X direction or a Y direction in the diagram to obtain a large number of captured images. A not-illustrated computer connects the captured images, whereby a single high-resolution image of the wide observation range can be obtained.

The exemplary embodiments of the present invention have been described above in detail. However, the present invention is not limited to these specific exemplary embodiments, and various modes not departing from the gist of the invention are also included in the present invention. The foregoing exemplary embodiments merely demonstrate several exemplary embodiments of the present invention, and the exemplary embodiments can be combined as appropriate.

The present invention is not limited to the foregoing exemplary embodiments, and various changes and modifications can be made without departing from the spirit and scope of the present invention. The following claims are therefore attached to make the scope of the present invention public.

According to an exemplary embodiment of the present invention, a vibration actuator control apparatus including a control amount output unit different from a conventional PID controller as its main control amount output unit can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus for a vibration actuator configured to relatively move a contact body in contact with a vibrator with respect to the vibrator using vibration occurring on the vibrator, the control apparatus comprising
a control amount output unit including:
a trained model trained to, if a target speed to relatively move the contact body with respect to the vibrator at is input, output a first control amount to relatively move the contact body with respect to the vibrator, and
a learning model including a neural network (NN) configuration with a relative speed of the vibration actuator,
wherein the learning model is trained using training data with a detected speed detected in a case where the contact body is relatively moved with respect to the vibrator by the first control amount and with a target deviation as input, and a second control amount as output, and
wherein, if an instruction about the target speed is issued, the target speed and a position deviation are input to the trained model, the position deviation being a difference between a target position about which an instruction is issued to relatively move the contact body with respect to the vibrator and a detected position detected in a case where the contact body is relatively moved with respect to the vibrator by the first control amount.

2. The control apparatus for the vibration actuator according to claim 1, wherein, if an instruction about the target speed is issued, the target speed and a speed deviation are input to the trained model, the speed deviation being a difference between the target speed and the detected speed.

3. The control apparatus for the vibration actuator according to claim 2, wherein the trained model is trained using training data with the detected speed and a value having a same data format as that of the speed deviation as input and the first control amount as output, the speed deviation being the difference between the target speed and the detected speed.

4. The control apparatus for the vibration actuator according to claim 1, wherein the trained model is trained using training data with the detected speed and a value having a same data format as that of the position deviation as input and the first control amount as output, the position deviation being the difference between the target position and the detected position.

5. The control apparatus for the vibration actuator according to claim 1, further comprising a proportional-integral-derivative (PID) controller,
wherein, if the instruction about the target speed is issued, the target speed and an output of the PID controller to which the position deviation is input are input to the trained model.

6. The control apparatus for the vibration actuator according to claim 1, wherein the first control amount is at least one of a phase difference, a frequency, and a pulse width.

7. The control apparatus for the vibration actuator according to claim 1, wherein the first control amount is a phase difference.

8. The control apparatus for the vibration actuator according to claim 1, wherein the first control amount is a phase difference and a frequency.

9. The control apparatus for the vibration actuator according to claim 1, wherein the first control amount is a phase difference, a frequency, and a pulse width.

10. The control apparatus for the vibration actuator according to claim 1,
wherein the trained model includes an NN configuration including an input layer including one or a plurality of first neurons, a hidden layer including a plurality of second neurons, and an output layer including one or a plurality of third neurons, and
wherein the neural network configuration has a plurality of first weights connecting the first neuron(s) and the second neurons, a plurality of second weights connecting the second neurons and the third neuron(s), thresholds for the second neurons, and a threshold or thresholds for the third neuron(s).

11. The control apparatus for the vibration actuator according to claim 10, wherein the first weights, the second weights, the thresholds for the second neurons, and the threshold(s) for the third neuron(s) of the trained model are optimized.

12. The control apparatus for the vibration actuator according to claim 11, wherein the trained model is trained by optimizing the first weights, the second weights, the thresholds for the second neurons, and the threshold(s) for the third neuron(s) that are set using a random function, based on an optimization algorithm.

13. The control apparatus for the vibration actuator according to claim 11, wherein the trained model is trained by optimizing the first weights, the second weights, the thresholds for the second neurons, and the threshold(s) for the third neuron(s) that are trained based on an optimization algorithm.

14. The control apparatus for the vibration actuator according to claim 10, further comprising a storage unit configured to store the first weights, the second weights, the thresholds for the second neurons, and the threshold(s) for the third neuron(s) of the trained model,
wherein the trained model is trained by replacing the first weights, the second weights, the thresholds for the second neurons, and the threshold(s) for the third neuron(s) of the trained model with the first weights, the second weights, the thresholds for the second neurons, and the threshold(s) for the third neuron(s) stored in the storage unit.

15. The control apparatus for the vibration actuator according to claim 1, wherein the trained model includes a recurrent neural network structure including an input layer, a hidden layer, an output layer, and a state layer configured to store output from the hidden layer or the output layer and output the stored output from the hidden layer or the output layer to the hidden layer.

16. The control apparatus for the vibration actuator according to claim 15,
wherein the trained model includes, as the recurrent neural network structure, an input layer including one or a plurality of first neurons, a hidden layer including a plurality of second neurons, an output layer including one or a plurality of third neurons, and a state layer including a plurality of fourth neurons configured to store a plurality of outputs from the plurality of second neurons or a plurality of outputs from the one or plurality of third neurons, and
wherein the trained model has a plurality of first weights assigned to a plurality of outputs from the one or plurality of first neurons to the plurality of second neurons, a plurality of second weights assigned to a plurality of outputs from the plurality of second neurons to the one or plurality of third neurons, a plurality of third weights assigned to a plurality of outputs from the plurality of fourth neurons to the plurality of second neurons, thresholds for the second neurons, and a threshold or thresholds for the third neuron(s) as parameters of the recurrent neural network structure.

17. The control apparatus for the vibration actuator according to claim 16, wherein the first weights, the second weights, the third weights, the thresholds for the second neurons, and the threshold(s) for the third neuron(s) of the trained model are optimized.

18. The control apparatus for the vibration actuator according to claim 17, wherein the trained model is trained by optimizing the first weights, the second weights, the third weights, the thresholds for the second neurons, and the threshold(s) for the third neuron(s) that are set using a random function, based on an optimization algorithm.

19. The control apparatus for the vibration actuator according to claim 17, wherein the trained model is trained by optimizing, based on an optimization algorithm, the first weights, the second weights, the third weights, the thresholds for the second neurons, and the threshold(s) for the third neuron(s) that are trained based on the optimization algorithm.

20. The control apparatus for the vibration actuator according to claim 17, further comprising a storage unit configured to store the first weights, the second weights, the third weights, the thresholds for the second neurons, and the threshold(s) for the third neuron(s) of the trained model,
wherein the trained model is trained by replacing the first weights, the second weights, the third weights, the thresholds for the second neurons, and the threshold(s) for the third neuron(s) of the trained model with the first weights, the second weights, the third weights, the thresholds for the second neurons, and the threshold(s) for the third neuron(s) stored in the storage unit.

21. The control apparatus for the vibration actuator according to claim 15, wherein the hidden layer includes a long short-term memory (LSTM) structure.

22. The control apparatus for the vibration actuator according to claim 12, wherein the optimization algorithm is any one of adaptive moment estimation (Adam), Momentum, Root Mean Square Propagation (RMSProp), and stochastic gradient descent (SGD).

23. The control apparatus for the vibration actuator according to claim 1, wherein the trained model is trained other than in a case where the contact body is relatively moved with respect to the vibrator.

24. The control apparatus for the vibration actuator according to claim 1, wherein the trained model is trained in a case where the contact body is relatively moved with respect to the vibrator.

25. The control apparatus for the vibration actuator according to claim 1, further comprising an environment sensor configured to detect a state of an environment,
wherein the trained model is trained in a case where the environment sensor detects a change in the environment.

26. The control apparatus for the vibration actuator according to claim 25, wherein the environment sensor is at least either one of a temperature sensor and a humidity sensor.

27. The control apparatus for the vibration actuator according to claim 1, further comprising:
a speed instruction unit configured to issue an instruction about the target speed; and
a speed detection unit configured to detect the detected speed.

28. The control apparatus for the vibration actuator according to claim 5, further comprising:
a position instruction unit configured to issue an instruction about the target position; and
a position detection unit configured to detect the detected position.

29. A vibration driving apparatus comprising:
a vibration actuator configured to relatively move a contact body in contact with a vibrator with respect to the vibrator using vibration occurring on the vibrator; and
the control apparatus for the vibration actuator according to claim 1.

30. An interchangeable lens comprising:
the vibration driving apparatus according to claim 29; and
a lens to be driven by relatively moving the contact body with respect to the vibrator.

31. An imaging apparatus comprising:
the vibration driving apparatus according to claim 29; and
an image sensor to be driven by relatively moving the contact body with respect to the vibrator.

32. An automatic stage comprising:
the vibration driving apparatus according to claim 29; and
a stage to be driven by relatively moving the contact body with respect to the vibrator.

33. A method for outputting a control amount for a vibration actuator configured to relatively move a contact body in contact with a vibrator with respect to the vibrator using vibration occurring on the vibrator and configured to have a control amount output unit, the method comprising performing machine learning using training data with a second speed as input and a first control amount as output, the second speed being detected in a case where the contact body is relatively moved with respect to the vibrator by the first control amount, the first control amount being intended to relatively move the contact body with respect to the vibrator in a case where an instruction about a first speed to relatively move the contact body with respect to the vibrator at is issued wherein the control amount output unit includes:

a trained model trained to, if a target speed to relatively move the contact body with respect to the vibrator at is input, output the first control amount to relatively move the contact body with respect to the vibrator; and a learning model including an NN configuration with a relative speed of the vibration actuator, wherein the learning model is trained using training data with a detected speed detected in a case where the contact body is relatively moved with respect to the vibrator by the first control amount and with a target deviation as input, and a second control amount as output, wherein, if an instruction about the target speed is issued, the target speed and a position deviation are input to the trained model, the position deviation being a difference between a target position about which an instruction is issued to relatively move the contact body with respect to the vibrator and a detected position detected in a case where the contact body is relatively moved with respect to the vibrator by the first control amount.

34. A storage medium storing a program for causing a computer to execute the method for outputting the control amount for the vibration actuator according to claim 33.

* * * * *